US012010484B2

(12) United States Patent
Yorga et al.

(10) Patent No.: US 12,010,484 B2
(45) Date of Patent: Jun. 11, 2024

(54) METHOD, APPARATUS AND COMPUTER-READABLE MEDIA TO CREATE AUDIO FOCUS REGIONS DISSOCIATED FROM THE MICROPHONE SYSTEM FOR THE PURPOSE OF OPTIMIZING AUDIO PROCESSING AT PRECISE SPATIAL LOCATIONS IN A 3D SPACE

(71) Applicant: Nureva, Inc., Calgary (CA)

(72) Inventors: Erica Patricia Yorga, Calgary (CA); Richard Dale Ferguson, Okotoks (CA); Kael Blais, Calgary (CA); Mahdi Javer, Calgary (CA); Nicholas Norrie, Calgary (CA)

(73) Assignee: NUREVA, INC., Calgary (CA)

( * ) Notice: Subject to any disclaimer, the term of this patent is extended or adjusted under 35 U.S.C. 154(b) by 227 days.

(21) Appl. No.: 17/516,480

(22) Filed: Nov. 1, 2021

(65) Prior Publication Data

US 2022/0116702 A1 Apr. 14, 2022

Related U.S. Application Data

(63) Continuation of application No. 16/774,258, filed on Jan. 28, 2020, now Pat. No. 11,190,871.

(Continued)

(51) Int. Cl.

*H04R 1/40* (2006.01)
*H04R 3/00* (2006.01)

(Continued)

(52) U.S. Cl.

CPC ............. *H04R 1/406* (2013.01); *H04R 3/005* (2013.01); *H04R 29/005* (2013.01); *H04S 7/30* (2013.01);

(Continued)

(58) Field of Classification Search

CPC ...... H04R 1/406; H04R 3/005; H04R 29/005; H04R 2201/401; H04R 2201/403

See application file for complete search history.

(56) References Cited

U.S. PATENT DOCUMENTS

| | | | |
|---|---|---|---|
| 4,499,578 | A | 2/1985 | Marouf et al. |
| 4,536,887 | A | 8/1985 | Kaneda et al. |

(Continued)

FOREIGN PATENT DOCUMENTS

| | | | |
|---|---|---|---|
| EP | 0903055 | B1 | 10/2007 |
| EP | 2975609 | A1 | 1/2016 |

(Continued)

OTHER PUBLICATIONS

International Search Report and Written Opinion mailed Sep. 15, 2017, from International Application No. PCT/CA2017/050642, 12 sheets.

(Continued)

*Primary Examiner* — Sunita Joshi

(74) *Attorney, Agent, or Firm* — KATTEN MUCHIN ROSENMAN LLP

(57) ABSTRACT

Method, apparatus, and computer-readable media focusing sound signals from plural microphones in a 3D space, to determine audio signal processing profiles to optimize sound source(s) in the space. At least one processor determines plural virtual microphone bubbles in the space, and defines one or more bubble object profiles which comprise(s) specific attributes and functions of audio processing functions for each bubble, each bubble object profile including: (a) an individual bubble object profile when the bubble has been configured for an individual bubble; (b) a region object profile when the bubble has been configured for a region of one or more bubbles; and (c) a group object profile when the bubble has been configured for a group having one or more bubbles. The audio signal processing functions are used for the at least one bubble, for any combination of (a), (b), and (c).

21 Claims, 51 Drawing Sheets

Related U.S. Application Data

(60) Provisional application No. 62/798,102, filed on Jan. 29, 2019.

(51) Int. Cl.
*H04R 29/00* (2006.01)
*H04S 7/00* (2006.01)

(52) U.S. Cl.
CPC .. *H04R 2201/401* (2013.01); *H04R 2201/403* (2013.01); *H04S 2400/15* (2013.01)

(56) References Cited

U.S. PATENT DOCUMENTS

| | | | | |
|---|---|---|---|---|
| 5,477,270 | A | 12/1995 | Park | |
| 5,699,437 | A | 12/1997 | Finn | |
| 6,469,732 | B1 | 10/2002 | Chang et al. | |
| 6,593,956 | B1 | 7/2003 | Potts et al. | |
| 6,912,178 | B2 | 6/2005 | Chu et al. | |
| 6,912,718 | B1 | 6/2005 | Chang et al. | |
| 7,130,705 | B2 | 10/2006 | Amir et al. | |
| 7,254,241 | B2 | 8/2007 | Rui et al. | |
| 7,489,788 | B2 | 2/2009 | Leung et al. | |
| 7,848,531 | B1 | 12/2010 | Vickers et al. | |
| 7,995,768 | B2 | 8/2011 | Miki et al. | |
| 8,185,387 | B1 | 5/2012 | Lachapelle | |
| 8,953,819 | B2 | 2/2015 | Ko et al. | |
| 9,706,292 | B2 | 7/2017 | Duraiswami et al. | |
| 9,800,964 | B2 | 10/2017 | McIntosh et al. | |
| 10,003,900 | B2 | 6/2018 | Cartwright et al. | |
| 10,063,987 | B2 | 8/2018 | McGibney | |
| 10,229,697 | B2 | 3/2019 | Bastyr et al. | |
| 10,237,639 | B2 | 3/2019 | McIntosh et al. | |
| 10,387,108 | B2 | 8/2019 | McGibney | |
| 10,397,726 | B2 | 8/2019 | McGibney | |
| 10,848,896 | B2 | 11/2020 | McGibney | |
| 10,972,835 | B2 | 4/2021 | Rollow, IV | |
| 11,127,415 | B2 | 9/2021 | Magnusson et al. | |
| 11,190,871 | B2 | 11/2021 | Yorga et al. | |
| 2005/0280701 | A1 | 12/2005 | Wardell | |
| 2006/0034469 | A1 | 2/2006 | Tamiya et al. | |
| 2006/0165242 | A1 | 7/2006 | Miki et al. | |
| 2008/0085014 | A1 | 4/2008 | Chen et al. | |
| 2008/0107277 | A1 | 5/2008 | Somasundaram et al. | |
| 2008/0285771 | A1 | 11/2008 | Tanaka et al. | |
| 2009/0129609 | A1 | 5/2009 | Oh et al. | |
| 2010/0034397 | A1 | 2/2010 | Nakadai et al. | |
| 2010/0135118 | A1 | 6/2010 | Van Leest et al. | |
| 2011/0135125 | A1 | 6/2011 | Zhan et al. | |
| 2012/0093344 | A1 | 4/2012 | Sun et al. | |
| 2012/0245933 | A1 | 9/2012 | Flaks et al. | |
| 2013/0083934 | A1 | 4/2013 | Ahgren | |
| 2013/0101134 | A1 | 4/2013 | Betts-Lacroix | |
| 2013/0142342 | A1 | 6/2013 | Del Galdo et al. | |
| 2013/0258813 | A1 | 10/2013 | Herre et al. | |
| 2014/0050328 | A1 | 2/2014 | Fischer | |
| 2014/0098964 | A1 | 4/2014 | Rosca et al. | |
| 2014/0119552 | A1 | 5/2014 | Beaucoup | |
| 2014/0133666 | A1 | 5/2014 | Tanaka et al. | |
| 2014/0185824 | A1 | 7/2014 | Burnett | |
| 2014/0314251 | A1* | 10/2014 | Rosca | H04R 3/005 381/92 |
| 2014/0348342 | A1 | 11/2014 | Laaksonen et al. | |
| 2015/0185312 | A1 | 7/2015 | Gaubitch et al. | |
| 2015/0222996 | A1 | 8/2015 | Chu et al. | |
| 2015/0230026 | A1 | 8/2015 | Eichfeld et al. | |
| 2016/0071526 | A1 | 3/2016 | Wingate et al. | |
| 2016/0112469 | A1 | 4/2016 | Liu | |
| 2016/0173976 | A1 | 6/2016 | Podhradsky | |
| 2017/0347217 | A1* | 11/2017 | McGibney | H04S 7/303 |
| 2017/0366896 | A1 | 12/2017 | Adsumilli et al. | |
| 2017/0374454 | A1 | 12/2017 | Bernardini et al. | |
| 2018/0074782 | A1 | 3/2018 | McGibney | |
| 2018/0098174 | A1 | 4/2018 | Goodwin et al. | |
| 2018/0249267 | A1 | 8/2018 | Klingler et al. | |
| 2022/0004355 | A1 | 1/2022 | McGibney | |

FOREIGN PATENT DOCUMENTS

| | | | |
|---|---|---|---|
| JP | 3154468 | B2 | 4/2001 |
| WO | 03010995 | A2 | 2/2003 |
| WO | 2022/118072 | A1 | 6/2022 |

OTHER PUBLICATIONS

Joseph Hector Dibiase, Thesis entitled, “A High-Accuracy, Low-Latency Technique for Talker Localization in Reverberant Environments Using Microphone Arrays”, Brown University, May 2000.
Notice of Allowance dated Apr. 30, 2018, from U.S. Appl. No. 15/597,646, 18 sheets.
International Search Report and Written Opinion mailed Jun. 7, 2023, from International Application No. PCT/CA2023/50412, 11 sheets.
Extended European Search Report mailed May 7, 2019, from European Patent Application No. 17805437.5, 23 sheets.
Notice of Allowance dated May 24, 2019, from U.S. Appl. No. 16/110,393, 6 sheets.
Non-Final Rejection dated Sep. 17, 2018, from U.S. Appl. No. 16/110,393, 14 sheets.
International Search Report and Written Opinion mailed Oct. 12, 2017, from International Application No. PCT/CA2017/050676, 8 sheets.
Notice of Allowance dated Apr. 2, 2019, from U.S. Appl. No. 15/603,986, 42 sheets.
Final Rejection dated May 25, 2018, from U.S. Appl. No. 15/603,986, 13 sheets.
Non-Final Rejection dated Jan. 24, 2018, from U.S. Appl. No. 15/603,986, 26 sheets.
Communication pursuant to Article 94(3) EPC dated Feb. 17, 2020, from European Patent Application No. 17805437.5, 6 sheets.
Notice of Allowance dated Jul. 16, 2020, from U.S. Appl. No. 16/518,013, 19 sheets.
Non-Final Rejection dated Feb. 28, 2020, from U.S. Appl. No. 16/518,013, 21 sheets.
Notice of Allowance dated Apr. 11, 2019, from U.S. Appl. No. 16/110,393, 18 sheets.
Notice of Allowance dated Jan. 19, 2018, from U.S. Appl. No. 15/597,646, 22 sheets.
Notice of Allowance dated Aug. 16, 2021, from U.S. Appl. No. 17/097,560, 33 sheets.
Extended European search report from European Application No. 20194651.4 with a mailing date of Jan. 21, 2021, 11 sheets.
Extended European search report from European Application No. 17847841.8 with a mailing date of Jun. 28, 2019, 12 sheets.
Communication pursuant to Rules 70(2) and 70a(2) EPC from European Application No. 17847841.8 with a mailing date of Jul. 16, 2019, 1 sheet.
U.S. Appl. No. 62/343,512, filed May 31, 2016, 41 sheets.
U.S. Appl. No. 62/162,091, filed May 15, 2015, 52 sheets.
U.S. Appl. No. 62/345,208, filed Jun. 3, 2016, 44 sheets.
Non-Final Rejection dated Feb. 9, 2021, from U.S. Appl. No. 16/434,725, 72 sheets.
Notice of Allowance dated Jan. 25, 2023, from U.S. Appl. No. 17/374,585, 11 sheets.
Notice of Allowance dated Jan. 19, 2023, from U.S. Appl. No. 17/374,585, 41 sheets.
Non-Final Rejection dated Aug. 8, 2022, from U.S. Appl. No. 17/374,585, 57 sheets.
The extended European search report completed Feb. 2, 2022 (dated Feb. 10, 2022), from European Application No. 19808293.5, 8 sheets.
Emanuel A. P. Habets and Jacob Benesty, “A Two-Stage Beamforming Approach for Noise Reduction and Dereverberation”, IEEE Transactions on Audio, Speach, and Language Processing, vol. 21, No. 5, May 2013, pp. 945-958.
Gerhard Doblinger, “An Adaptive Microphone Array for Optimum Beamforming and Noise Reduction”, 14th European Signal Processing Conference (EUSIPCO 2006), Florence, Italy, Sep. 4-8, 2006, 5 sheets.

(56) References Cited

OTHER PUBLICATIONS

Taylor B. Spalt, Christopher R. Fuller, Thomas F. Brooks, William M. Humphreys, Jr., "A Background Noise Reduction Technique using Adaptive Noise Cancellation for Microphone Arrays", p. 1-16, available at: https://ntrs.nasa.gov/search.jsp?R=20110012472 May 16, 2018T17:29:07+00:00Z.

International Search Report and Written Opinion dated Oct. 3, 2019, from PCT/CA2019/050708, 9 sheets.

Notice of Allowance dated Feb. 10, 2023, from U.S. Appl. No. 16/421,908, 24 sheets.

Final Rejection dated Oct. 11, 2022, from U.S. Appl. No. 16/421,908, 26 sheets.

Non-Final Rejection dated Apr. 20, 2022, from U.S. Appl. No. 16/421,908, 38 sheets.

International Search Report and Written Opinion dated Jun. 15, 2023, from International Application No. PCT/CA2023/050371, 7 sheets.

International Search Report and Written Opinion dated May 30, 2023, from International Application No. PCT/CA2023/050277, 7 sheets.

The extended European search report dated Sep. 27, 2022, from European Patent Application No. 20749339.6, 15 sheets.

International Search Report and Written Opinion mailed May 22, 2020, from International Application No. PCT/CA2020/050100, 11 sheets.

Non-Final Rejection dated Dec. 10, 2020, from U.S. Appl. No. 16/774,258, 28 sheets.

Notice of Allowance dated Jul. 26, 2021, from U.S. Appl. No. 16/774,258, 21 sheets.

Lightspeed Technologies, "Audio Solutions for Classroom Reopening Challenges", Duplicom Presentation Systems, https://www.duplicom.com/products/lightspeed-audio-solutions/, Aug. 27, 2020, 7 sheets.

Luis Guerra, Troy Jensen, "How to Use the Shure MXA910 Ceiling Array Microphone for Voice Lift", Shure Incorporated, USA, Created Sep. 2016, upated Jul. 2018, Shure Incorporated, 11 sheets.

Alberta Infrastructure, "Sound-Field Systems Guide for Classrooms", published in May 2004, 19 sheets.

The extended European Search Report dated Feb. 11, 2022, from European Patent Application No. 21204322.8, 7 sheets.

International Search and Written Opinion dated Jul. 18, 2022, from PCT/CA2022/050731, 8 sheets.

Communication pursuant to Article 94(3) EPC dated Feb. 29, 2024, from European Patent Application No. 21204322.8, 9 sheets.

Communication pursuant to Article 94(3) EPC dated Mar. 12, 2024, from European Patent Application No. 19808293.5, 6 sheets.

Theodoropoulos D et al.: "A reconfigurable beamformer for audio applications", 7th Symposium on Application Specific Processors, 2009. SASP '09. IEEE,, Jul. 27, 2009, pp. 80-87, XP031522047, ISBN: 978-1-4244-4939-2.

* cited by examiner

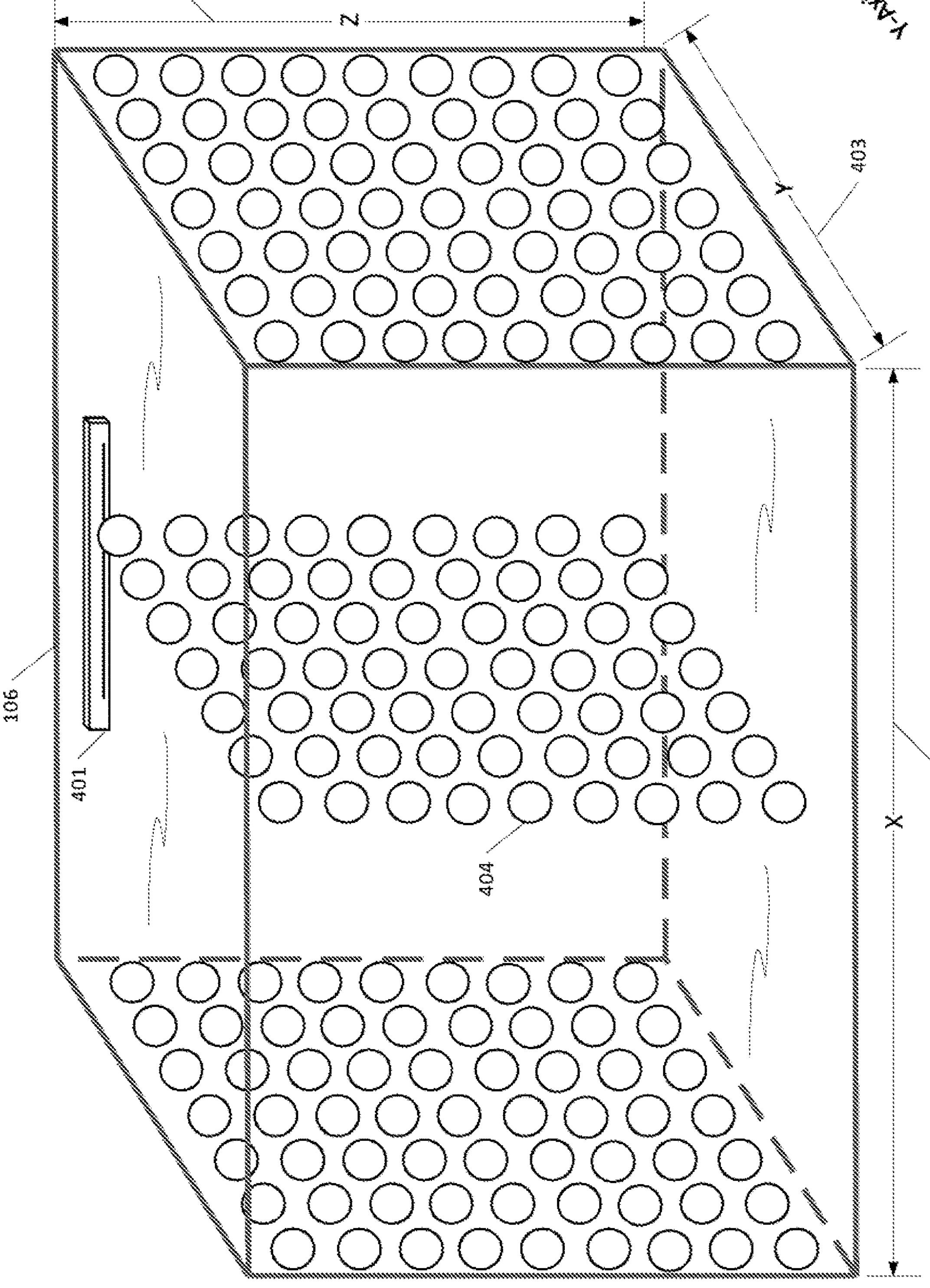
FIG. 4a Prior Art Bubble Processer 3D
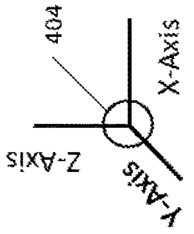
FIG. 4b

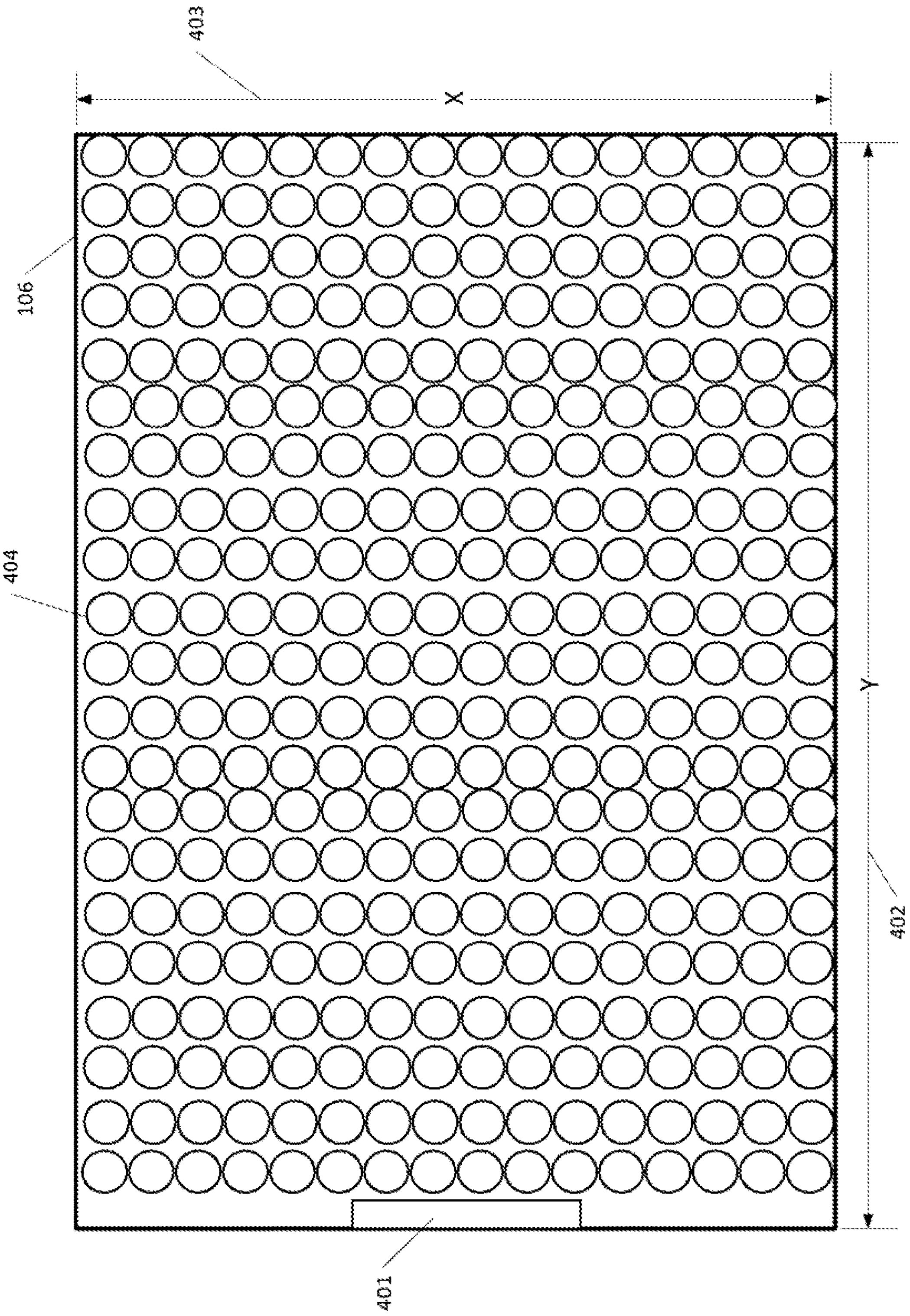
FIG. 4c Bubble Processer 2D top view
Prior Art

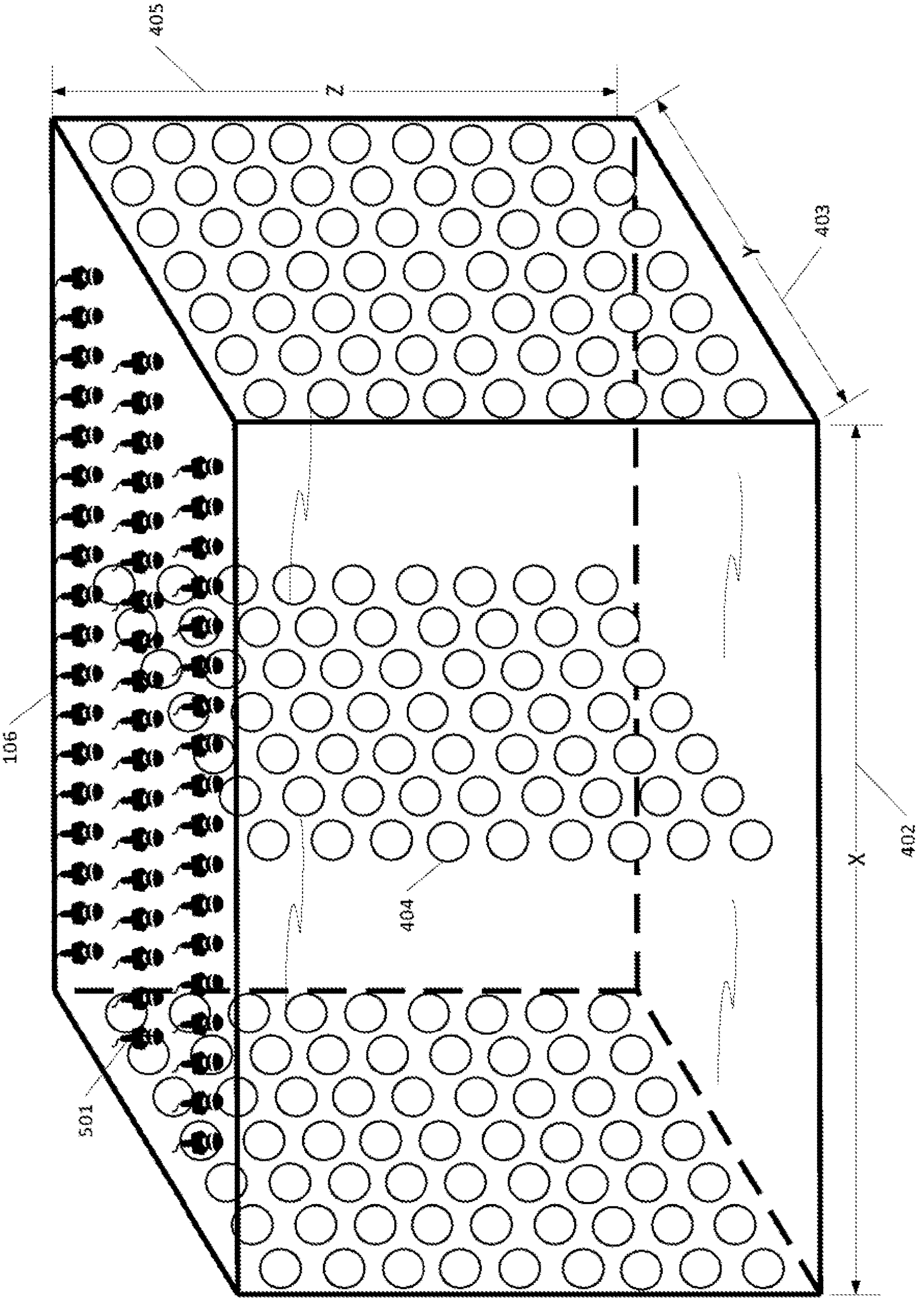
FIG. 5a Bubble Processer 3D distributed microphones – Prior Art

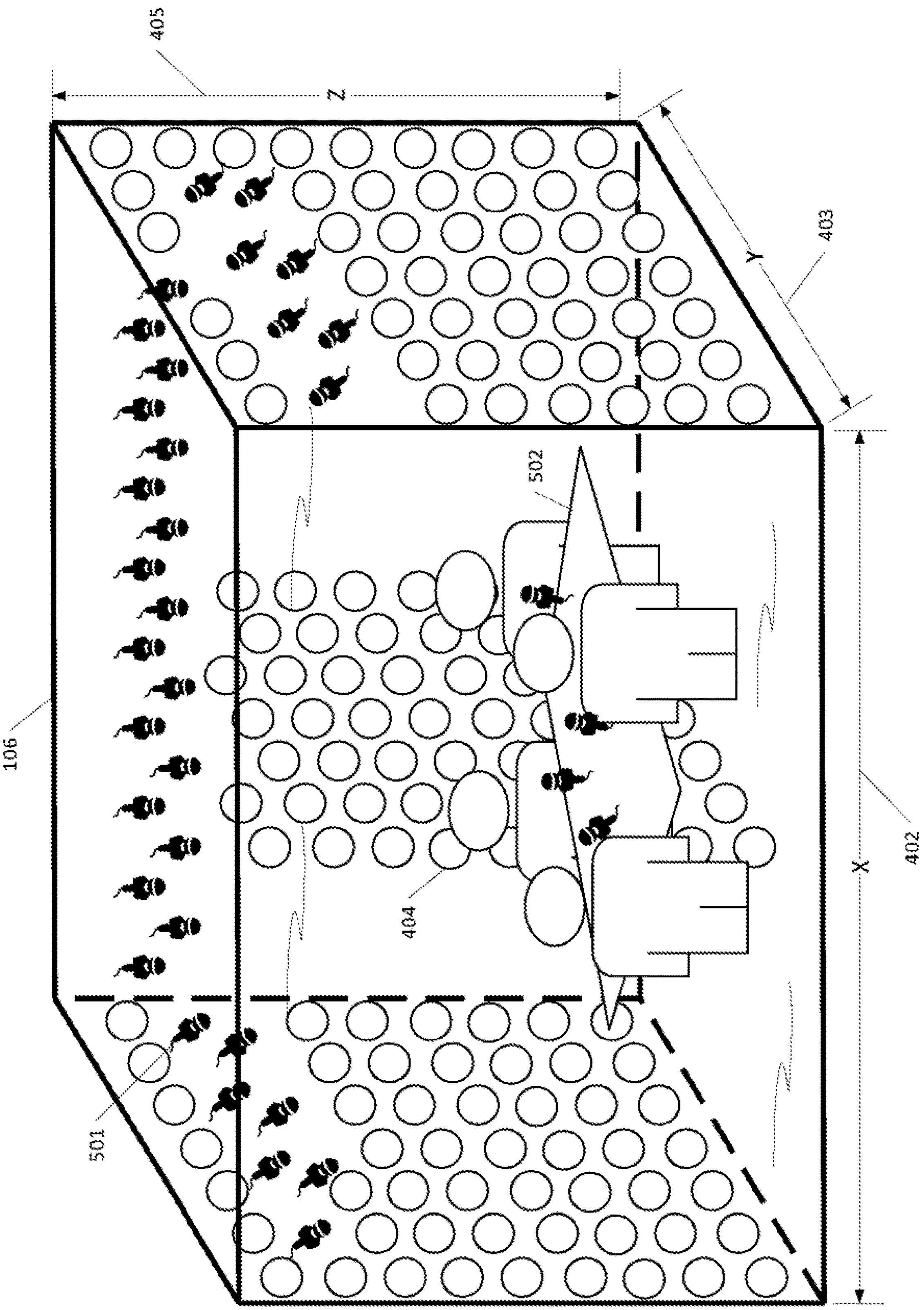
FIG. 5b Bubble Processer 3D distributed microphones – Prior Art

Top View Regional examples

Virtual Microphone

Region

Groups

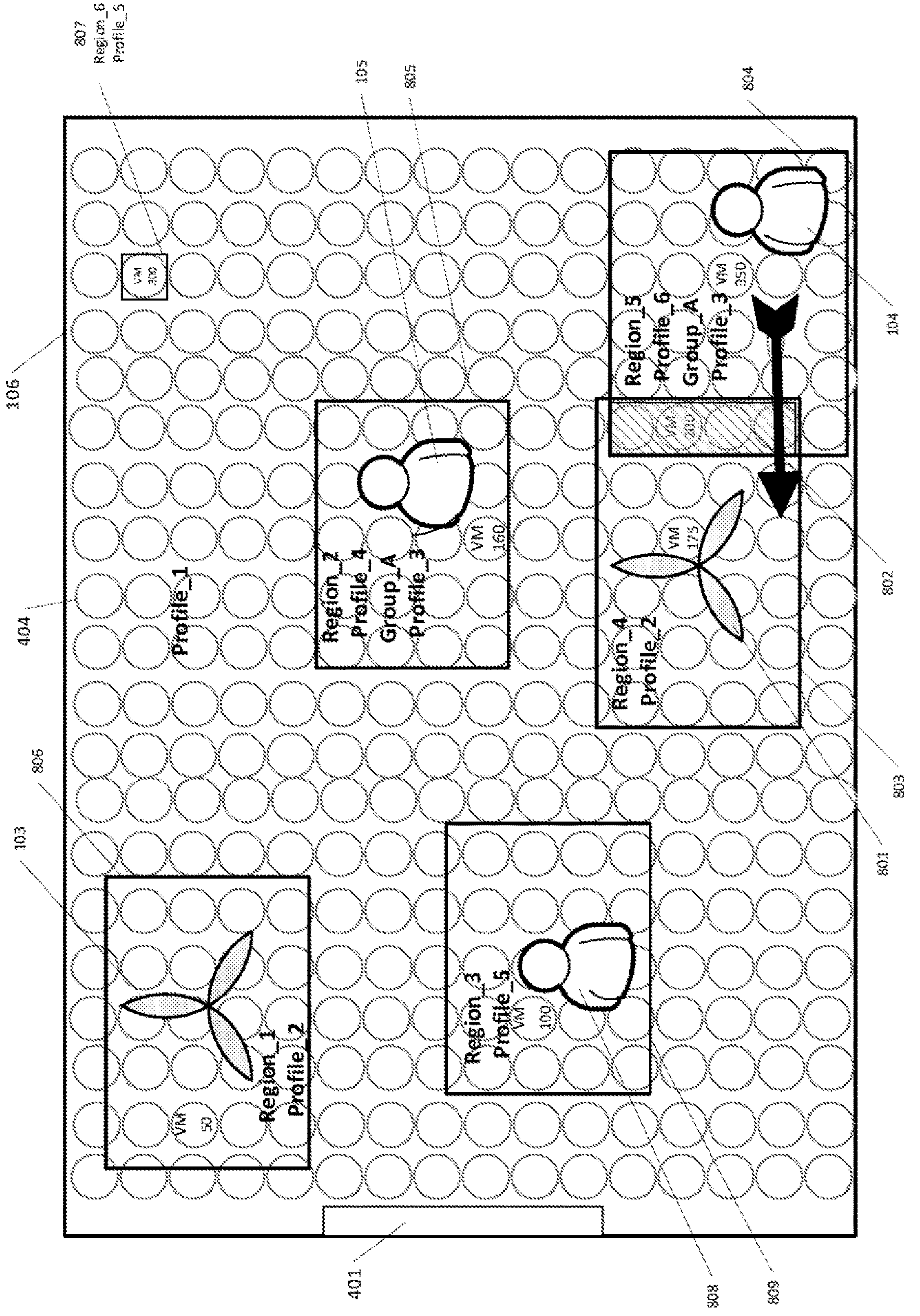
FIG. 8a Multi functions examples

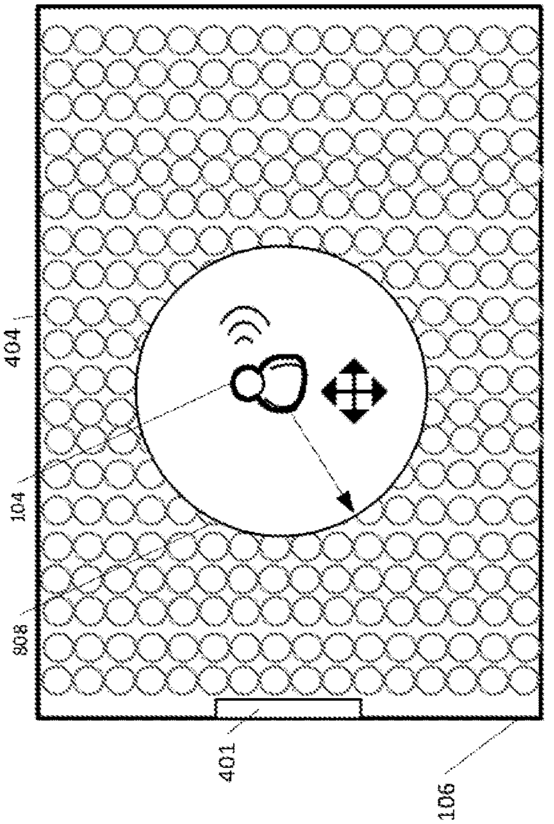
FIG. 8c VM X distance radius away
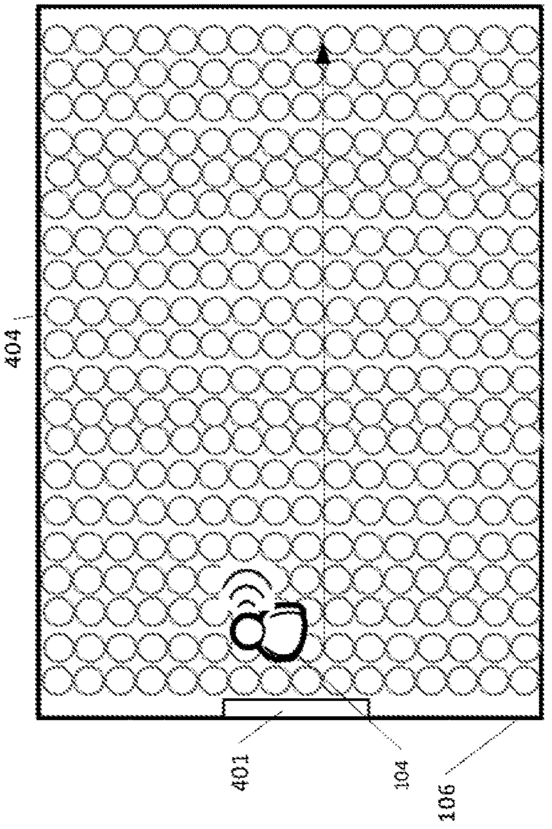
FIG. 8b Gain reduction ramp
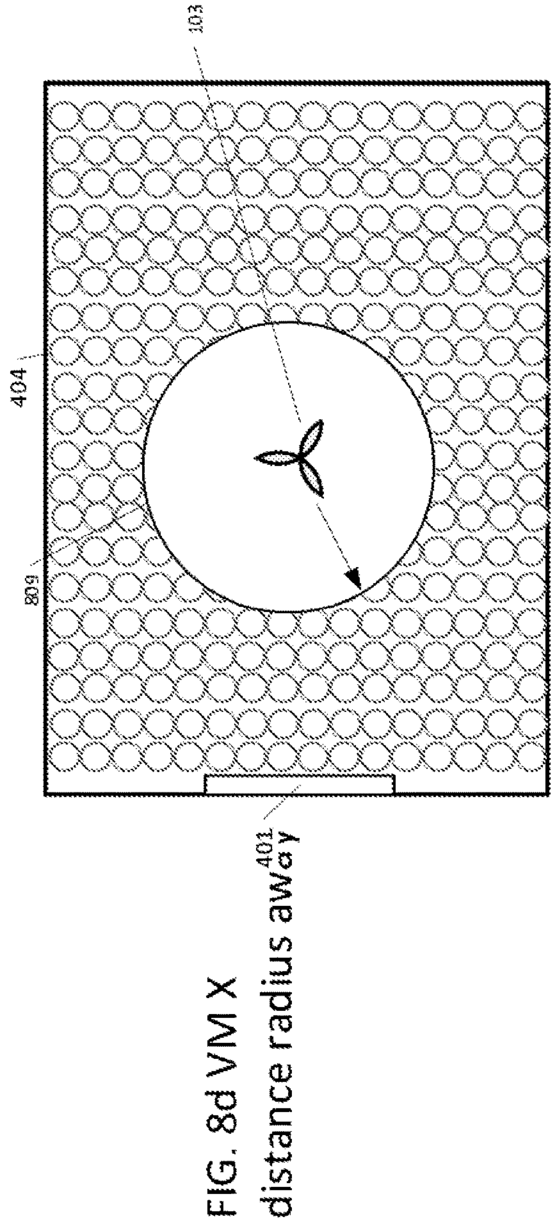
FIG. 8d VM X distance radius away FIG. 8e Multi functions per VM/region
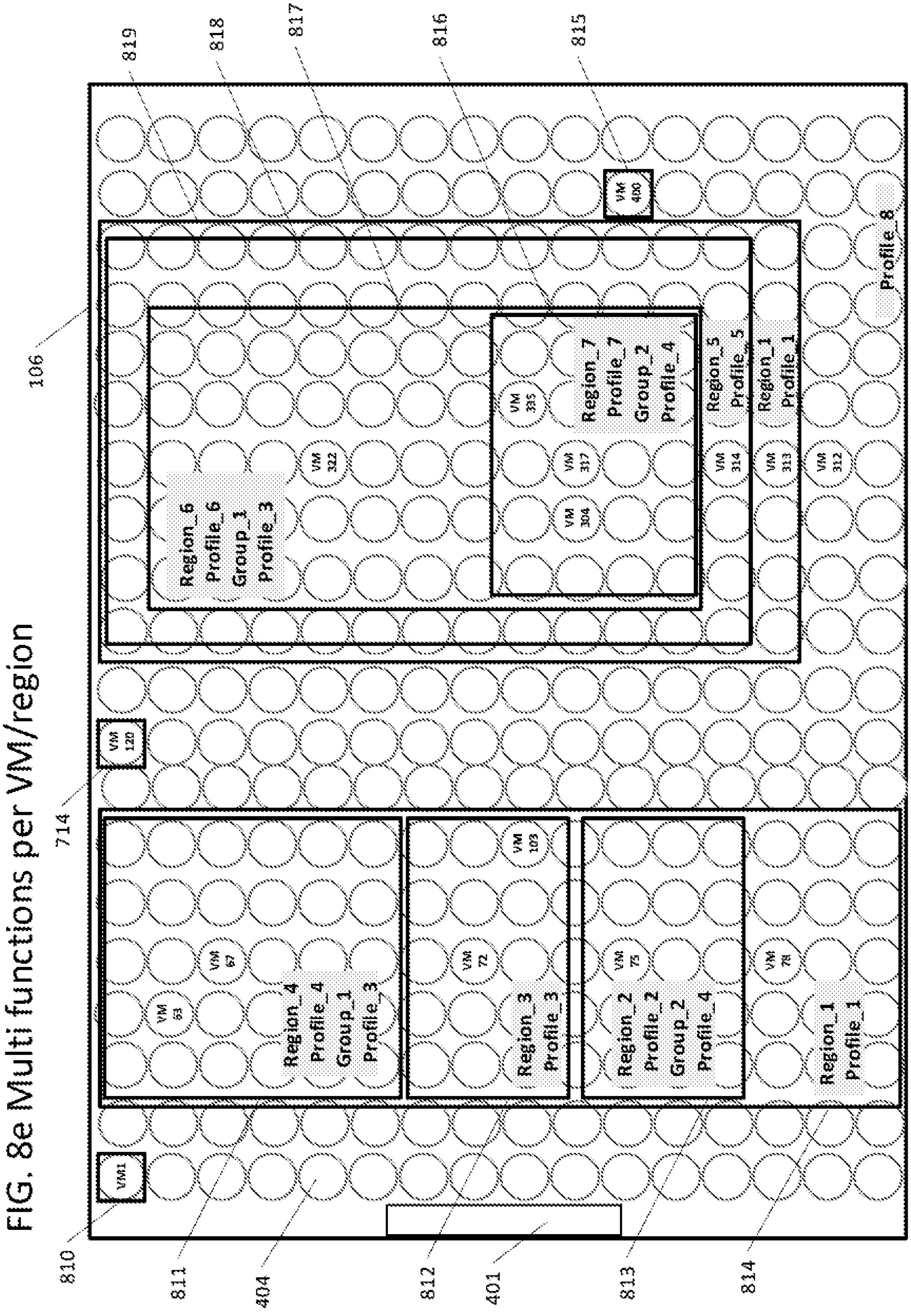

FIG. 9a Top view Regional examples
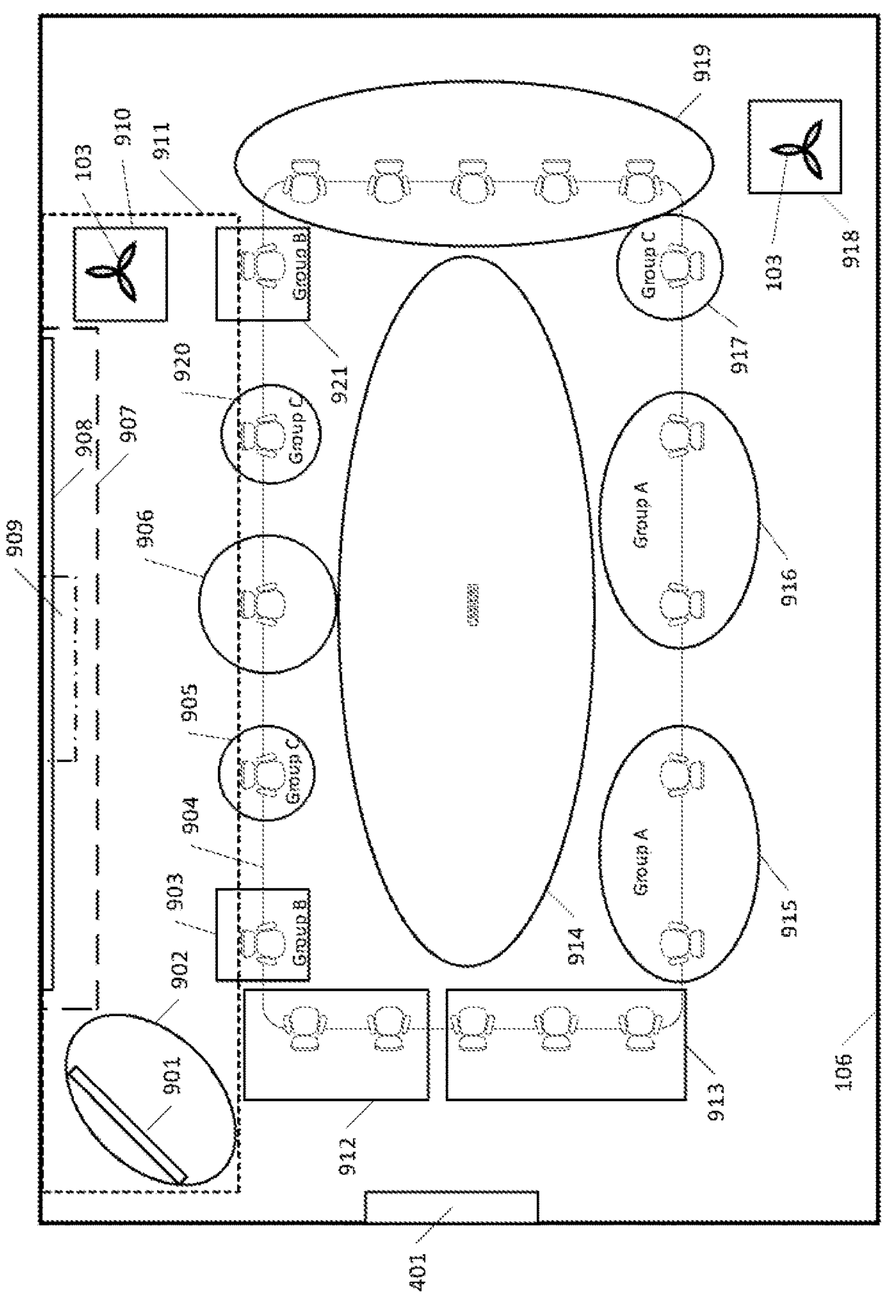
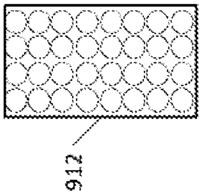
FIG. 9f
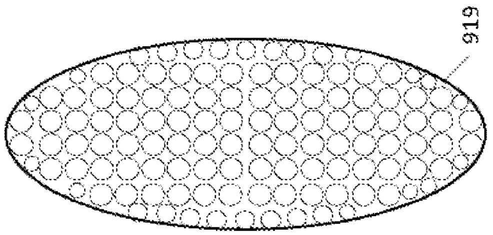
FIG. 9e
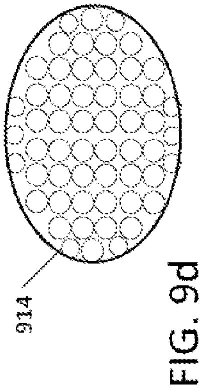
FIG. 9d
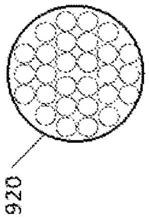
FIG. 9c
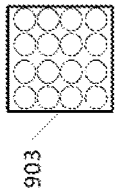
FIG. 9b Changing X and Y Dimension

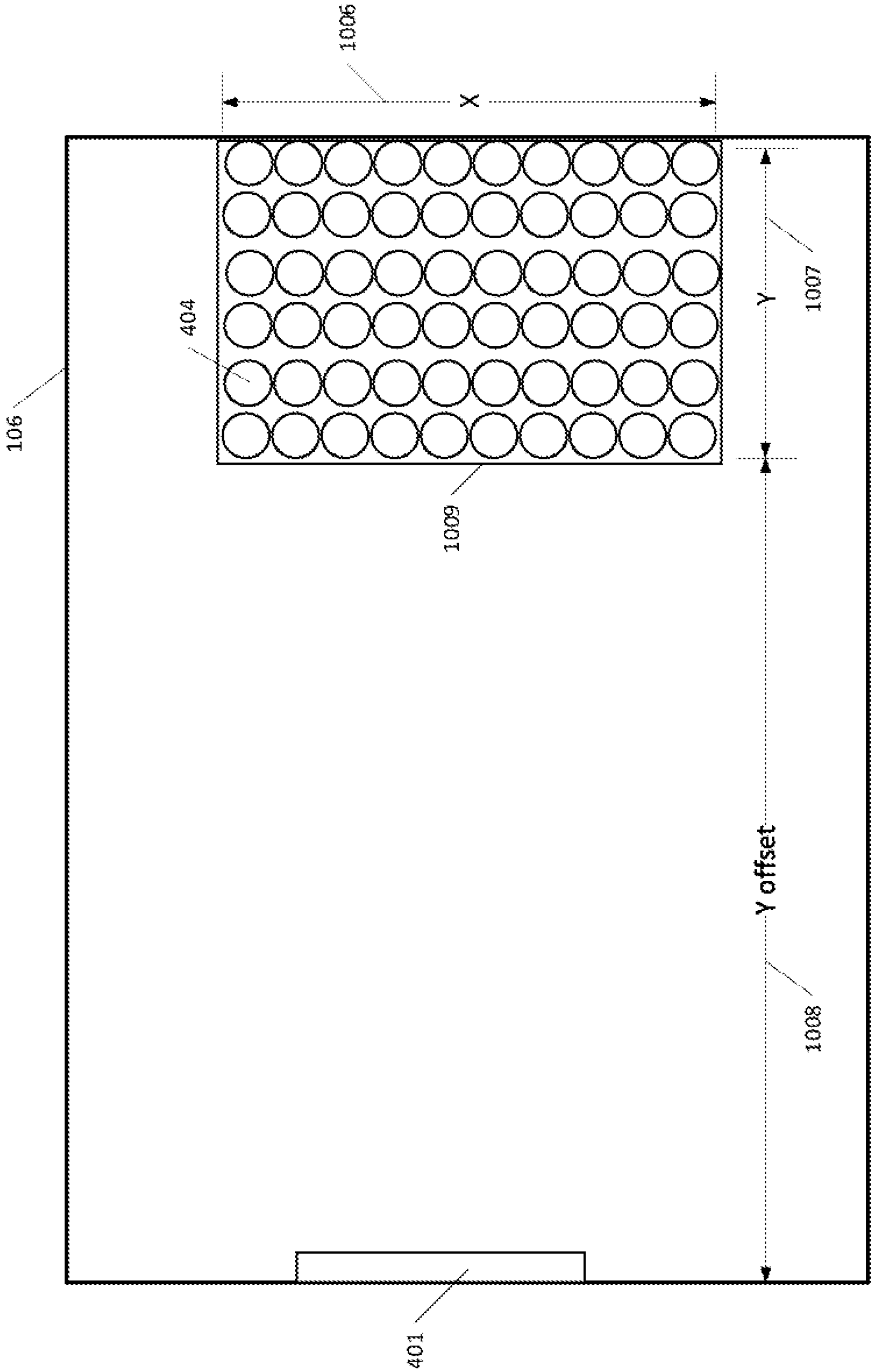
FIG. 10f Top View

Changing X and Y and z Dimension

Array Position 1

Array Position 1

Array Position 2

Array Position 2

Array Position 3

Array Position 3

Array Position 4

Array Position 4

Multi-array Position 5

Multi-array Position 5

Sideview

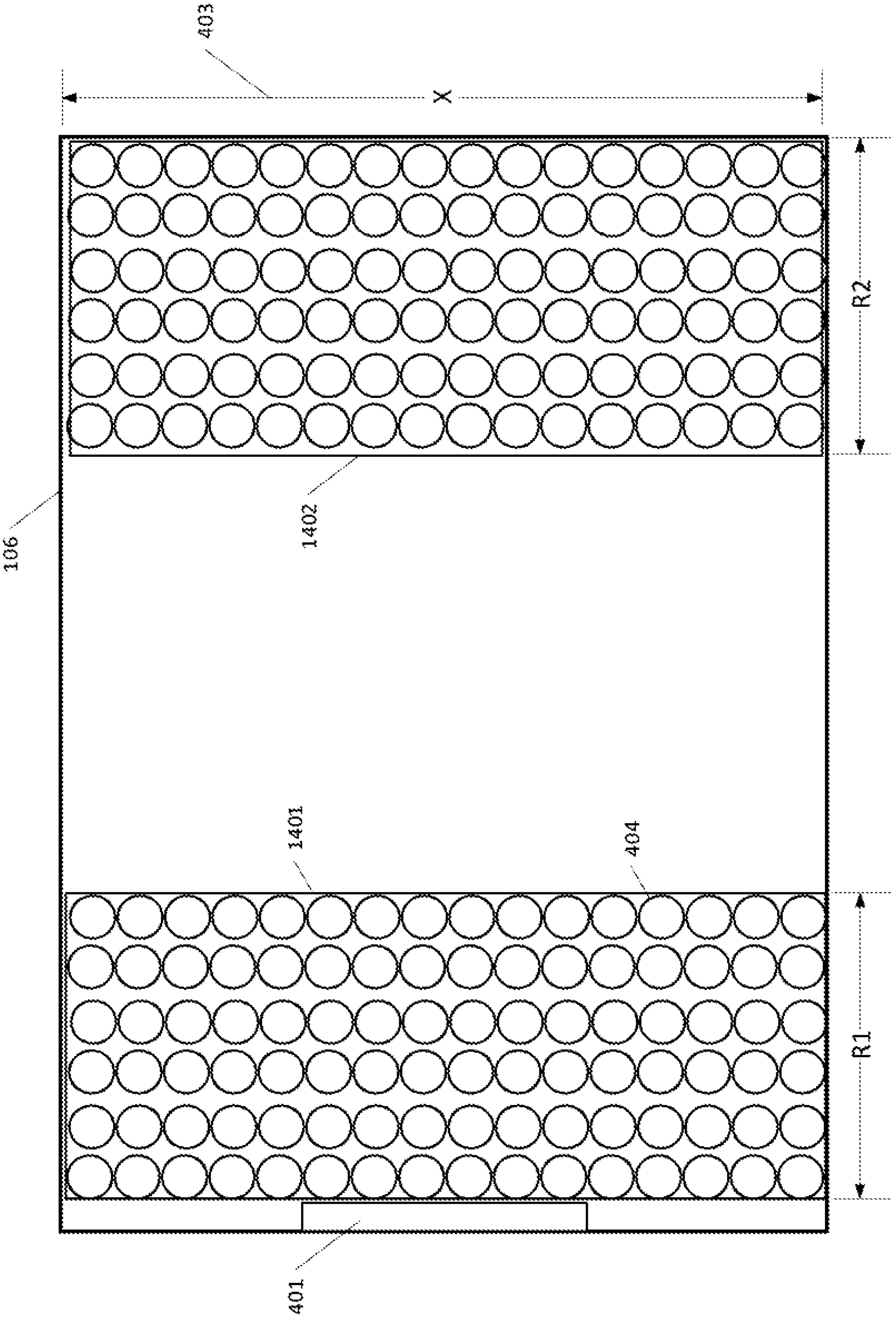
FIG. 14b (top down view)

Shows the circular coverage pattern

Side View - Microphone to micro-zone/bubble relationship perspective drawing with the axis of the microphone line in the middle of the circles FIG. 20 Object Profile Function Processing Flow
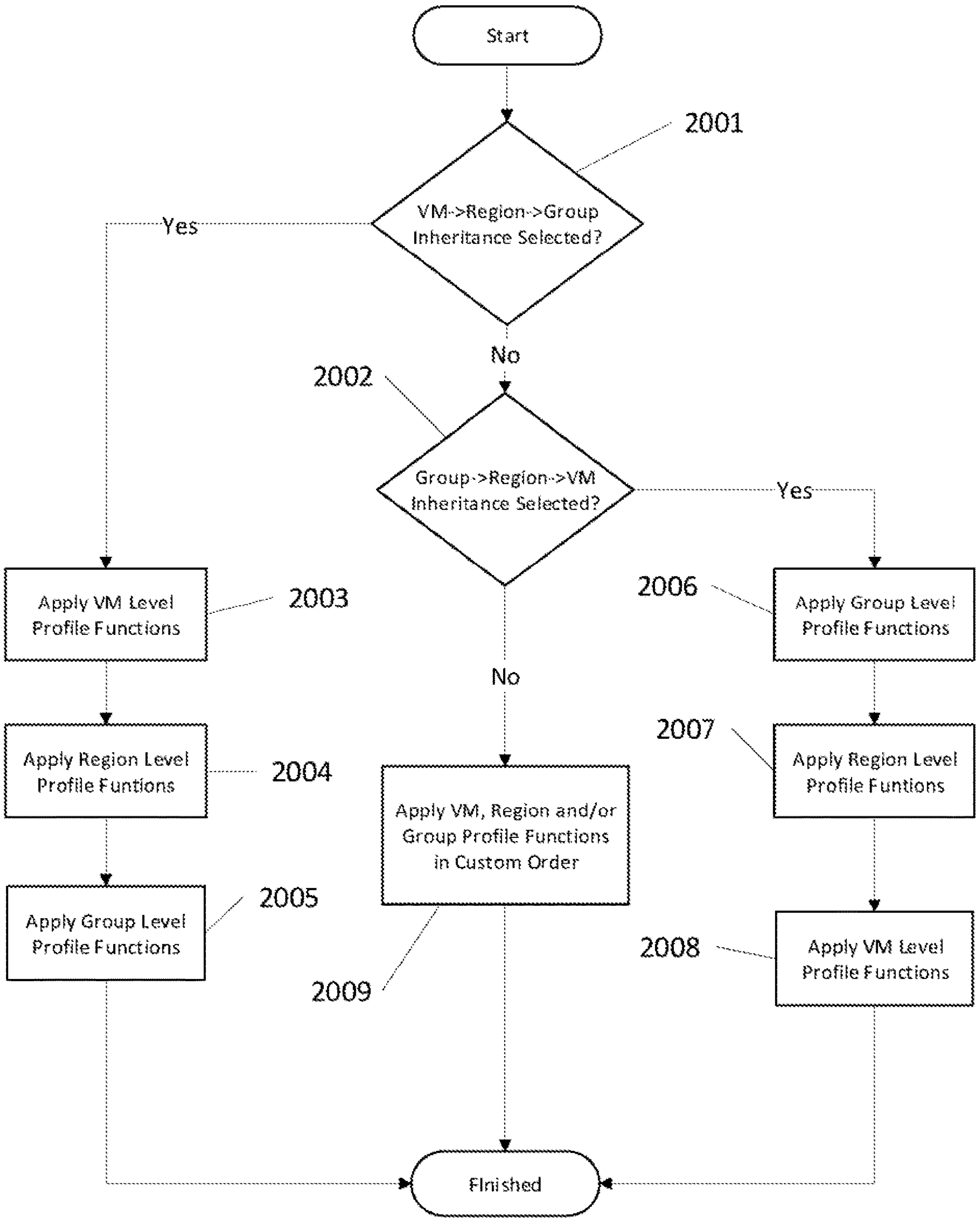

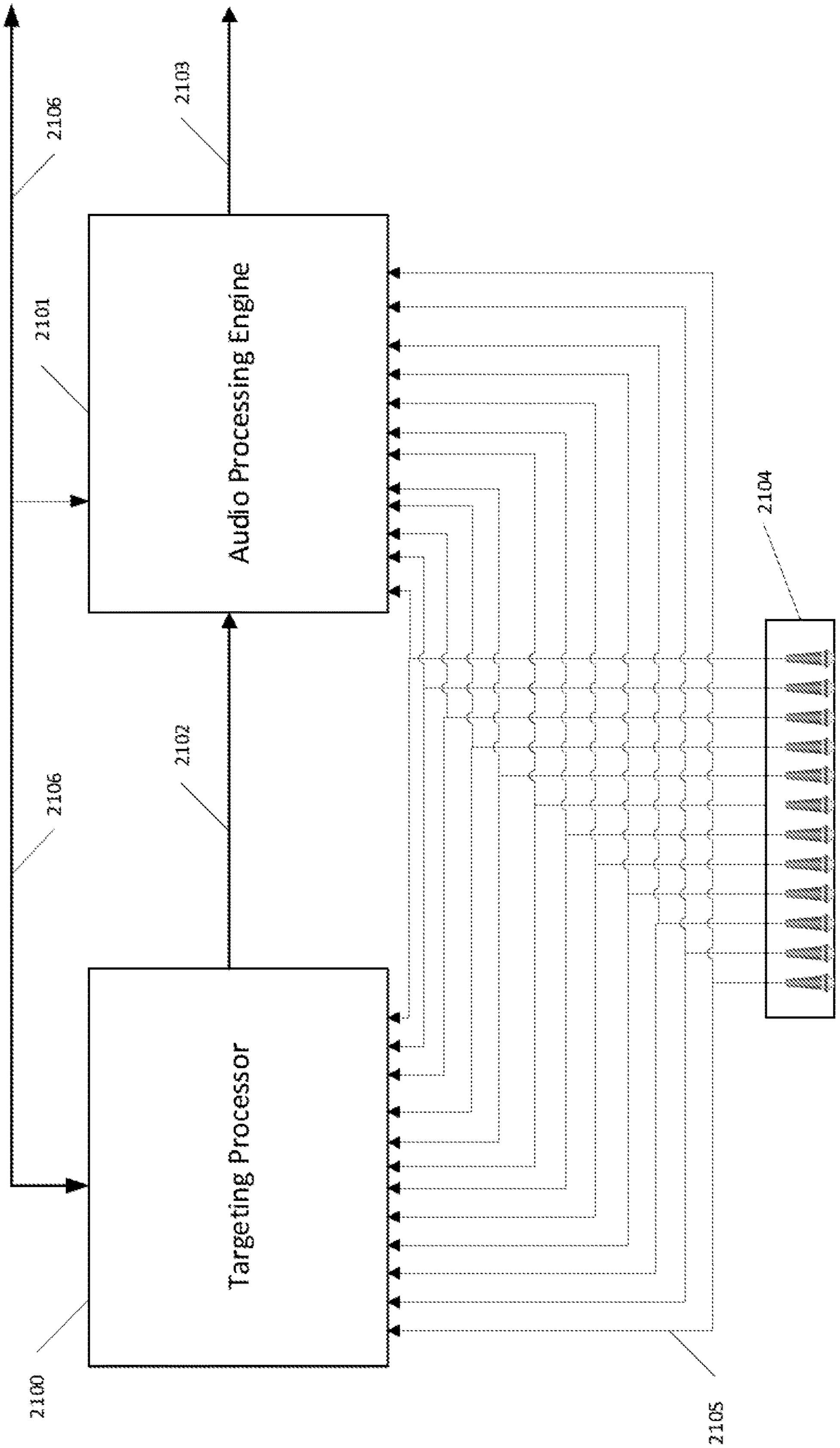
FIG. 21 Virtual Microphone Targeting and Audio Processing Architecture

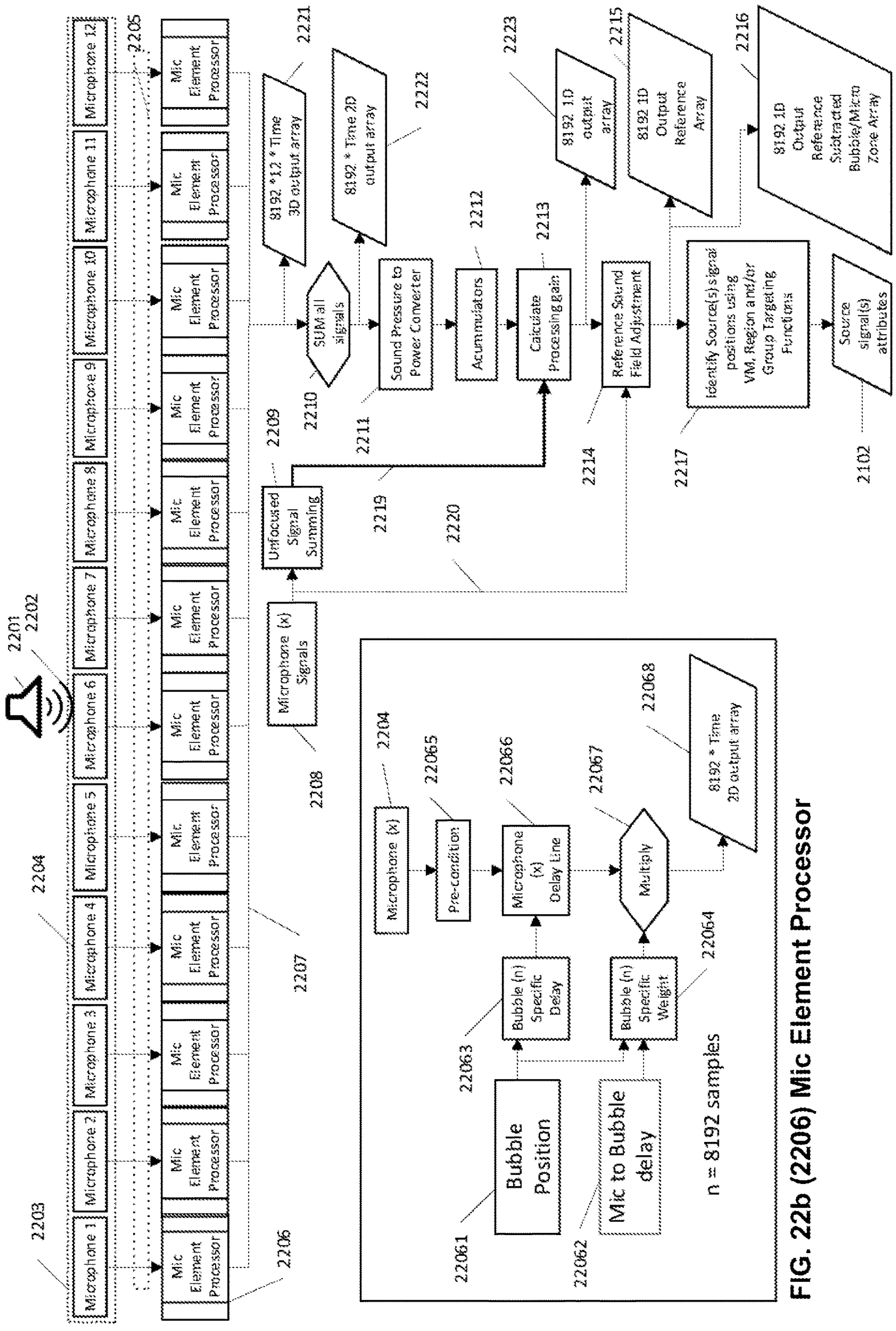
FIG. 22a (2100) Targeting (Bubble) Processor
FIG. 22b (2206) Mic Element Processor FIG. 23a Targeting Processor Flow (2217)
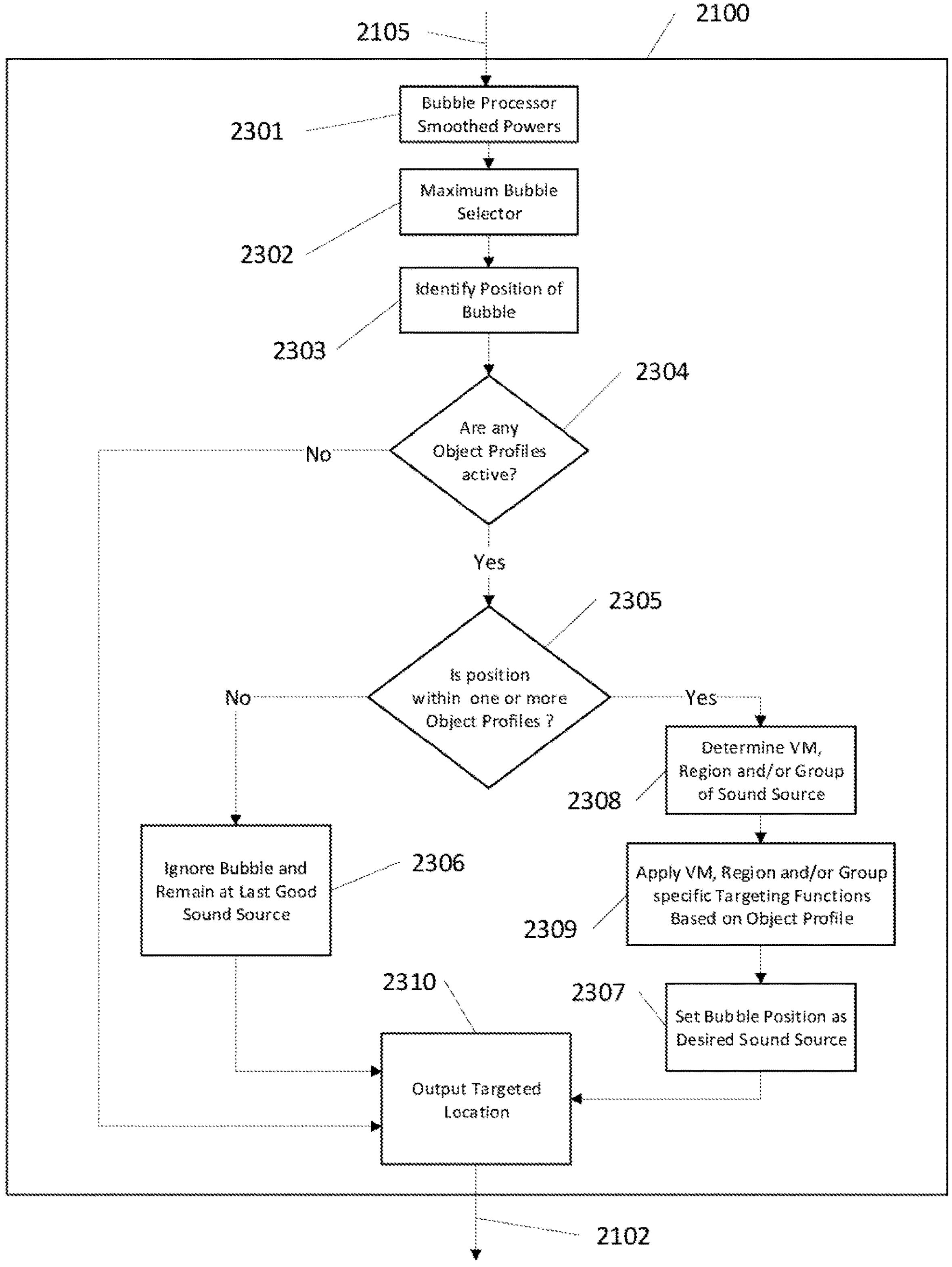

FIG. 23b Virtual Microphone Targeting Algorithm
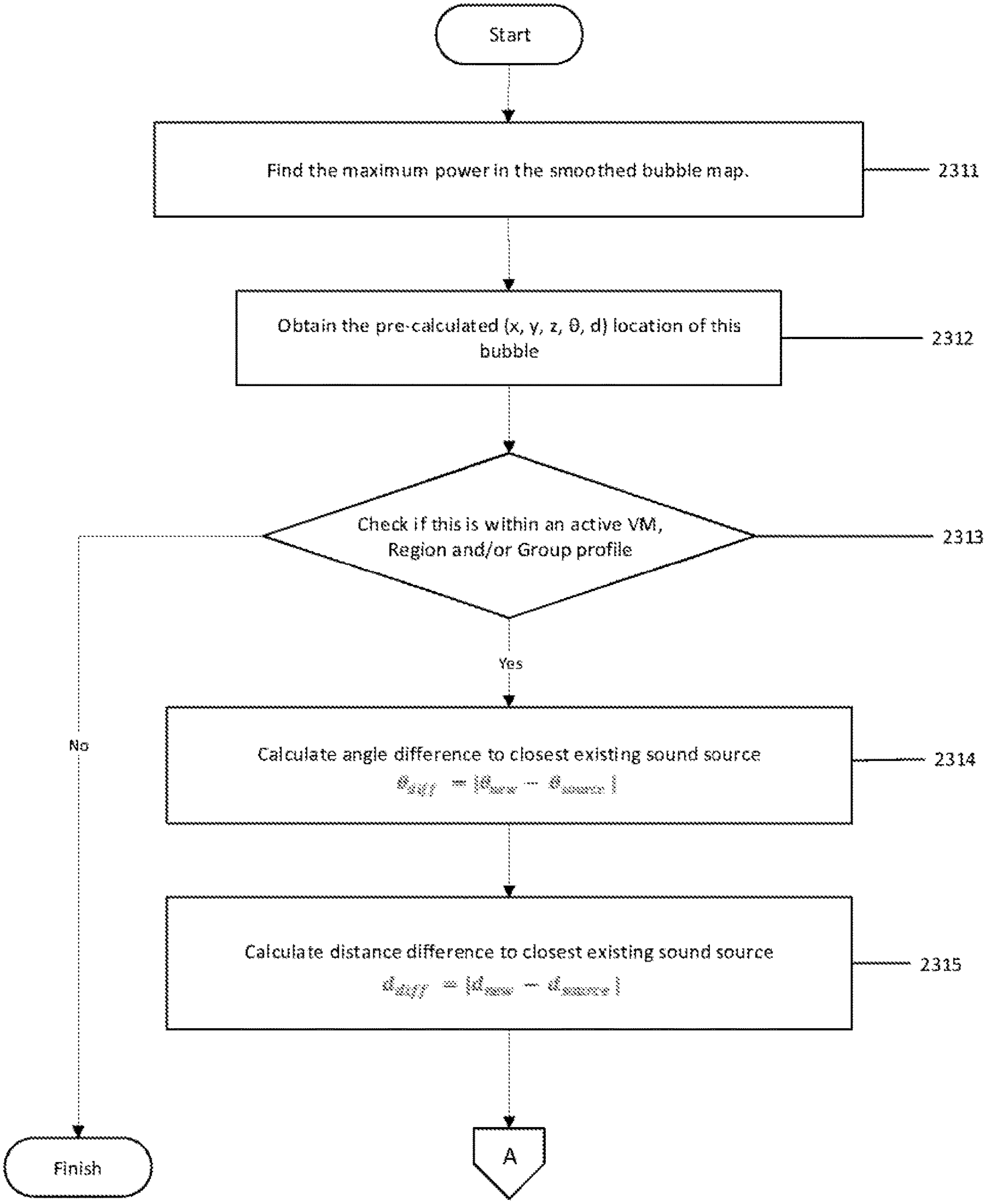

FIG. 23c Virtual Microphone Targeting Algorithm
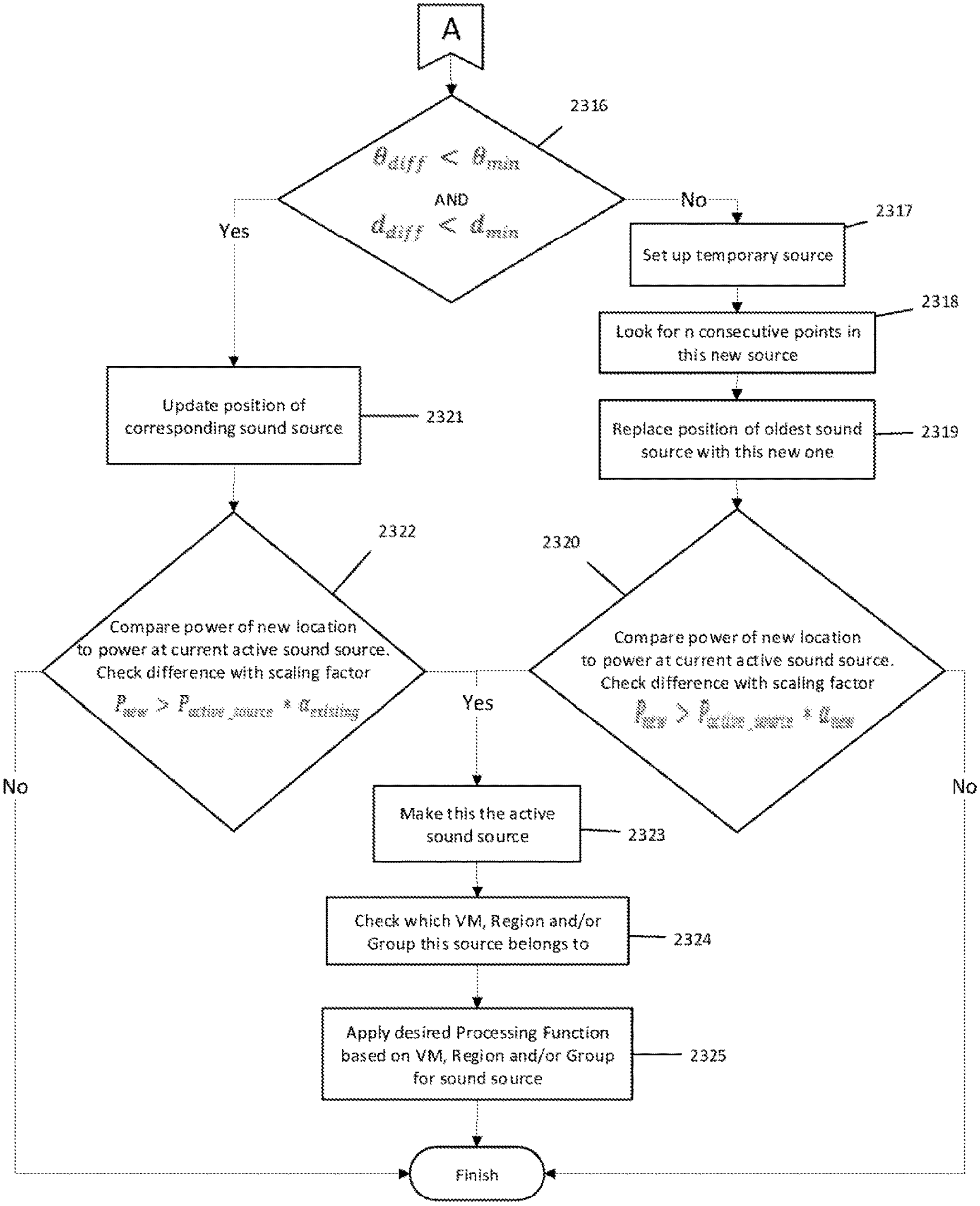

FIG. 24 Audio Processing Engine (2101)
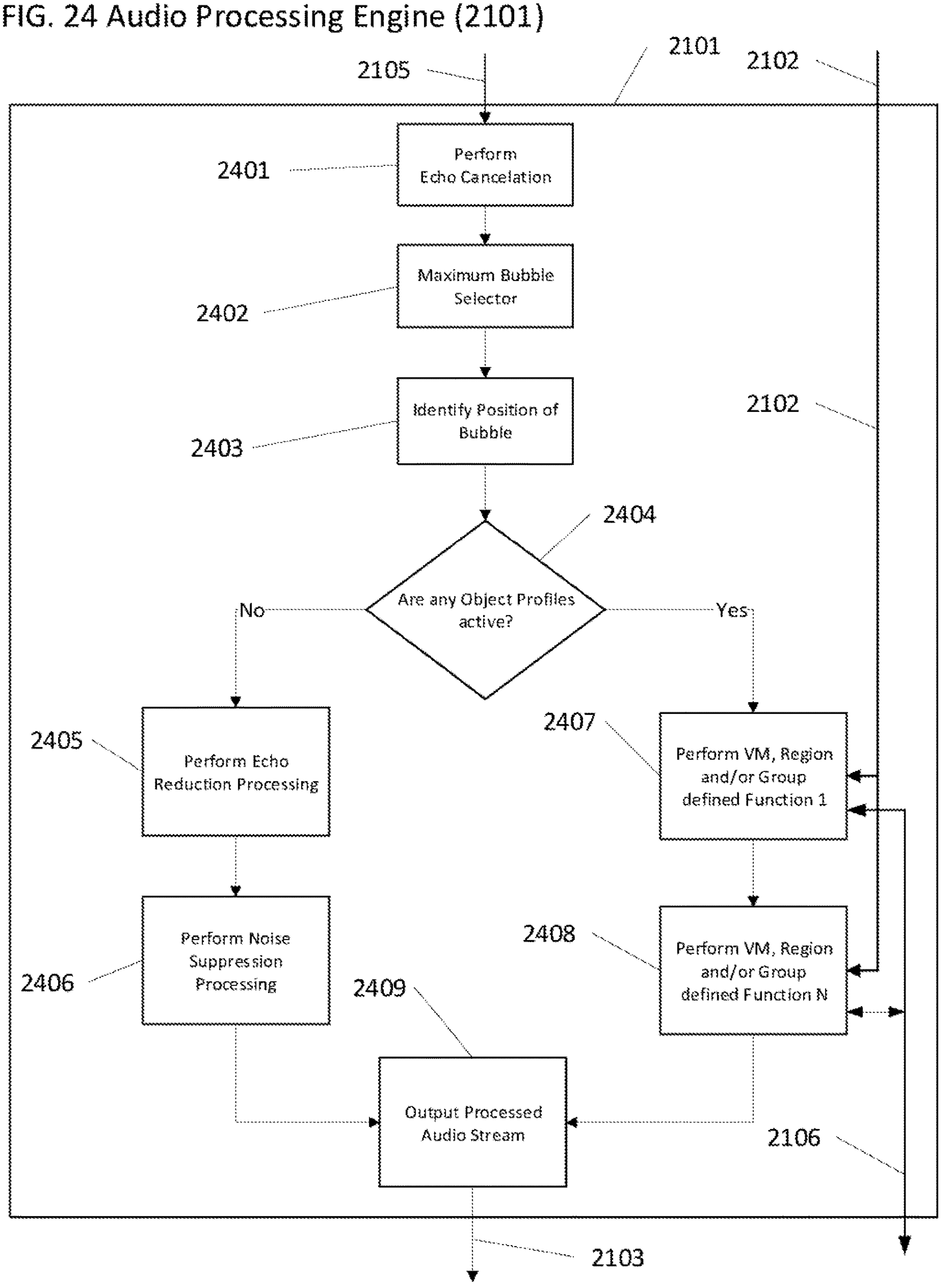

METHOD, APPARATUS AND COMPUTER-READABLE MEDIA TO CREATE AUDIO FOCUS REGIONS DISSOCIATED FROM THE MICROPHONE SYSTEM FOR THE PURPOSE OF OPTIMIZING AUDIO PROCESSING AT PRECISE SPATIAL LOCATIONS IN A 3D SPACE

CROSS REFERENCE TO RELATED APPLICATIONS

This application is a continuation application of U.S. patent application Ser. No. 16/774,258 filed Jan. 28, 2020, which claims priority to U.S. Provisional Patent Application No. 62/798,102, filed Jan. 29, 2019, the contents of which are incorporated herein by reference.

BACKGROUND OF THE INVENTION

1. Field of the Invention

The present invention generally relates to optimizing microphone audio pickup by utilizing a microphone system to establish precisely located focus regions (e.g., "bubbles") of any shape and/or size and/or location, which regions may be disassociated from the microphone system center of pickup for the purpose of intelligently applying any number of processing functions and attributes to the regions, resulting in optimizing desired sound sources while minimizing undesired sound sources in any 3D space and further allowing for integration points for other peripheral devices located in the same 3D space.

2. Description of Related Art

Locating, applying appropriate sound source specific signal processing, and maintaining reliable desired sound source pickup in non-deterministic (dynamic) environments has always been difficult to manage due to, but not limited to, variable space dimensions, dynamic seating plans, roaming sound sources, unknown number(s) of microphones and locations, unknown steady state and dynamic noise, variable desired sound source levels, sound sources in close proximity to each other, variable undesired sound source levels, and unknown reverberation characteristics. Typically, microphone systems need to be specifically selected, designed, and setup for each situation to manage optimum sound pickup within the dynamic environments to optimize desired sound source pickup while attempting to minimize unwanted sound source pickup. Typically, an audio engineer will attempt to match the microphone type to the situational requirements of the audio needs and the type of space in which the microphone system will be installed and will configure the microphone(s) to establish microphone pickup zones that attempt to optimize the desired sound source(s) and minimize the undesired sound source(s).

Traditional methods utilized by audio engineers typically approach the problem by creating multiple and specific microphone pickup zones, by installing distributed microphones to enhance sound pickup, with microphones located close to the desired sound sources, and the undesired sound sources are usually more distant, but not always. This can be difficult to configure because the sound sources are often dynamic and moving, and it can be very difficult to place distributed microphones for satisfactory performance for the desired sound source(s) and also accomplish undesired sound source minimization. Multiple discrete microphones can be one approach to creating a microphone zoning strategy which creates smaller zones that are located and maybe centered on the desired sound sources. This allows for good sound pickup; however, each sound source should have a microphone for best results, which increases the complexity of the hardware and installation. Usually, the system employs microphone switching and post-processing, which can degrade the audio signal through the addition of unwanted artifacts, resulting from the process of switching between microphones. If desired and undesired sound sources are equally distant from the microphone(s) (and even less desirable where the undesired sound source is closer to the microphone), then the microphone is typically unable to distinguish between the two sound sources, and both will be treated as if they are the same type of sound source. For example, the audio signal processing will need to be designed to handle an audio signal with a high degree of unwanted noise and distortion. The desired and undesired sound source will be seen as the same signal in the microphone system amplification chain resulting in the automatic gain control circuits controlling to undesired sound sources which could impact the audio signal negatively, such as driving the gain down when in fact the gain should be increased. The problem is even more pronounced when the user of the system wants to utilize an automatic speech recognition system (ASR) in the audio chain. However, if the undesired sound source is louder than the desired sound source the gain will be reduced, negatively affecting the pickup of the desired sound source. Any sort of filtering algorithms and signal processing applied to the microphone signal to deal with the undesired sound source signals will also typically impact the overall microphone signal and could cause some level of artifacts and distortion of the desired sound source signal as it is difficult to remove unwanted signals without affecting the desired signals. So, ideally, it would be best to have the microphone situated as close as possible to the desired sound source to minimize the impact of the undesired sound source which is not always possible when the sound sources are mobile and moving in the shared space. It should also be noted there is a significant limitation with this approach in that physical microphone devices must be located within the configured zones and generally, due to microphone properties, need to be centered within the configured zone. This limitation severely restricts the configuration of the zone and/or physical placement of the microphone resulting in comprised audio performance or unpleasing aesthetics for the customer.

Another method to manage picking up desired sound sources in such environments is with microphone beamforming arrays. The array is typically located on a wall, table, or ceiling environment. The arrays can be steered to help direct the microphones to desired sounds, so sound sources can be tracked and, theoretically, optimized for dynamic participant locations. Beam forming microphone arrays are used in the current art to create zones that try to separate out desired sound sources by direction and reject undesired sound sources located outside of the microphone beam. The audio engineer typically attempts to optimize the beams, so the center axis of the beam is directed at the desired sound source locations. Sound sources outside of the beam (off axis) are rejected by design. For this to work, the desired sound source should be closer to the beam former array than the undesired sound source; otherwise, the beam former will focus on and adjust to the undesired sound source. When this happens, the beam forming microphone and amplification systems react in very similar ways as a discrete microphone system.

In the current art, beam forming microphone arrays are often configured in specific geometries to create microphone beams that can be steered towards the desired sound. The advantage of a beam array is a gain in sound quality with a relatively simple control mechanism. Beams can only be steered in one dimension (in the case of a line array) or in two dimensions (in the case of a 2-D array). One disadvantage of most beam forming arrays is that they cannot precisely locate a sound in a room; only its direction and magnitude. This means that the microphone array can locate the general direction as per a compass-like functionality, giving a direction vector based on a known sound source, which is a relative position in the environment. This method is prone to receiving equally, direct signals and potential multi-path (reverberation), resulting in false positives which can potentially steer the array to pick up undesired sound sources.

Another drawback in beamforming systems is that the sound source direction is a general measurement, and the array cannot distinguish between desirable and undesirable sound sources in the same beam, resulting in all signals received having equal noise rejection and gain applied. If multiple sound sources are emitting in the same beam, it becomes difficult to steer the array to an optimal location, especially if the sound sources are on opposite sides of the room (near and far). Further, the undesired sound source and the desired sound source levels will be different between pickup beams, requiring post-processing which can add artifacts and processing distortion since the post processor normalizes the different beams when trying to account for variances and minimize differences to the audio stream. Since the number of microphones used tends to be limited due to costs and installation complexity, this creates issues with fewer microphones available to do sound pickup and location determination. Another constraint with the current art is that microphone beam former arrays do not provide even coverage of the environment due to design considerations of typical beam forming microphone arrays (typically, a fan-shaped beams pattern) requiring microphones to be located in close proximity to each other. Installation of 1000s of physical microphones is not typically feasible in a commercial environment due to building, shared space, hardware, and processing constraints where traditional microphones are utilized, through normal methods established in the current art.

Beamforming microphone arrays are typically limited to the size and shape of the zone that can be created (e.g., square or rectangular rooms) and the zone is always attached to the center of the physical microphone plane of the beam-former array, as a design constraint. Discrete microphones are also constrained to have their zones being anchored to the physical microphone system elements. This may result in the microphone system not being able to isolate sound sources properly, and treating desired sound sources (persons) and undesired sound sources (semi-constant sound sources like fans, etc.) the same. Because the microphone system is typically not able to differentiate desired sound sources from undesired sound sources, this can result in the microphone system reacting to undesired sound sources, preventing the microphone system from passing the correct sound source signal to the audio processing engine and negatively affecting factors such as, but not limited, to automatic gain control and noise filtering parameters.

In the case of an omni-directional microphone system, which is limited to a single zone per physical microphone, all sound sources are typically picked up with unity gain and will have equal effect on the audio amplifier, automatic gain control processing, and noise filtering processes. Potentially, this can significantly degrade the audio signal and prevent the system from focusing on and capturing the desired sound source. If the undesired sound source is louder than the desired sound source, the problem is even further magnified, and complex post audio processing may be required, which may be able to address some of the audio signal problems usually at the expense of adding other distortions to the audio signal. In the current art, to solve this problem, multiple discrete microphones can be distributed throughout the shared space, and/or adaptive or fixed directional types of microphone systems can be deployed including, but not limited to, beam-formers, directional microphones, and arrays. These solutions can work well in very specific environments; however, they have proven insufficient in overall performance and may not be able to be adequately positioned for optimum desired sound source audio pick-up while minimizing undesired sound source pick-up.

To help address this situation, typical microphone systems in the current art will track and identify the sound source with the largest amplitude, power, and/or gain signal, and then adjust all audio and filtering parameters accordingly. If the undesired sound source is louder than the desired sound source, the microphone system parameters will be adjusted for the undesired sound source and will be incorrect and not optimal for when and if the microphone system switches to the desired sound source.

If the undesired sound source is located closer to or between the desired sound source and the microphone system, the ability of the microphone system to target and focus on the desired sound source becomes even more problematic.

Further complex scenarios manifest when the sound space environment is uncontrolled (e.g., open-air venues) and dynamic in nature such that the addition of incremental desired sound sources and undesired sound sources increases the opportunity for the microphone system to pick up sound sources that are not desired, potentially creating environments outside the design criteria of the microphone system, or the system is just not able to properly handle with predetermined microphone system settings, positioning, and number of microphones deployed. This situation potentially results in improper sound source pickup, improper pickup zone activation, and the potential to ignore or block desired sound sources from being detected by the microphone system.

Multiple sound sources can create a complex and difficult situation for the microphone system to locate, identify, and pick up the desired sound source(s) as well as apply the appropriate level of audio signal processing in the presence of undesired sound source(s), and highlight where disassociated spatial regions of any shape or size would be beneficial.

For example, see U.S. Pat. No. 10,063,987, issued Aug. 28, 2018, for further descriptions of the problems and proposed solution(s); the entire contents of which patent are incorporated herein by reference.

Thus, the current art is not able to provide the granularity of sufficient desired sound source targeting and the precise audio performance processing in regard to acceptable audio pick-up and communication taking into account multiple undesired and desired sound sources in complex shared sound spaces.

SUMMARY OF THE INVENTION

An object of the present embodiments is to allow for a substantially improved desired sound source(s) signal isolation and processing in the presence of dynamic and complex undesired sound sources, regardless of the dynamic nature of the environment in which the microphone system is deployed. And, more specifically, it is an object of the invention to preferably establish, on a per virtual microphone basis, and/or per configured spatial region basis, and/or configured logical group basis, an audio processing regime that may be dissociated from the center of the microphone system. Preferably, each such basis comprises attributes and functions which substantially optimize the position, shape, and size of the sound field pickup regions and the signal processing for both desired and undesired sound sources in a 3D space.

This ability to use attributes and functions on a per virtual microphone basis, and/or spatial region basis, and/or logical group basis, by the microphone system processor overcomes many limitations of the prior art, which is limited to generalized zoning and global audio signal processing methods.

According to one aspect of the present invention, shared spaces and multi-use environments contain a combination of desired and undesired sound sources. Throughout the environment a plurality of virtual microphones can be distributed and configured utilizing virtual microphone profiles, and/or region profiles, and/or group profiles. The virtual microphones can be configured into any number of regions of any position, shape, or size, where attributes and functions can be assigned and executed to determine how each virtual microphone, region, and group will be optimized. Using this configurability and processing, desired sound sources can be isolated and optimized while undesired sound sources can be isolated and minimized in the microphone system.

By minimizing the possibility that generalized audio processing will be applied to both the desired sound source(s) and the undesired sound source(s) within the limited larger zone configurations typical in the current art, the microphone system can be specifically tuned and optimized for room configurations and sound source specific characteristics and locality with in the environment which results in highly optimized control and processing of audio pickup in the shared 3D space.

Typical solutions in the current art attempt many methods to isolate and optimize desired sound source pickup while trying to reduce the effects of unwanted sound sources. However, these methods utilize microphone topologies and algorithms which are typically limited in their ability to create precise enough regions in the 3D space that can be specifically positioned, shaped, and controlled. Further exasperating the problem as a result of imprecise zones, systems in the current art are often limited to applying complex unnecessary audio processing techniques to deal with the multitude of potential sound sources contained within the zone. In contrast, a notable aspect of the present embodiments is to be able to create a multitude of very precisely-positioned regions of configurable shape and size that can be configured to execute optimized functions to deal with the specific sound sources within the spatial region.

According to a further aspect of the present invention, the spatial region field may be a 2D (x, y) field.

According to another aspect of the present invention, the spatial microphone-zone sound field may be a 3D (x, y, and z) field.

According to yet another aspect of the present invention, the object profiles can contain any number of attributes, functions, or combination of attributes and functions. Profiles can be global in nature and can be accessed by any object type in the system.

According to yet another further aspect of the present invention, logical groups can be created which can contain any number and arrangement of virtual microphones, regions and other logical groups.

The present invention preferably provides one or more real-time, adaptable, configurable, profiles for virtual microphones, and/or regions, and/or logical groups, in order to optimize and isolate desired sound sources in the presence of undesired sound sources, and thus allowing for a microphone system that can be tuned and configured to allow a plurality of very specific functions to be applied at any point in the 3D space.

The preferred embodiments comprise both algorithms and hardware accelerators to implement the structures and functions described herein.

According to an aspect of the present invention, method, apparatus, and computer-readable media for focusing combined sound signals from a plurality of physical microphones in a shared 3D space in order to determine audio signal processing profiles to optimize at least one sound source in the shared 3D space, includes at least one microphone input that receives plural microphone input signals from the plurality of physical microphones in the shared 3D space. At least one processor is coupled to the at least one microphone input and receives the plural microphone input signals. The at least one processor determines plural virtual microphone bubbles in the shared 3D space, and defines one or more virtual microphone bubble object profiles which comprise(s) specific attributes and functions which define audio processing functions for each virtual microphone bubble, each bubble object profile including: (a) an individual virtual microphone bubble object profile when the individual virtual microphone bubble has been configured for an individual virtual microphone bubble; (b) a region object profile when the virtual microphone bubble has been configured for a region of one or more virtual bubble microphone(s); and (c) a group object profile when the virtual microphone bubble has been configured for a group having one or more virtual microphone bubble microphone(s). The at least one processer processes the audio signal processing functions for the at least one virtual microphone bubble, based on the received sound signals, for any combination of (a), (b), and (c); The at least one processor outputs a processed audio stream for the at least one virtual microphone bubble. According to another aspect method, apparatus, and computer-readable media for focusing combined sound signals from a plurality of physical microphones in order to determine audio signal processing parameters for a plurality of virtual microphone locations in a shared 3D space. At least one processor is preferably configured to define at least one or more (preferably a plurality) of virtual microphone bubbles in the shared 3D space, each bubble having location coordinates in the shared 3D space, each bubble corresponding to a virtual microphone. A sub-plurality of virtual microphone bubbles is defined in the shared 3D space, the sub-plurality being remote from locations of the plurality of physical microphones. At least one audio signal processing function is assigned to each of the virtual microphones in the sub-group. A plurality of streamed signals is output comprising (i) real-time location coordinates, in the shared 3D space, of the sound source, and (ii) sound source audio signal processing parameters associated with each virtual microphone bubble in the shared 3D space.

BRIEF DESCRIPTION OF THE DRAWINGS

FIGS. 4*a*, 4*b* and 4*c* are, respectively, prior art diagrammatic illustrations of a plurality of virtual microphones mapped to a 3D sound field.

FIGS. 5*a* and 5*b*, are, respectively, prior art examples of virtual microphones mapped to a 3D sound field utilizing distributed microphones.

FIGS. 8*a*, 8*b*, 8*c*, 8*d*, and 8*e* are further diagrammatic illustrations of examples of embodiments of the present invention demonstrating complex combinations of profiles applied to multi-regional nested and overlapped sound field regions.

FIGS. 9*a*,9*b*, 9*c*,9*d*, 9*e*, and 9*f*, are diagrammatic illustrations of 3D regional sound fields with functions applied to form 3D variable dimensioned and positioned sound field regions and groups in a 3D shared space.

FIGS. 10*a*,10*b*, 10*c*, 10*d*, 10*e*, 10*f*, and 10*g* are diagrammatic illustrations of 3D regional sound fields with functions applied to form 3D variable dimensioned and positioned sound field regions in a 3D shared space.

FIGS. 14*a* and 14*b* are diagrammatic illustrations of a 3D regional sound field with functions applied to form multiple columns of 3D dimensioned and positioned sound field regions in a 3D shared space.

FIG. 20 is a logical flow diagram according to a preferred embodiment, from start to finish.

FIG. 21 is a structural and functional diagram of the targeting processor and the audio processing engine processor, according to an embodiment of the present invention.

FIGS. 22*a* and 22*b* are structural and functional diagrams of the targeting processor.

FIGS. 23*a*, 23*b*, and 23*c* are logic flow diagrams of a preferred embodiment, from start to finish.

FIG. 24 is logic flow diagram of implementation preferred embodiment of the audio processing engine.

DETAILED DESCRIPTION

Figure 1:
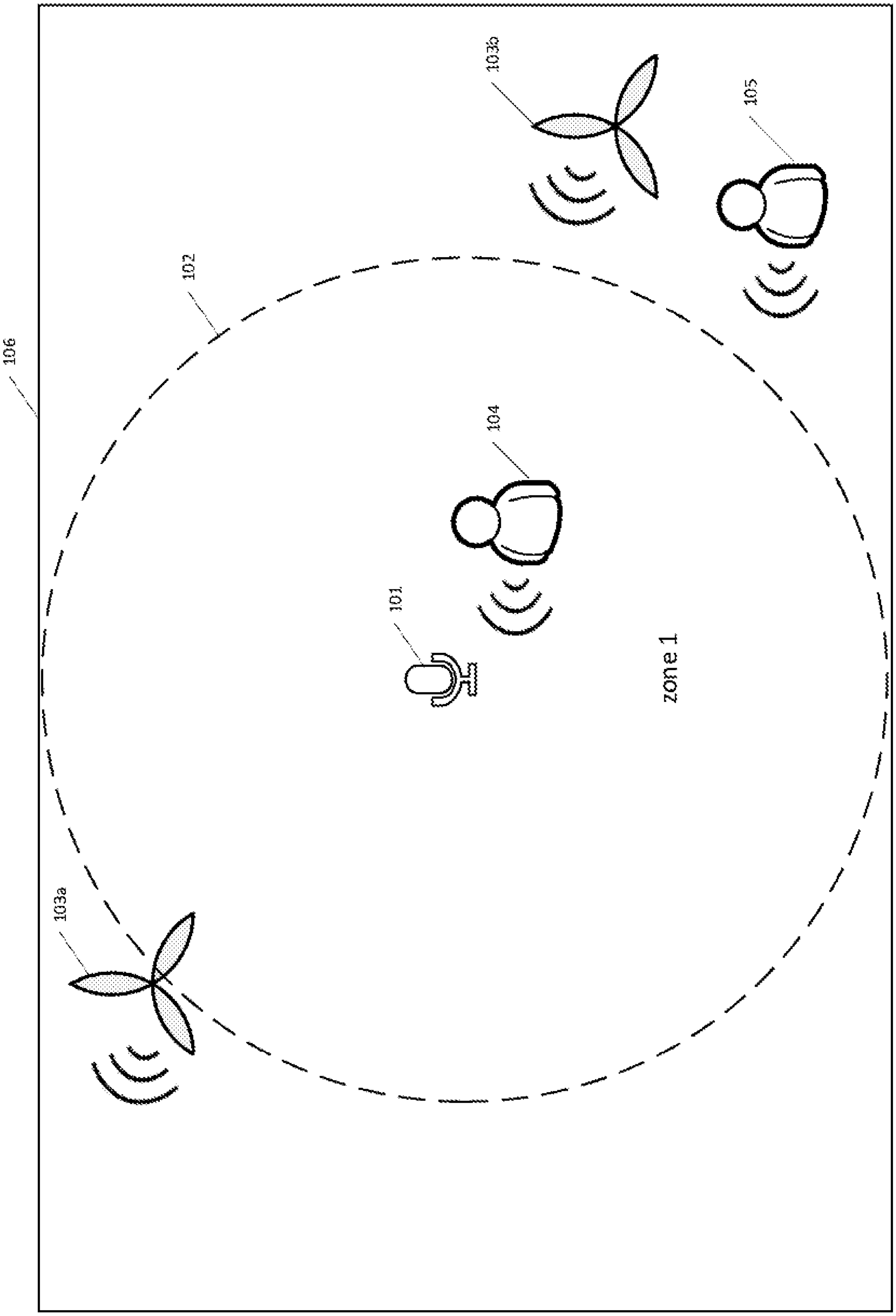
FIG. 1 Prior Art
FIG. 1 is a prior art diagrammatic illustration of a single omni-directional microphone zone and limitations.

The present invention is directed to apparatus and methods to optimize audio for undetermined environments by configuring and optimizing 2D and/or 3D spatial regions by applying, to each specific region, processing algorithms and attributes to optimize sound capture and communication systems for desired sound sources in the presence of undesired sound sources in real-time, employing microphones for audio capture and communication systems, personal computers, network workstations, or other similarly connected appliances to engage in effective audio pickup in undetermined environments (spaces) with unknown number(s) of desired and undesired sound sources.

Advantageously, embodiments of the present apparatus and methods provide a means to configure a microphone system to provide an ability to deal with complex environments and multiuser scenarios regardless of the position and orientation of the microphones in the environment and the position of the desired and undesired sound sources, while maintaining optimum audio quality and sound source specific processing for all audio pickup situations and sound source positions in the environment.

A notable challenge to creating 2D and/or 3D audio pickup zones with sound source specific audio processing is being able to place the sound field pick up regions in the environment at a point or points that may be remote from the center point of the physical microphone system. When desired and undesired sound sources are situated such that they are in direct line to the microphone system it becomes difficult to isolate each sound source to apply the correct processing appropriate to that sound source. Since the microphone system is not able to spatially distinguish two sound sources in the pickup zone the microphone system typically needs to apply post processing to the audio signal which contains all the sound sources in the zone. For example, in the current art, gain may be applied to both the desired and undesired sound sources when in fact gain should only be applied to the desired sound source and filtering should typically be applied to the undesired sound source.

Another notable challenge to isolating sound sources for specific audio processing is being able to position, in 3D space and with a high degree of accuracy, specific audio pickup zones in the appropriate area of the environment to only target the appropriate sound sources without affecting other closely spaced sound sources. The impact of not being able to position the audio pick up zone accurately in 3D space is that the audio pickup zones will need to be larger than desired. In the current art audio systems will typically have to use many microphones with limited range and/or beam former style microphones that need to be configured to very specific zones that are much wider or too narrow to be useful.

Yet another notable challenge to isolating sound sources for specific audio processing is being able to configure the size and shape of the audio pickup zones to be specifically tailored to the area in the environment regardless of the area's position, configuration, and size in the environment.

A further notable challenge to isolating sound sources for specific audio processing is being able to apply only the audio processing required to optimize the desired sound source regardless of its location in the room while optimizing specific processing required to minimize and potentially remove undesired sound sources from the audio pickup signal in the environment. Typically, in the current art, microphones may be muted until required and/or complex processing is needed on the audio signal containing both desired and undesired sound source content, which typically increases complexity and audio signal distortion artifacts.

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before deliver to an audio conferencing system. Examples include one or more speaking persons, one or more audio speakers providing input from a remote location, combined video/audio sources, multiple persons, or a combination of these. A desired sound source can radiate sound in an omni polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. A undesired sound source can radiate sound in an omni polar pattern and/or in any one or combination of directions from the center of origin of the sound source.

A "microphone" in this specification may include, but is not limited to, one or more of, any combination of transducer device(s) such as, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting them to electrical and/or digital signals.

A "microphone-zone" in this specification may include, but is not limited to, one or more of, any combination of microphone pickup patterns such as, physical microphones, macro-zones, zones, beams, adaptive zones, omni, cardioid, hypercardioid, supercardioid, lobar, bidirectional, directional, and/or any microphone pickup area and pattern capable of receiving acoustic signals within an arbitrary or defined boundary area, and or position that is directly tied to the physical microphone position.

A "virtual microphone" in this specification may include, but is not limited to, a microphone system focus point in 2D (x,y) and/or 3D (x,y,z) space. A virtual microphone is a type of object that contains a profile or plurality of profiles where a profile comprises attributes and functions. There can be any number of virtual microphones created, added or removed in real-time. A virtual microphone can be assigned to any number of regions and groups. Sometimes called a "bubble."

A virtual microphone profile may have attributes that include, but are not limited to, on/off, 2D position (x,y), 3d position (x,y,z), various threshold values (e.g., amplitude, phase, location, etc.), size, descriptions, arrays, Boolean, numeric, and text values. Virtual microphone profiles may also have specific executable functions assigned that may include, but is not limited to, Boolean, logic, filtering, digital signal processing, analog processing, gain, and location-based logic and behaviors relative to the proximity to other virtual microphones and locations in the shared space. A group of, or a single profile can be referred to as an audio regime, audio treatment protocol or equivalent terminology used to refer to applying audio processing to the microphone system.

A "region" in this specification may include, but is not limited to, a user and/or system-defined object that contains a profile, or a plurality of profiles. A region has a 2D and/or 3D shape and size at a specific location (x,y) (x,y,z) within the environment. A region can be any shape and size and is only constrained by the distribution and density of virtual microphones configured. A region can exist at any location in the shared space where at least one virtual microphone is present. A region can contain an individual virtual microphone, or any number of virtual microphones and virtual microphones are not required to be evenly distributed within the region. A region may overlap other regions and also contain any number of other regions (nested). A region may contain any number and combination of virtual microphones and other assigned regions. An unlimited number of regions can be created, modified and/or deleted at any-time and in real-time A region profile may have attributes that include, but are not limited to, on/off, 2D position (x,y), 3d position (x,y,z), various threshold values, size, descriptions, arrays, Boolean, numeric and text values. Region profiles may also have specific executable functions assigned that may include, but is not limited to, Boolean, logic, filtering, digital signal processing, analog processing, gain, and location-based logic and behaviors relative to the proximity to other virtual microphones and locations in the shared space.

A "group" in this specification may include, but is not limited to, a user and or system-defined object that is a logical grouping of virtual microphones, regions, and groups that contains a profile, or plurality of profiles. A group can exist in the shared space where at least one virtual microphone is present. A group can be created with an individual virtual microphone or any number of virtual microphones regardless of their location or proximity in the environment. A group may contain any number and combination of virtual microphones, regions and other assigned groups. A group can be assigned to any number of assigned groups. Any number of groups can be created, modified and/or deleted at any-time and in real-time A group profile may have attributes that include, but are not limited to, on/off, 2D position (x,y), 3d position (x,y,z), various threshold values, size, descriptions, arrays, Boolean, numeric and text values. Group profiles may also have specific executable functions assigned that may include, but is not limited to, Boolean, logic, filtering, digital signal processing, analog processing, gain, and location-based logic and behaviors relative to the proximity to other virtual microphones and locations in the shared space.

A "profile" in this specification may include, but is not limited to, a user and/or system-defined container (group, region, and virtual microphone) in which attributes and functions can be assigned and executed. Profiles can be shared across all object types. For example, Profile A can be accessed by virtual microphones, regions, and groups. When the term profile is used in the specification it is meant to contain all the attributes, and functions that are assigned to that specific profile which may be linked to an object type (virtual microphone, region, group). Any number of profiles can be created, modified and/or deleted at any-time and in real-time An "attribute" in this specification may include, but is not limited to, a user and/or system-defined parameter that is accessed through a profile for each group, region, and virtual microphone to which attributes are assigned and modified. Examples of attributes are, but not limited to, on/off, threshold value, gain, position (x,y,z) and size. Attributes can be shared across all object types for example Attribute A can be accessed by virtual microphones, regions and groups. Any number of functions can be created, modified and/or deleted at any-time and in real-time A "function" in this specification may include, but is not limited to, a user and/or system-defined functions, processes, and executables that is accessed through a profile for each group, region, and virtual microphone. Examples of functions are, but not limited to, Boolean logic, filtering, digital signal processing, analog processing, gain, thresholding, and any location-based logic and behaviors. Functions can be used to access other devices in the room such as but not limited to, IOT (Internet of Things), displays, speakers, room control, lightening, external amplification and any other device that has an exposed physical and/or software control interface. Functions can be shared across all object types for example Function A can be accessed by virtual microphones, regions and groups. Any number of functions can be created, modified and/or deleted at any-time and in real-time A "device" in this specification may include, but is not limited to, one or more of, or any combination of processing device(s) such as, processor(s), a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core function for other programs. An engine can be a central or focal program in an operating system, subsystem, application program or hardware/firmware system that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

FIG. 1 is illustrative of a typical scenario in the current art where a single microphone 101 is utilized in a shared space 106 to pick up desired sound sources 104, 105 which in this example are persons talking. A single microphone 101, by the nature of the design of the microphone and electronics will be limited to a defined pickup pattern such as omnidirectional, cardioid, hypercardioid, supercardioid, lobar, bidirectional, or directional. Regardless of the shape, the pickup area will be constrained to a single zone 102. The size of the pickup zone 102 is typically determined by the microphone system 101 specifications and the noise environment in the shared space 106. The microphone 101 pickup audio quality of the desired sound sources 104, 105 will be affected by the microphone 101 placement relative to the desired sound sources 104, 105, microphone 101 specifications, ambient noise levels, undesired sources 103*a*, 103*b* sound levels and position relative to the physical microphone 101. The closest desired sound source 104 will typically have better pickup audio quality than a sound source 105 more distant from the microphone system 101 and may even be out of range for usable audio pickup performance. Typically, to improve the audio pickup performance of a distant sound source 105, the microphone system 101 will add gain to the amplification circuits effectively boosting the audio signal. The gain added to the microphone 101 pickup audio signal will impact all desired 104, 105 and undesired 103*a*, 103*b* sound sources received by the microphone system 101. If the undesired sound sources 103*a*, 103*b* are on they will be amplified as well. To deal with this, the microphone system 101 may employ processing techniques such as, but not limited to, noise filtering, automatic gain control, equalization, signal filtering and others. Since all sound sources 104, 105, 103*a*, 103*b* are picked up equally within the same zone 102, the microphone system 101 has no ability to differentiate the sound sources spatially to apply appropriate processing for each sound source 104, 105, 103*a*, 103*b*. This type of microphone 101 is typically not able to adjust its polar pickup pattern easily and thus has no ability to create more zones to isolate and specifically target desired sound sources 104, 105 over undesired sound sources 103*a*, 103*b*.

It should be noted that a limitation of microphone systems 101 in the current art is the pickup zone, regardless of the microphone polar plot, is anchored to the physical device 101. This constraint requires the physical microphone 101 be placed in close proximity to the desired sound 104, 105 sources through the use of a for example a lapel microphone and/or individual discrete microphones located in close proximity to their actual physical location because the zone cannot be disassociated from the physical microphone system 101.

Figure 2:
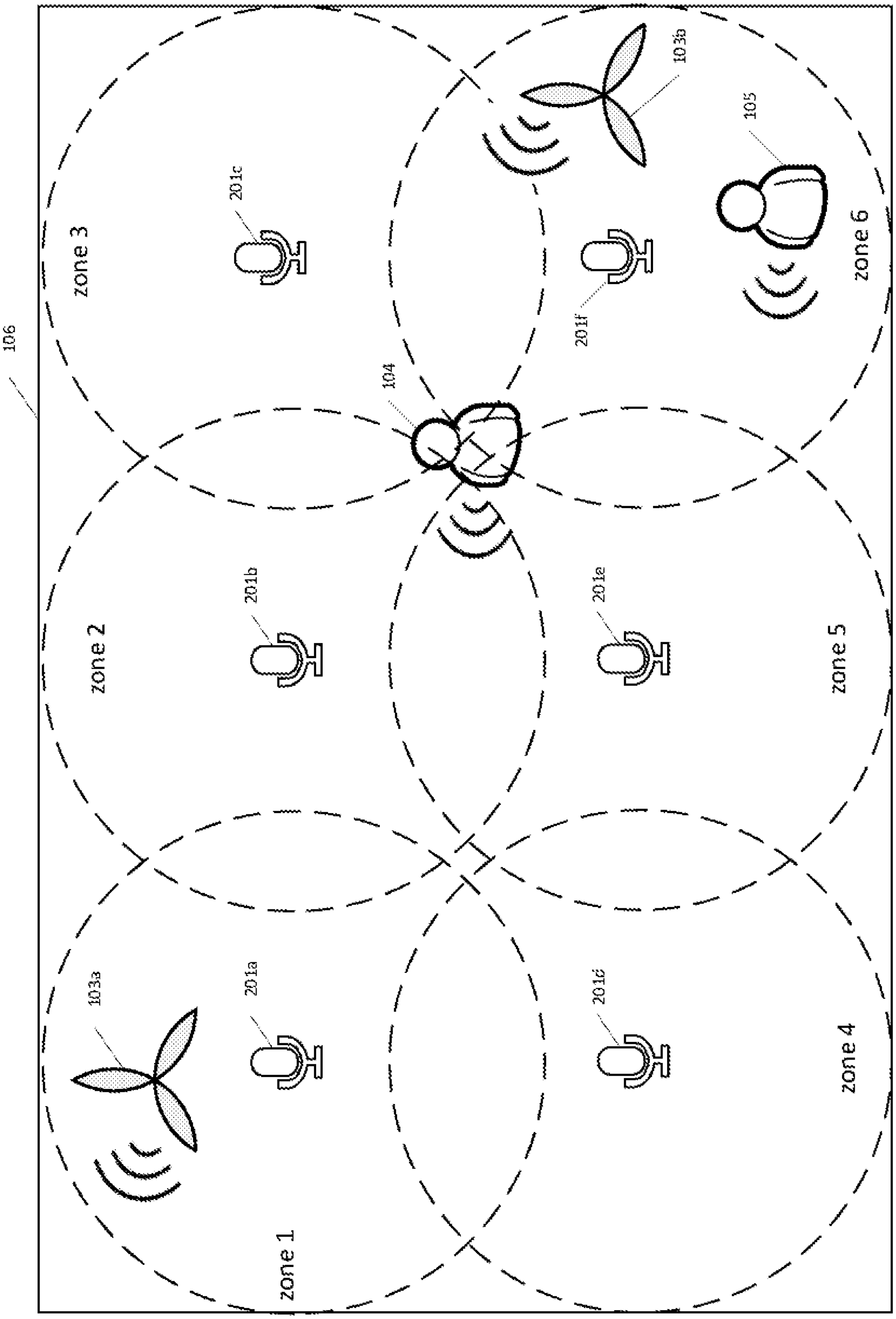
FIG. 2 Prior Art
FIG. 2 is a prior art diagram illustrative of multiple omni-directional microphone zones and limitations.

FIG. 2 illustrates an example of how, in the current art, discrete microphones 201*a*, 201*b*, 201*c*, 201*d*, 201*e*, 201*f* can be used to create multiple zones (for example: zone 1, zone 2, zone 3, zone 4, zone 5, and zone 6). Each zone contains its own physical microphone 201*a*, 201*b*, 201*c*, 201*d*, 201*e*, 201*f* respectively. Multiple zones are useful in that they can be turned on and off as required isolating the audio sound source pickup to a specific microphone 201*a*, 201*b*, 201*c*, 201*d*, 201*e*, 201*f* or area zone 1, zone 2, zone 3, zone 4, zone 5, and zone 6 of a shared space. The microphones 201*a*, 201*b*, 201*c*, 201*d*, 201*e*, 201*f* can be installed on tables, mounted in the ceilings, walls, worn as a lapel microphone, and/or a headset microphone or where ever there is a requirement to have good sound source pick up in the shared space 106. Typically, the active sound source (talker 104, 105) would activate (unmute) their closest microphone when they are ready to speak and mute their microphone when they are finished talking to minimize unwanted and undesired sound sources from being picked up by the microphone system. In more complex systems where the microphones 201*a*, 201*b*, 201*c*, 201*d*, 201*e*, 201*f* are mounted in the ceiling for example and are not dedicated to a specific desired sound source, the microphone is monitored for an active threshold signal (gated) to activate (unmute) the microphone and when the sound source signal falls below a threshold signal level the microphone is muted. This type of arrangement is typically not able to distinguish a desired sound source 104, 105 from an undesired sound source 103*a*, 103*b* resulting in the microphone system turning on a microphone 201*a*, 201*b*, 201*c*, 201*d*, 201*e*, 201*f* when any sound source is above a certain threshold signal level. Multi-microphone systems may also mix multiple microphones together to form a blended audio signal which rely on heuristics and complex system settings thus making it even harder to apply specific audio processing to a small area and/or a specific sound source Although each zone zone 1, zone 2, zone 3, zone 4, zone 5, and zone 6 is smaller in size and able to demarcate a separate section of the shared space 106, any sound produced within each zone: zone 1, zone 2, zone 3, zone 4, zone 5, and zone 6 is still constrained to being processed as a combined audio signal through the microphone system. For example, in zone 6 the desired sound source 105 and the undesired sound source 103*b* are located in the same general area of the shared space 106. The microphone system 201*f* which is responsible for zone 6 will pick up both sound sources 103*b*, 105 and not be able to differentiate them for audio processing. This results in both sound sources 103*b*, 105 receives the same gain, filter and audio processing techniques. In an ideal situation, it would be beneficial to provide amplification only to the desired sound source 105 while providing filtering and noise suppression only to the undesired sound source 103*b* which is not the case.

In the situation of desired sound source 104, the sound source 104 is not located within any one zone and is at the edge of multiple zones: zone 2, zone 3, zone 5, zone 6. The system will tend to bounce between system microphones 201*b*, 201*c*, 201*e*, 201*f* based on the speaking direction and loudness of the desired sound source 104 causing the audio system to switch between microphones and/or blend multiple zones adding complexity and usually resulting in poor audio pickup performance.

Figure 3A:
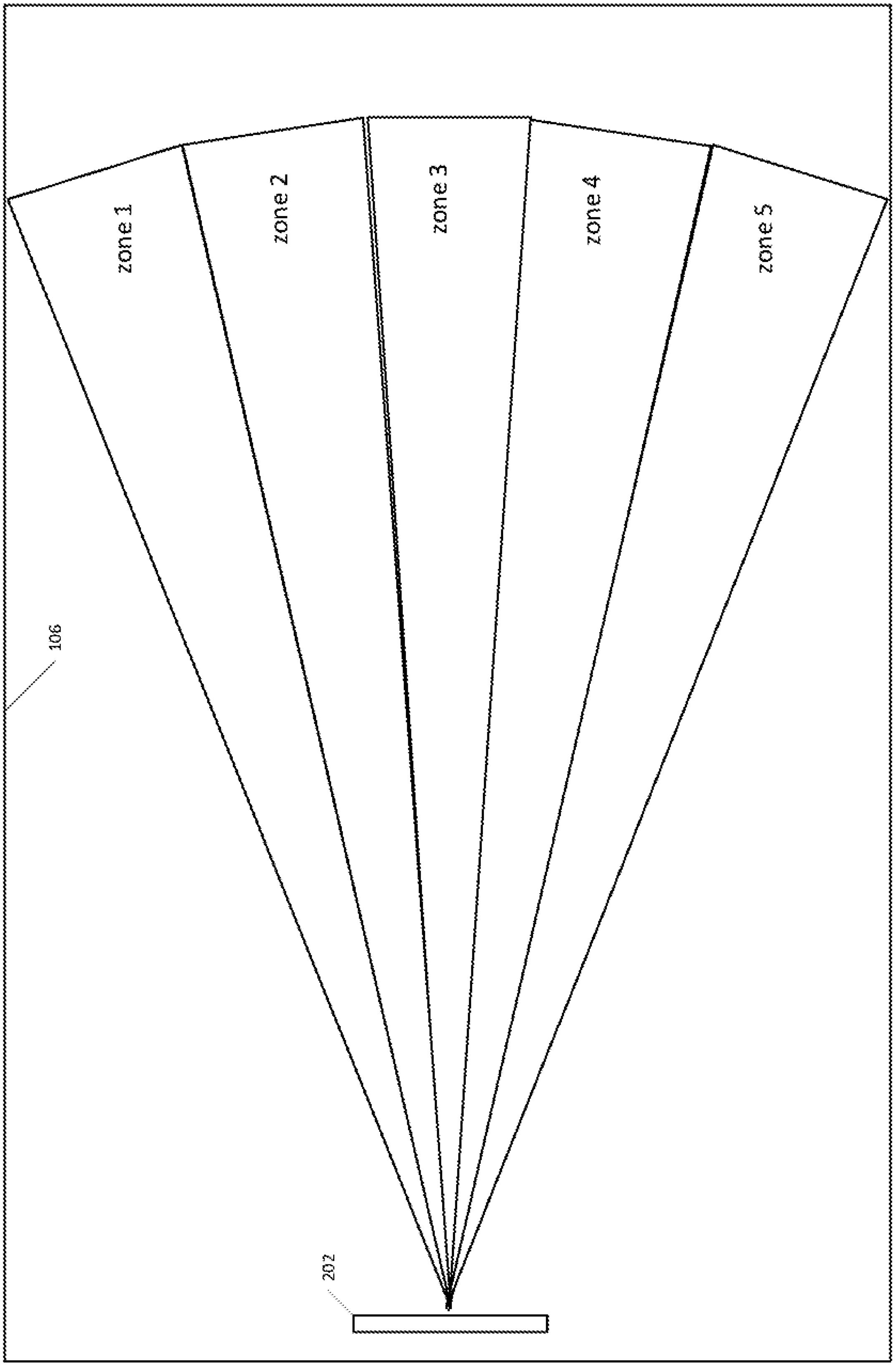
FIG. 3a Prior Art
FIGS. 3*a*, 3*b* and 3*c* are, respectively, prior art diagrammatic illustrations of a beamforming microphone with multiple zones and limitations.
Figure 3C:
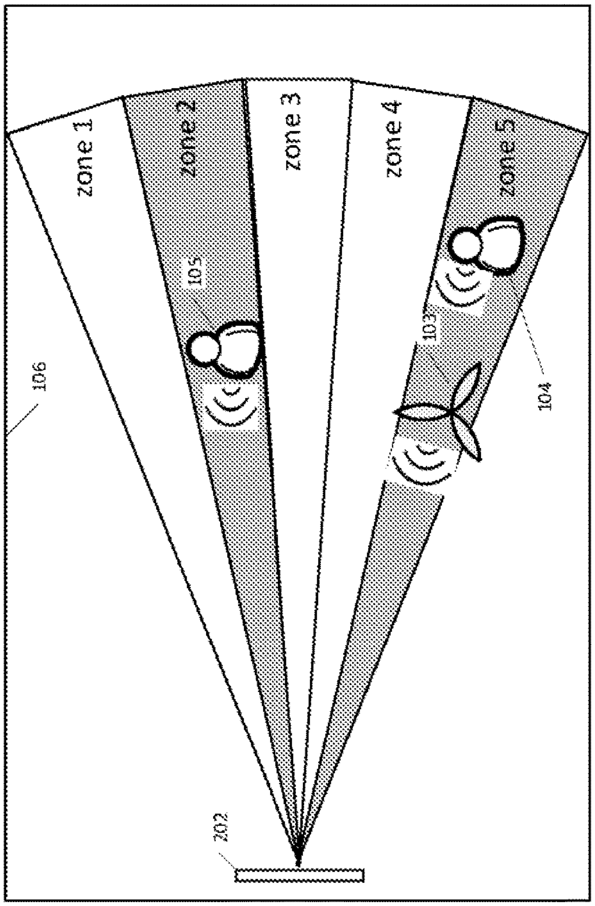
FIG. 3c Prior Art
Figure 3B:
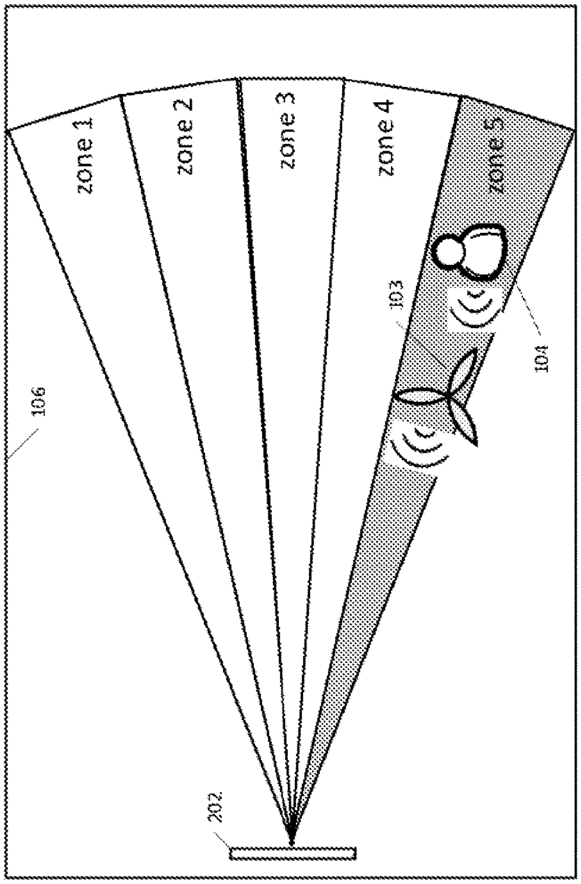
FIG. 3b Prior Art

FIGS. 3*a*, 3*b* and 3*c* illustrate how current art beamforming microphone arrays can be used to define multiple zones: zone 1, zone 2, zone 3, zone 4 and zone 5 in a manner similar to using a number of discrete omni-directional microphones. However, there are still key limitations in this approach: first, by design, the zones: zone 1, zone 2, zone 3, zone 4 and zone 5 are tied to the physical array device 202 (i.e. the zones extend infinitely outward from the physical device) and second, everything in a zones: zone 1, zone 2, zone 3, zone 4, zone 5 is processed in the same manner even if individual zones: zone 1, zone 2, zone 3, zone 4, zone 5 are processed independently. For example, in FIG. 3*b*, an undesired noise source 103 is given the same gain processing as the desired source 104 as both are located in zone 5. This can be problematic for remote listeners as the undesired source 103 may overwhelm and drown out the desired speaker source 104. FIG. 3*c* further highlights the problem when multiple zones (zone 2 and zone 5) are combined; inclusion of the undesired source 103 in processing will negatively impact pickup of both active zones zone 2 and zone 5.

It should also be noted that the types of systems illustrated in FIG. 1, FIG. 2, and FIGS. 3 *a,b*, and *c* are designed to work within a certain height in the room and where the sound sources are seated at a table and/or standing which is a significant limitation when sound sources can be of varied height. Zoning configurations are typically configured to a 2-dimensional grid plane to optimize desired sound source coverage with the following pre-defined constraints: (i) no up and down axis control, and (ii) zone height is fixed or constrained to microphone system limitations. Typically, processing is configured to minimize HVAC or other ceiling mounted sound sources, thus limiting the ability to boost desired sound source pickup in the vertical axis. In situations where sound sources are moving from seated to standing and/or walking around the shared space 106 in can become very difficult to do a system design, audio pick-up and processing with anchored pick-up zones required by current microphone systems.

FIGS. 4*a*, 4*b* and 4*c* illustrate an exemplary embodiment of an environment 106 (of any dimensions) that is volumetrically filled with a plurality of virtual microphones 404. FIG. 4*a* shows a representation in 3-dimensional space with a physical microphone array device 401, and FIG. 4*c* represents the 2-dimensional, top-down view. FIG. 4*b* illustrates that each virtual microphone 404 can be located and assigned a specific position in 3D space defined by, for example, an (x,y,z) attribute or any other form of special relative and/or relative coordinate system to the microphone device 401 or shared space 106. Although the virtual microphones 404 are depicted to be evenly distributed throughout the environment 106, this is not a requirement for the invention as will be described in subsequent diagrams. There is not requirement to have virtual microphones 404 located adjacent to the microphone device 401. For further details as to how the virtual microphone bubbles are created, see U.S. Pat. No. 10,063,987, issued Aug. 28, 2018, the entire contents of which patent are incorporated herein by reference FIGS. 5*a* and 5*b*, are examples of virtual microphones 404 mapped to a 3D sound field utilizing distributed microphones 501. FIG. 5*a* specifically illustrates a plurality of microphones 501 mounted in the ceiling at numerous locations. Ceiling mounted microphones 501 are supported by the one or more processors depicted in FIG. 22, and can be utilized to create a 3D grid of virtual microphones 404 mapped to a 3D sound field grid.

FIG. 5*b* further illustrates that the microphones 501 can be mounted on all, or any combination of walls including a table 502, to create a plurality of virtual microphones 404 arranged to a 3D grid. Typically, more physical microphones 501 installed at numerous locations and at various orientations will allow for a higher density layout of virtual microphones 404, and allow for more precise and complex 3D sound fields in the 3D space. It should be noted that any combination of physical microphones 501 located on any surface or combinations of surfaces can be configured into form a microphone array and can be utilized to create a 3D grid of virtual microphones 404 mapped to a 3D sound field grid.

FIGS. 6*a*, 6*b*, 6*c*, 6*d*, 6*e* and 6*f* are examples of an exemplary embodiment of the present invention applying profiles to each individual virtual microphone 404 and/or groups of virtual microphones to form complex sound field regions 601, 602, 603, 604, 605, 606 in a 3D environment 106. A microphone system 401 is mounted in the room and should be capable of generating a 3D configuration of virtual microphones 404 and preferably thousands of virtual microphones 404. The higher the density of virtual microphones 404, the higher the precision achievable for region location, shape and size. For example, virtual microphone arrays may comprise 2, 5, 10, 100, 1,000, 10,000, 100,000, or any number of desired virtual microphones.

Figure 6A:
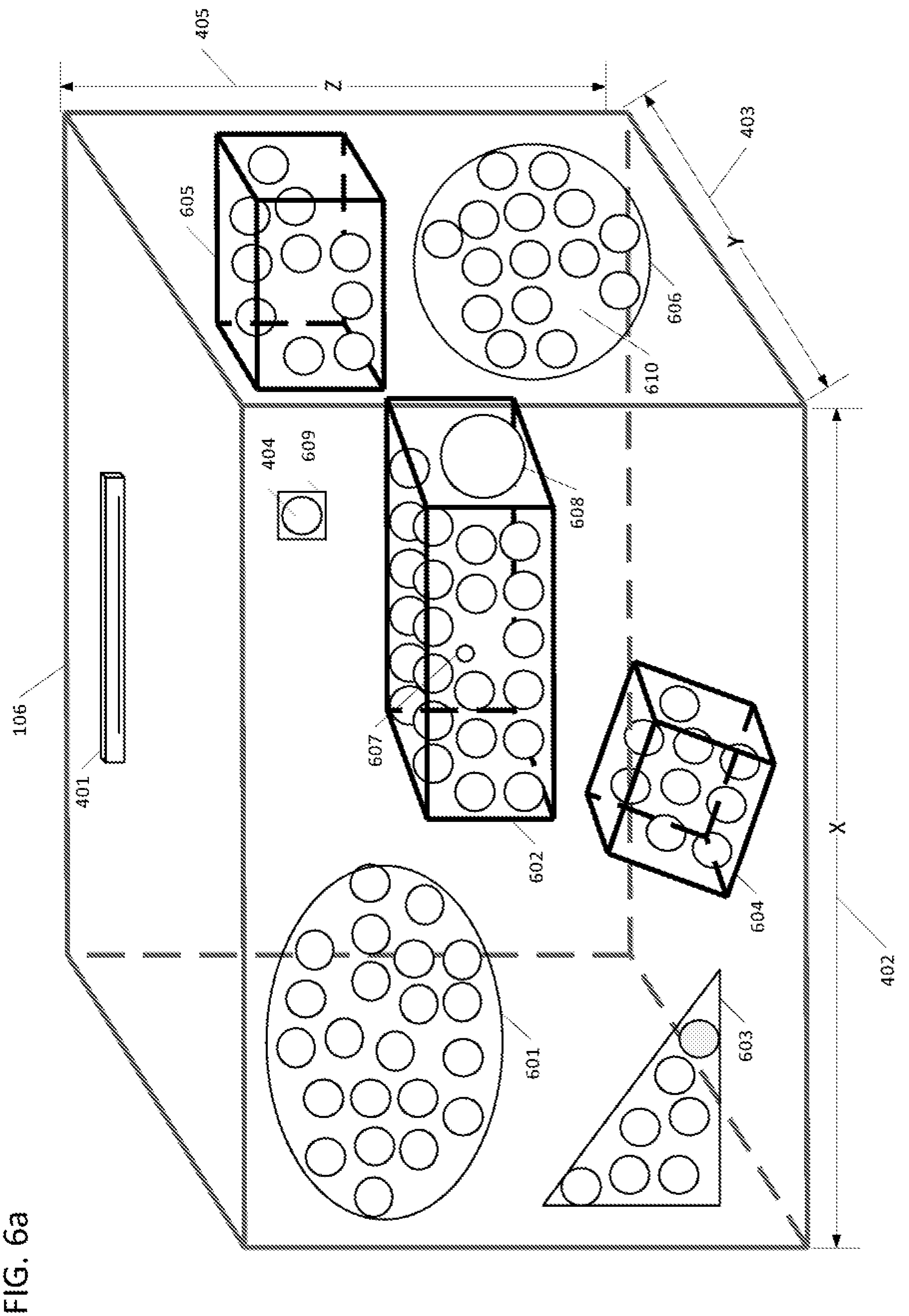
FIGS. 6*a*, 6*b*, 6*c*, 6*d*, 6*e*, and 6*f* are examples of an exemplary embodiment of the present invention applying multiple functions to each individual virtual microphone and or groups of virtual microphones to form complex sound field response(s) regions in a 3D space.

FIG. 6*a* illustrates a set of complex regions 601, 602, 603, 604, 605, 606 that can be created in the shared space 106. The shapes are defined as regions 601, 602, 603, 604, 605, 606. The regions 601, 602, 603, 604, 605, 606 can be any 1D (line), 2D (planer) or 3D (cubic) shape, size, and position in the 3D space, and can be as small as one virtual microphone 404 or as large as all the configured virtual microphones 404 in the shared space 106, and/or any number of virtual microphones 404. Unlike the current art, the regions 601, 602, 603, 604, 605, 606 are not anchored to the plane of the physical microphone as would typically be associated with standard microphone pickup zones. The regions 601, 602, 603, 604, 605, 606 can be assigned to any location (x,y,z) in the shared space 106 and can be any shape such as but not limited to ellipsoid 601, cubic rectangular 608, cubic square 604, prismatic triangle 603, spherical 606, or to a single virtual microphone 404, 609. Regions 601, 602, 603, 604, 605, 606 can have virtual microphones 404 evenly distributed such as in the elliptical region 601 or unevenly distributed such as in region(s) 602, 605, 606. Region 602 illustrates that virtual microphones 404 can be different sizes within the same region such as small 607, normal 404, and large 608. Any region 601, 602, 603, 604, 605, 606 can be tilted or in any orientation relative to the microphone system 401 such as for example cubic region 604.

Figure 6B:
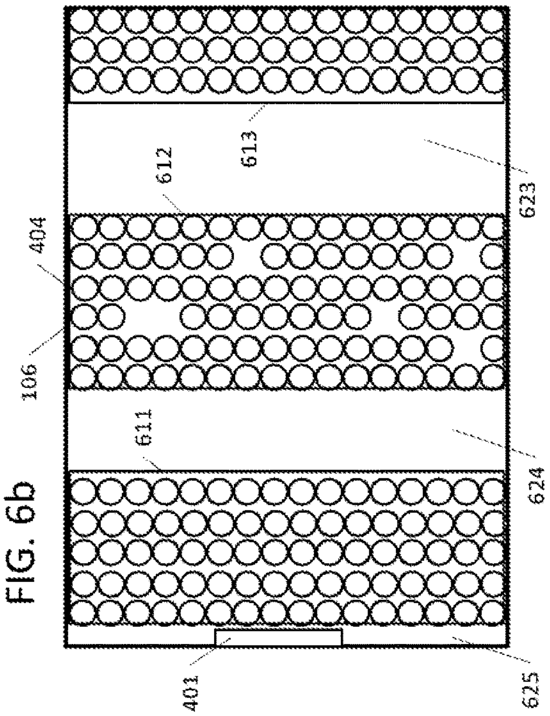
Figure 6C:
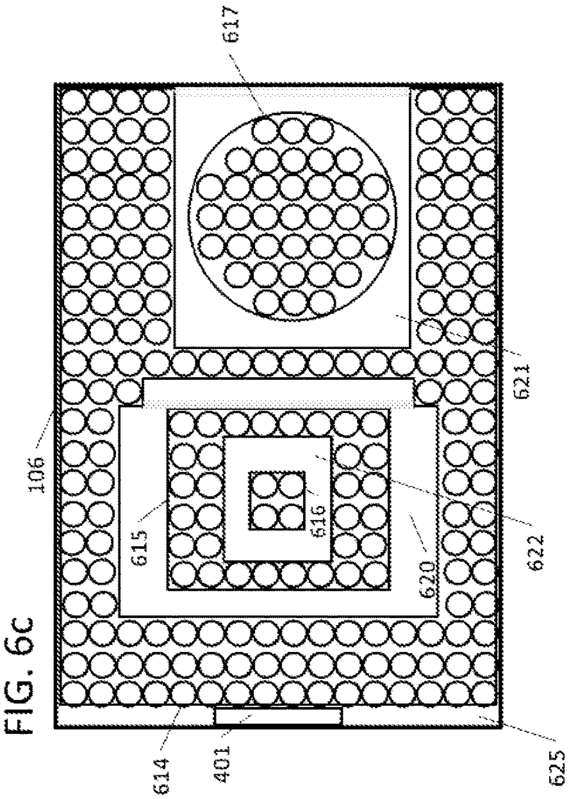
Figure 6D:
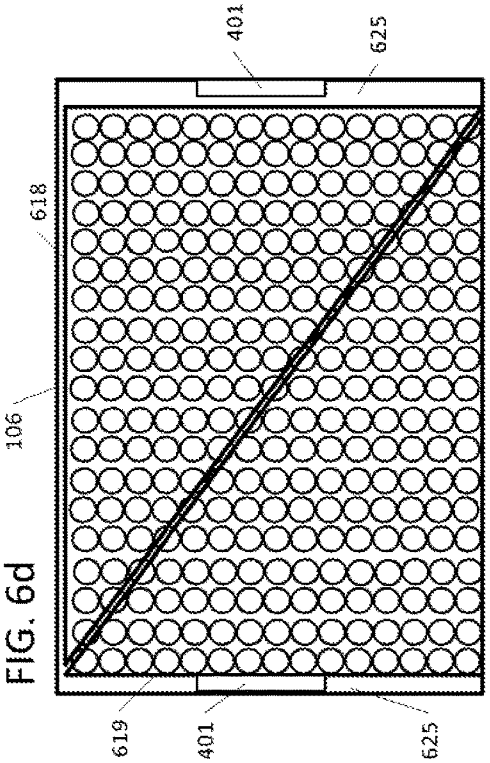

FIGS. 6*b*, 6*c* and 6*d* illustrate a top down view of the shared space 106. Although a top down view is shown, the regions are preferably 3D in spatial structure/shape potentially covering all areas in the Z 405 dimension, or some subset of the Z 405 dimension based on user or system configurations down to as limited as a single planer 1D or 2D layout defined by a single virtual microphone bubble 404 height. In FIG. 6*b*, three separate regions 611,612,613 are created at three different spatial positions in the shared space 106. At the front of the shared space 106 is region 611 that is adjacent to the microphone system 401, and the virtual microphones 404 are evenly distributed. In the middle of the shared space, separated by the empty region 624 with no virtual microphones 404 activated, a second region 612 is configured. Region 612 has virtual microphones 404 unevenly distributed throughout the region 612. The third active region 613 is separated by another empty region 623 where virtual microphones 404 are not enabled. Region 613 has virtual microphones 404 evenly distributed throughout the region. Regions 611, 612, and 613 can have unique attributes and functions assigned to tailor the audio processing to the specific needs of those regions. Regions 612 and 613 are not tied or constrained to the specific location of the microphone system 401 and are disassociated and not dependent on the physical microphone placement 401. This allows for significant advantages over the current art where the audio pick up zones are typically anchored to the physical microphone(s). The microphone system 401 can be mounted at any location in the shared space 106 and be configured to set up targeted regions 612, 613 that are based on specific room requirements and user situation. Region 625 is a region where all the virtual microphones 404 have been turned off. Stated another way, each virtual microphone can be turned OFF, turned ON, and/or have its own distinct size and/or shape.

FIG. 6*c* is a further example of how regions 614, 615, 616, 617, 620, 621, 622 can be configured. Complex arrangements and region shapes 614, 615, 616, 617, 620, 621, 622 are possible as the region 614, 615, 616, 617, 620, 621, 622 location and shape is not tied to the physical microphones system 401 location. Region 614 generally covers the whole of the shared space 106. Region 614 may have certain default properties set such as, but not limited to, gain values, threshold values, Booleans, and/or text descriptions. Region 614 may also have default functions applied to change the gain as a function of virtual microphone 404 location, and noise filtering parameters for background noise suppression. The front half of the shared space region 620 has disabled the virtual microphones 404. Within region 620, three other nested regions 615, 622, and 616 are configured. Each of those regions 615, 622, and 616 may have unique attributes and functions assigned to suit the requirement of that location (x,y,z) in the shared space 106. This type of regional configuration (audio regime) offers considerably more flexibility to tune the microphone and audio system to deal with room idiosyncrasies, desired sound sources 105, and undesired sound sources 103 regardless of their position and relative proximity to each other. In the current art, this type of region/zone creation and detailed audio processing is typically not possible as the microphone and audio systems would be too complex and costly to install and maintain.

FIG. 6*d* is yet another illustration of how a unique region shape 618, 619 that is not possible in the current art can be created and then configured within the microphone system 401. Two triangle-shaped regions 618, 619 have been configured, thus dividing the room in two on an unusual axis, thus allowing for unique room configurations not currently possible in the current art.

Figure 6E:
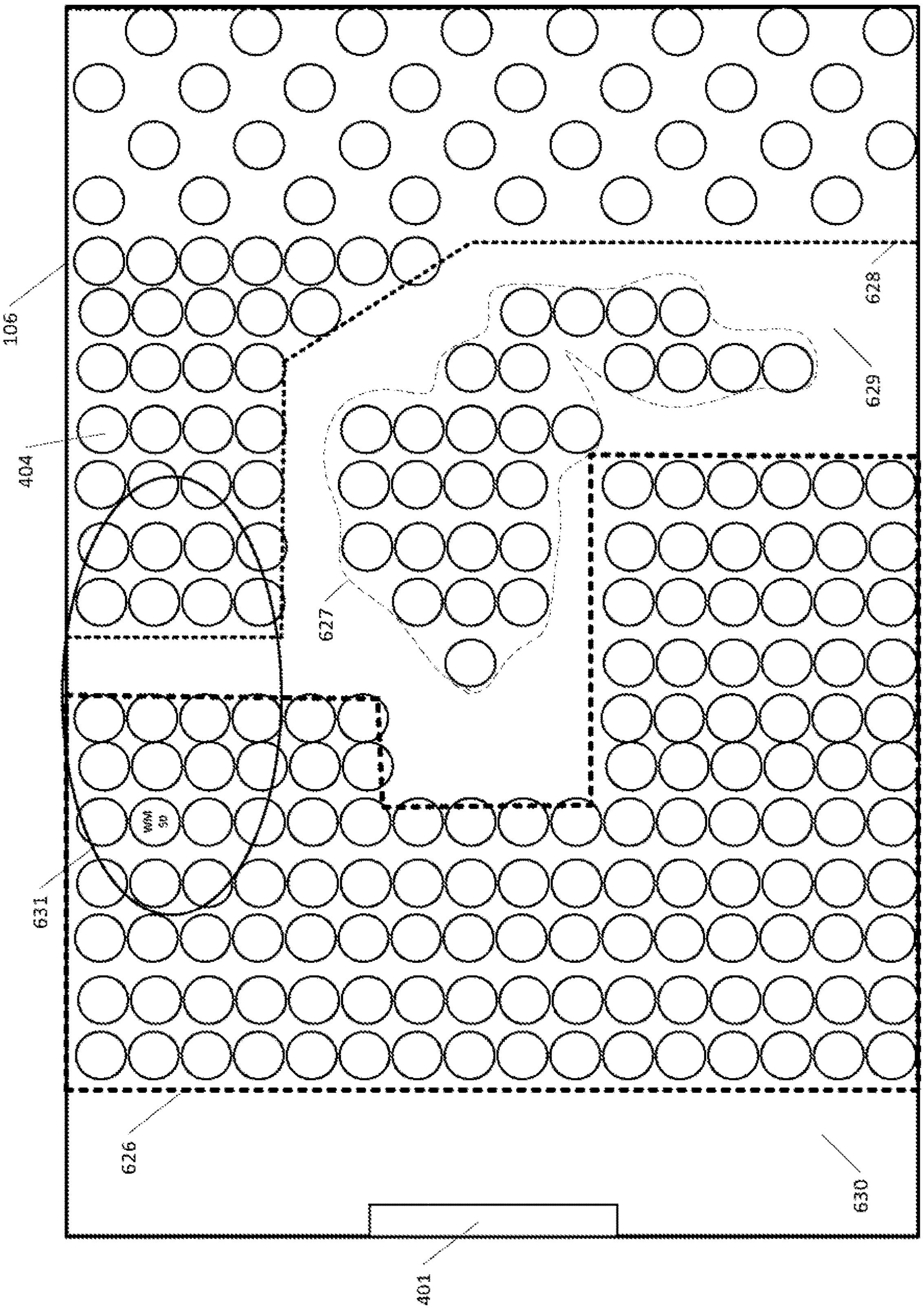

FIG. 6*e* illustrates the configuration of four regions 626, 631,627, 628 that have complex shapes where virtual microphones 404 are enabled. Two other regions 629, 630 have the virtual microphones 404 disabled. Region 627 is a free-flowing shape that can be configured and supported because of the high density of virtual microphones 404 configured in the shared 3D space. With a high density of virtual microphones 404 available, complex free flowing and nonlinear shapes, whether they are geometric or not, can be supported; and further to this, because the virtual microphones 404 need not be anchored to the center of the physical microphone system 401, the regions 626, 631,627, 628 can be configured to any location and shape within the shared 3D space that a virtual microphone(s) 404 are available. Region 631 demonstrates the current invention's capability to overlap regions 626, 628 with region 631 thus creating unique and cascaded or possibly overloaded audio responses (functions) at a set of locations in the shared space 106. For example, Region 626 has assigned attributes and functions that get applied to the virtual microphones located in that region 626. Region 631 overlaps region 626. The virtual microphones 404 that are contained in both regions 626, 631 can have a more complicated configuration and processing. For example, VM (Virtual Microphone) 50 can inherit the properties and functions from region 626 and then also apply the properties and functions from region 631. Depending how the region 626, 631 and virtual microphones VM50 are configured, the region profiles can be executed in any combination of sequences which will be further explained in FIG. 8. This type of location-based audio (function) processing allows for very specific audio responses and processing for each virtual microphone 404 location. Region 631 overlaps Region 629 and Region 628 thus further preferably tailoring the virtual microphones 404 base configuration profile in Region 629 and Region 628 for those virtual microphones 404 that are also contained within Region 631.

This type of spatial location-audio processing preferably allows for a wide range of shared space 106 audio tuning and control responses. Region 628 demonstrates that a region 628 does not need to have the virtual microphones 404 evenly distributed throughout the region 628. Each virtual microphone 404 can preferably have a base profile with unique attributes and functions allowing for a base level of microphone system 401 setup for each unique shared space 106. Region 627 is an example of a free-flowing region shape that can be easily configured with the current invention. The higher the density of virtual microphones 404 deployed, the more flexible the free-flowing shapes can be in 2D and or 3D space.

Figure 6F:
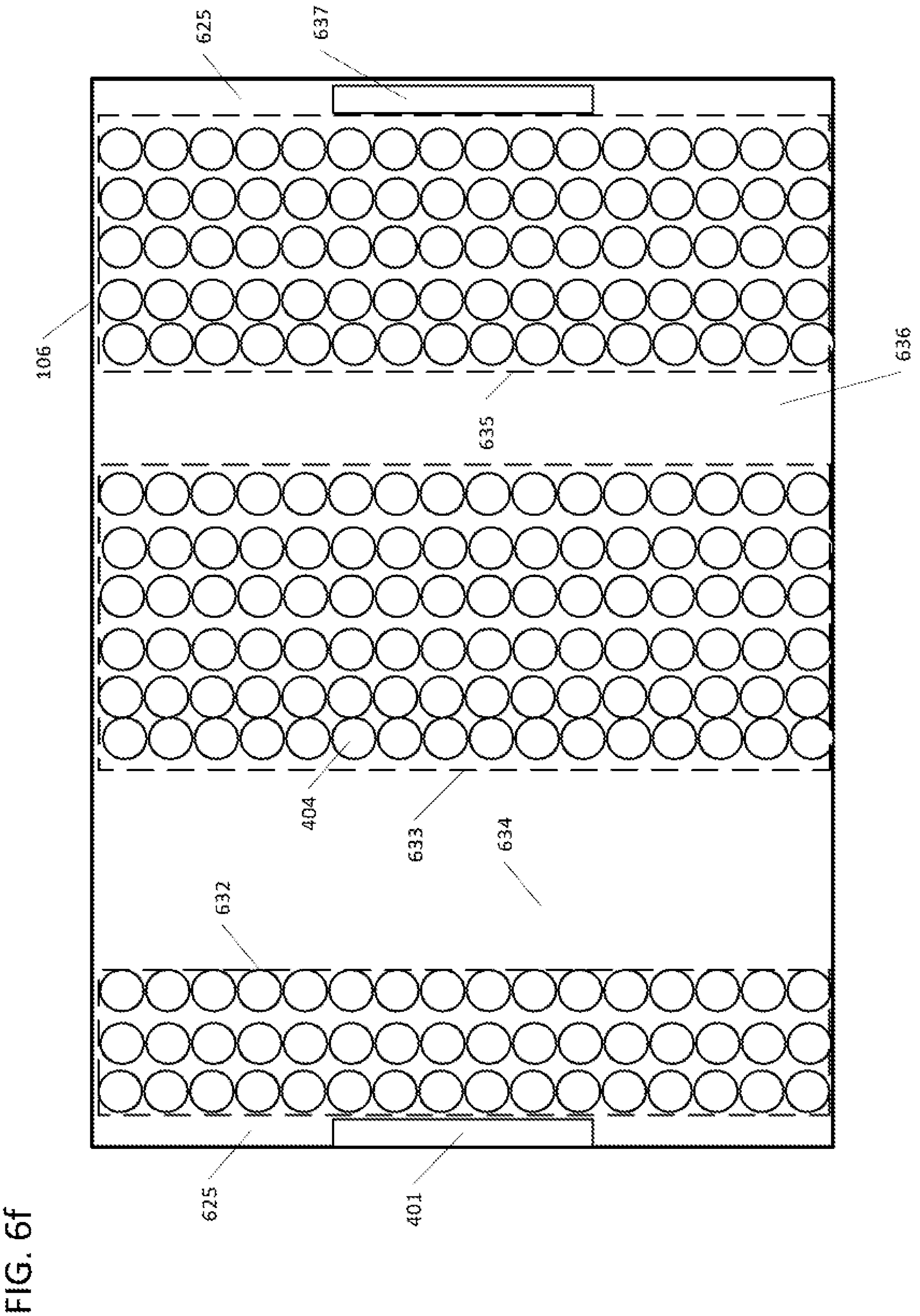

FIG. 6*f* is an example demonstrating that the current embodiments can handle a distributed microphone system 401, 637 with, but not limited to, two microphone bars 637, 401 installed on different walls in the shared space 106. The microphone system 401 is configured to control region(s) 635, 636, and 625 while the microphone system 637 is configured to control regions 634, 632. It should be noted that the respective regions are not anchored to the physical microphone systems 401, 637 and are, in fact, established to be across the shared space 106 from each microphone system 401, 637 respectively. This type of arrangement is not possible in the current art. Furthermore, due to microphone bars 401 and 637 being interconnected and operating in unison, Region 633 is configured as a shared region between the two systems 401, 637.

FIGS. 7*a*, 7*b*, 7*c*, 7*d*, 7*e*, 7*f*, 7*h*, 7*i*,7*j*, and 7*k* are diagrammatic illustrations of examples of an embodiment of the present invention demonstrating the relationship of Virtual Microphones 404 to Regions to Groups and their substructures.

Figure 7B:
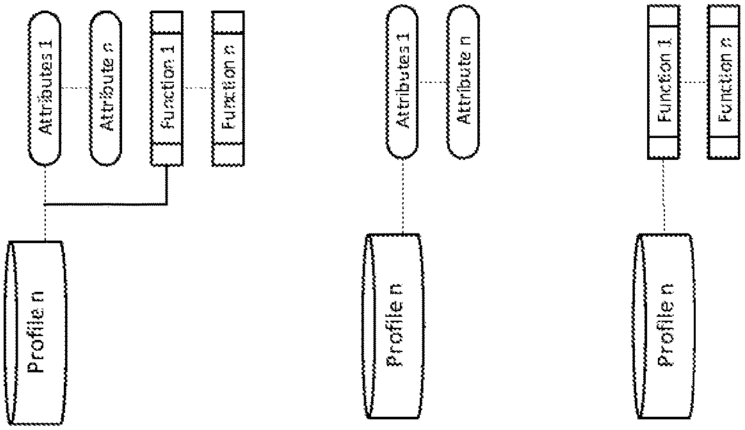
FIGS. 7*a*, 7*b*, 7*c*, 7*d*, 7*e*, 7*f*, 7*g*, 7*h*, 7*i*,7*j*, and 7*k* are diagrammatic illustrations of examples of an embodiment of the present invention demonstrating the relationship of Virtual Microphones to Regions to Groups and their substructures.
Figure 7A:
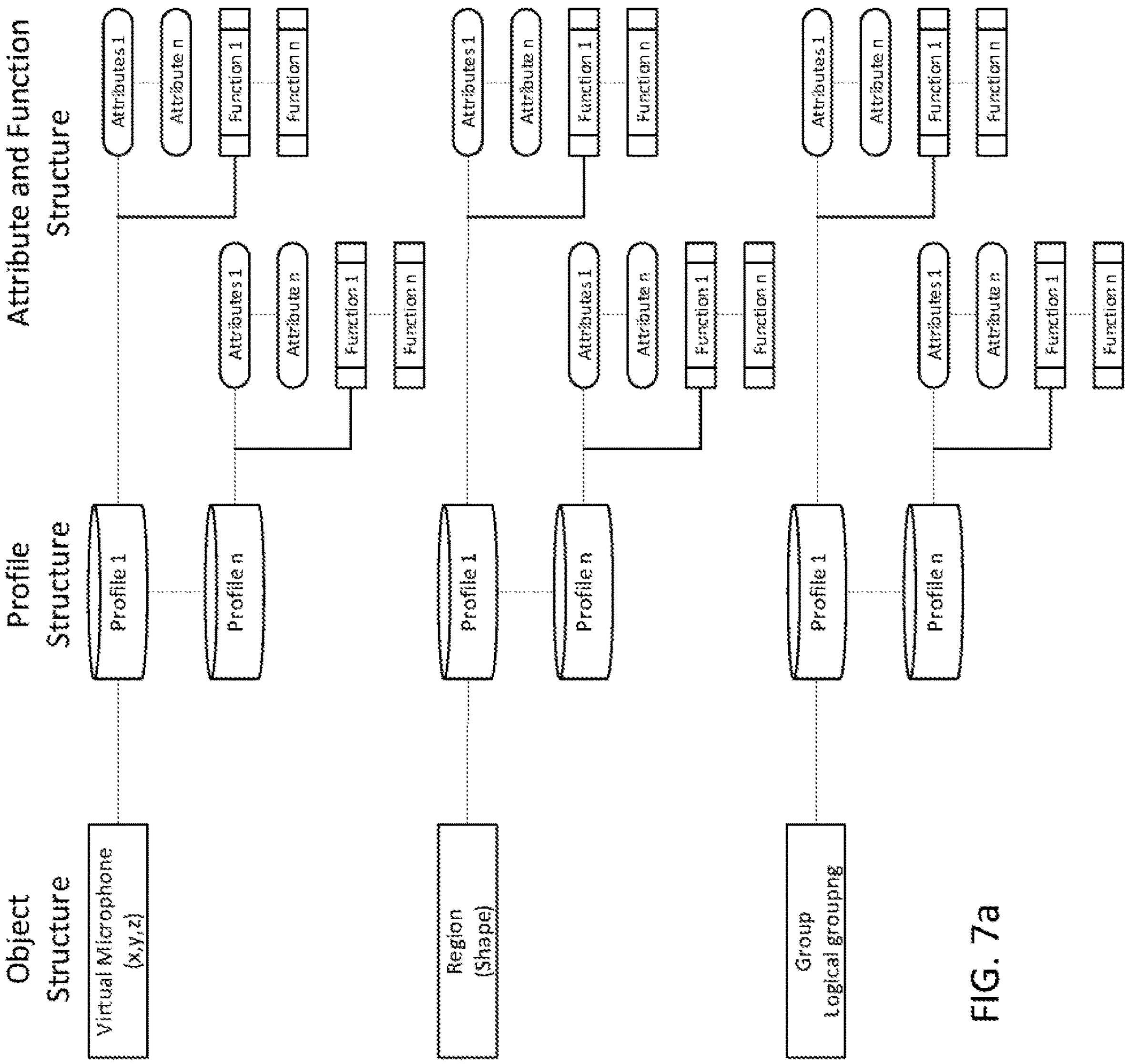

FIG. 7*a* is a diagrammatic illustration of the relationship of objects to profiles to attributes and functions. Currently, three object types are defined in the microphone system 401 configuration. It should be noted that the architecture is able to handle other object types as they are developed and should be considered within the scope of the invention. The current object types are virtual microphone 404, region, and group. Any number of objects of a type can be created by the microphone system 401. Each object can contain any number of configuration profiles. Configuration profiles give the object a type, attributes, and functions. Depending on the profile configured for the type of object, the object can take on different attributes and/or functions. Profiles can be automatically assigned by the microphone system 401, or by the user. A profile can contain any number of attributes and any number of functions in any combination as outlined in FIG. 7*b*. Profiles are preferably global in nature and can be referenced by any type of object. Profiles can be assigned any attributes and functions of type. Attributes and functions can be referenced from any profile allowing for common functionality and flexibility for configuring the system and optimizing system performance. Global profiles allow for simpler configuration and reuse within the system across numerous complex object arrangements.

Figure 7C:
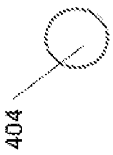
Figure 7D:
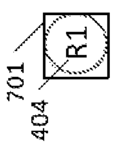

FIG. 7*c* illustrates a single virtual microphone 404. The virtual microphone 404 is preferably the smallest configurable object in the 2d and/or 3D space. A virtual microphone 404 can have any number of profiles containing attributes and/or functions. The virtual microphone 404 preferably provides the base level configuration for the microphone system 401. The virtual microphone 404 profile can be replaced, overloaded, and/or incrementally added-to by the region profile and group profile. FIG. 7*d* illustrates the smallest region object possible which is a region defined 701 containing a single virtual microphone 404. A region can contain at least one virtual microphone 404 and any number of virtual microphones 404 which are preferably located in proximity to each other such that the virtual microphones 404 can be contained in a closed spatial volume.

Figure 7E:
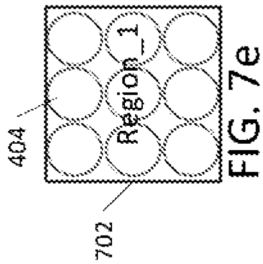

FIG. 7*e* illustrates a Region 1 702 which contains 9 virtual microphones 404. The profile assigned to Region 1 702 is applied to all virtual microphones 404 that are contained within the region 702. A virtual microphone 404 has a base profile and if the virtual microphone 404 is located in Region 1 702 the base virtual microphone 404 profile is further modified by the Region 1 702 profile. Shared space 106 specific location-based audio processing (functions) can be applied by the user 104 or automatically by the audio system shown in FIG. 24 to any virtual microphone 404 contained in the region allowing for multiple tuning, processing and device control possibilities. Since the virtual microphone 404 is the smallest object and there are preferably thousands (e.g., 8192) of virtual microphones distributed around the environment 106 highly localized and specific audio processing (functions) can be accomplished at each location (x,y,z) in the shared 3d space. Regions and region profiles allow for regionally located virtual microphones 404 to benefit from the same audio processing configurations allowing for simple audio setup in complex environments. That being stated each region can also be configured to a unique region profile or a combination of shared and unique profiles allow for very flexible and powerful audio processing treatment regimes to be applied across the shared space 106

Figure 7F:
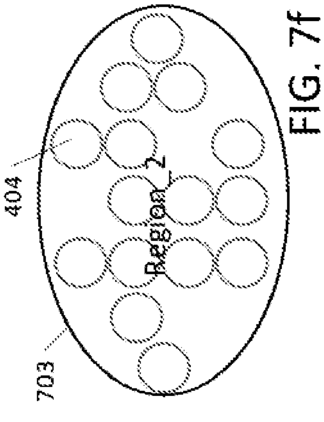

FIG. 7*f* illustrates a more complex region Region 2 703 which is elliptical in shape. It should be noted that the shapes can be 1D, 2D or 3D and contain spatially distributed virtual microphones 404. Typical systems in the current art would not be able to create this type of region shape 703 and are limited to the typical zone and microphone pattern shapes currently deployed in the current art. Region 2 703 demonstrates that the virtual microphones 404 are not evenly distributed within the Region 2 703. This can be accomplished by Region 2 703 inheriting the specific virtual microphone 404 profile which the region profile did not overload, such as the attribute for virtual microphone on/off. The Region 2 703 could have over-loaded the virtual microphone profile attributes if the Region 2 703 was configured accordingly thus enabling the virtual microphone(s) 404 that where disabled in the base configuration profile for the specific virtual microphone 404. The exact opposite scenario is also configurable where all VM 404 are enabled and the region 703 profile disables specific VM 404 in the region 703 based on the region 703 profile configuration.

Figure 7G:
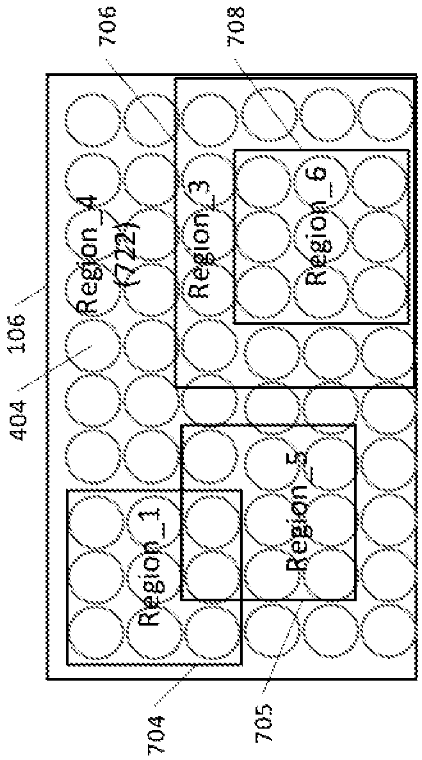

FIG. 7*g* illustrates a complex overlapping arrangement of multiple regions in a shared space 106. The microphone system 401 has 5 regions configured in the shared space 106. Region 1 704, Region 3 706, Region 4 722, Region 5 705 and Region 6 708. Region 4 722 is a default profile setting for all virtual microphones 404 in the shared space 106. All other region profiles are applied in conjunction with Region 4 722 profile settings. Region 1 704 and Region 5 705 have non-overlapped virtual microphones 404 and overlapped virtual microphones 404. Where the virtual microphones 404 are not overlapped between Region 1 704 and Region 5 705 the individual region settings are applied to the virtual microphones 404 contained within each separate region. For example, the virtual microphones 404 contained solely in Region 1 704 have the Region 1 704 profile settings applied and the Region 4 722 profile settings applied depending on configuration. The virtual microphones in Region 5 705 have Region 5 705 profile settings applied and Region 4 722 settings applied depending on configuration. The virtual microphones 404 contained within both Region 1 704 and Region 5 705 have Region 5 705 profile settings applied and Region 1 704 profile settings applied and potentially Region 4 722 profile settings applied depending on the configuration settings. In the case of Region 6 708 which is fully contained in Region 3 706 various permutations are also possible. Region 6 708 will apply the Region 6 profile settings to the virtual microphones 404 contained in the Region 6 708 and may also have applied Region 3 706 and Region 4 722 profile setting in any combination and order depending on the system configuration settings. Region 3 will apply only Region 3 profile setting to the virtual microphones 404 that are located outside of Region 6 708. Region 3 706 may also apply Region 4 722 profile setting as per configuration settings in any combination or order.

FIGS. 7*h*, 7*i*, 7*j* and 7*k* illustrate how the logical grouping works in relation to virtual microphones 404 and regions. Unlike a region, a group is a collection of virtual microphones 404 and or regions and or other groups that can be assigned to a common logical group and given an identifier, which do not need to be bounded within a spatial shape and regionally located in the shared space 106. Any object type can be added to the group and inherit the profile properties of the group adding another layer of configuration, processing and behaviors to the virtual microphones 404 in the shared space 106.

Figure 7H:
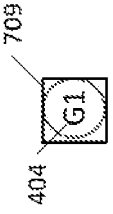
Figure 7I:
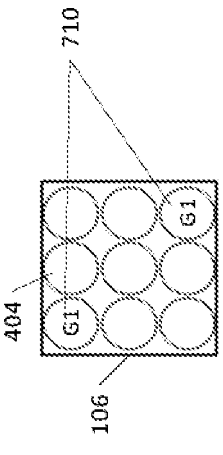
Figure 7J:
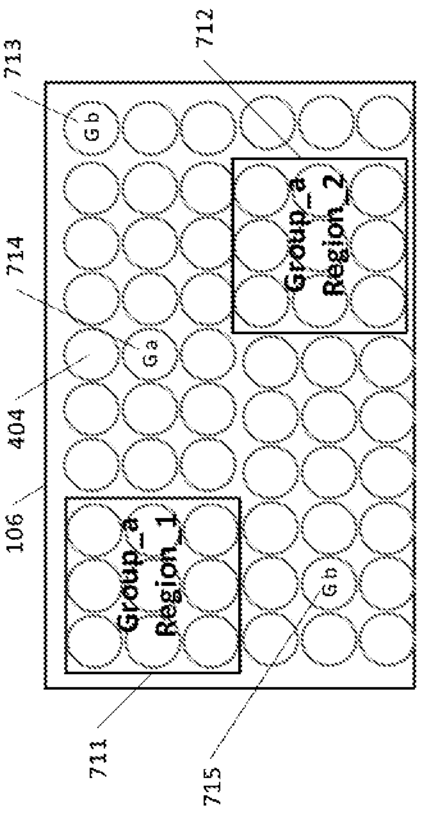
Figure 7K:
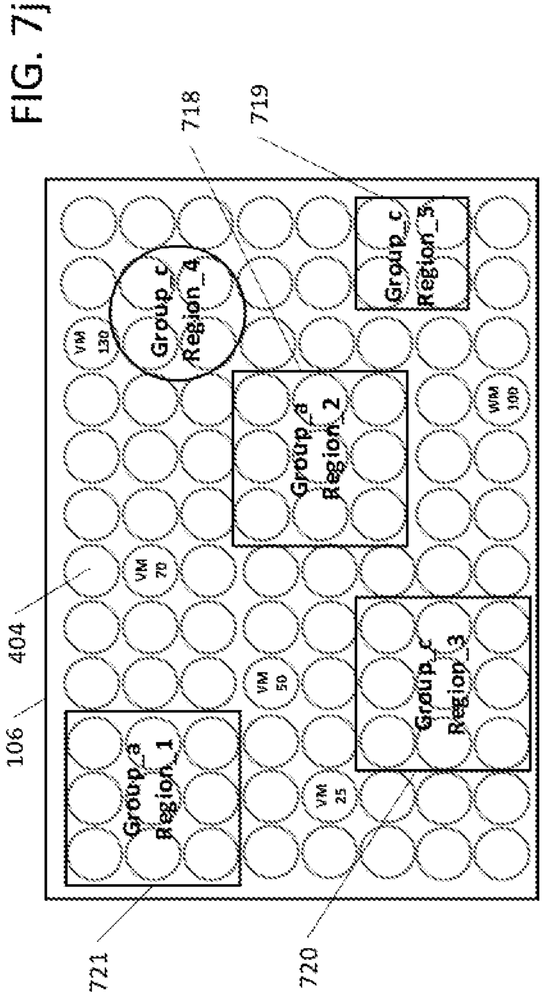

FIG. 7*h* illustrates that a single virtual microphone 404, regardless of location can be assigned to a logical group Group 1 (G1) 709. FIG. 7*i* further elaborates on this by showing two separate virtual microphones 710 being assigned to Group 1 (g1) 709. FIG. 7*j* further elaborates by adding separate regions to a group that may or may not include individual virtual microphones 404. Region 1 711 and Region 2 712 have their own unique profile, however since they have been assigned to a common group Group a, both regions will inherit Group a profile setting for attributes and functions. Virtual microphone 714 is also assigned to Group a (Ga) and inherits Group a profile. A second group, Group b (Gb), is also configured which includes two separate virtual microphones 714, 715. FIG. 7*k* illustrates a more complex configuration of virtual microphones, regions and group configurations including groups that include groups into a third logical group configuration.

The logical Group combinations that may be created are as follows:

Logical Groups

Group a=(Region 1, Region 2, WM25)
Group b=(VM70, WM50, WM130)
Group c=(Region 4, Region 5)
Group d=(Group a, Group b)
Group e=(VM50, WM100)
Group f=(WM50, Region 1, Region 5)

FIGS. 8*a*, 8*b*, 8*c*, 8*d*, and 8*e* are diagrammatic illustrations of examples of an embodiment of the present invention demonstrating complex combinations of how group, region and VM 404 profiles can be applied to multi-regional, nested and overlapped sound field regions.

FIG. 8*a* preferably shows how virtual microphones 404, regions, and groups can be configured in a 3D shared space 106 to optimize the shared space 106 for desired 104, 105, 808 sound pick up in the presence of undesired sound sources 103, 801 even if the undesired sound source 801 is located directly between the microphone system 401 and the desired sound source 104. All virtual microphones 404 will have a base Profile 1 applied unless the virtual microphone 404 is within another defined region or Group, at which point the specific region and/or group configured functionality will decide the profile parameters applied to that specific virtual microphone 404. VM300 is contained within a single virtual microphone Region 6 807 and will have its own parameters applied, then parameters in Profile 5 configured for Region 6 807 applied and then any combination of Profile 1 parameter(s).

For example, but not limited to, the profiles are defined as follows:

Profile 1=(Attribute=On), (Function=Gain of 5 db)
Profile 2=(Attribute=On, Function=filter algorithm specific to HVAC systems)

Profile 3=(Attribute=On), (Function=Automatic Speech Recognition, external device control)

Profile 4=(Attribute=On), (Function=echo cancelation algorithm 2)

Profile 5=(Attribute=On), (Function=Gain adjustment based on distance from the microphone system, external device control)

Profile 6=(Attribute=On), (Function=DSP processing to increase desired sound sources in the presence of undesired sound source)

Desired sound source 105 is located within Group a (Profile 3) and Region 2 (Profile 4) 805. The desired sound source 105 is located within the Region 2 805 physical area in the shared space 106, resulting in the Profile 3, Profile 4 and Profile 1 profile(s) being applied to the virtual microphones 404 contained in Region 2 and Group a configuration by the microphone system 401. The profiles will preferably be applied based on the specific configuration for the virtual microphones 404 contained in the Region 2 805. Desired sound source 104 although located in Region 5 will also utilized the Group a profile. This type of logical grouping allows for bulk configuration changes to applied functions and attributes for sound sources that are similar and/or locations in the shared space that would benefit from the same audio processing algorithms (functions). For example, a Group could be called HVAC functions which is a collection of processing algorithms that can be applied to areas of the shared space that require HVAC specific filtering. If a desired sound source were to come in close proximity and/or directly beside or underneath an HVAC system, the microphone system 401 can adjust in real-time to the appropriate filtering required, based on the desired sound source position in real-time. As the desired sound source moves out of the HVAC region a different set of processing functions can be applied to the virtual microphones 404 at those locations that are associated with the desired sound source location in real-time allowing for optimal audio sound pickup at all locations in the shared space 106.

Extra processing may be used when the desired sound source enters the region where the extra processing is required to maintain optimal audio quality. Region 4 803 for example, is such a region where an undesired noise source 801 is present, which may be an HVAC vent. A region can be defined and configured around the undesired sound source 803 which in this example is Region 4 803. Region 4 803 has been configured to utilize Profile 2 when a virtual microphone 404 in the region is activated by a desired sound source 104. If the desired sound source 104 moves forward into Region 4 803 and is talking, the desired sound source 104 moves from Region 5 804 into Region 4 803. As the desired sound source moves forward, different virtual microphones 404 will be activated and attributes and functions associated with that virtual microphone 404 will be applied in real-time. For example, the desired sound source 104 is located in Region 5 and VM350 is activated up to 3 sets of functions will be applied. The functions include:

VM350=[Group a (Profile 3), Region 5 (Profile 6) and possibly Profile 1].

As the desired sound source 104 continues walking towards the undesired sound source 801, the desired sound source 104 will cross into an area of the shared space 106 where Region 5 804 and Region 4 803 are configured to overlap across common virtual microphones 404. An example of this is VM200, which may be activated if the desired sound source 104 is talking. If that is the case the profiles may include both the Region 5 804 and the Region 4 803 functions.

VM200 functions=[Group a (Profile 3), Region 5 (Profile 6), Region 4 (Profile 2) and possibly Profile 1]

As the desired sound source 104 keeps walking toward the undesired sound source 801 HVAC, the desired sound source may activate VM175 which is located directly below the HVAC vent. At this point the desired sound source has entered a new region, Region 4 at which point Profile 2 is applied by the microphone system 401.

VM175=[Region 4 (Profile 2) and possibly Profile 1]

Another region, Region 1, has been assigned to the spatial location of the undesired sound source 103 which could be another HVAC vent. The virtual microphones 404 assigned to Region 1, such as VM50 will apply the following profiles.

VM50=[Region 1 (Profile 2) and possibly Profile 1]

Desired sound source 808 happens to be situated at a location in the shared space 106 where the virtual microphones 404 are contained in a configured spatial region, Region 3 809. VM100 is an example of a virtual microphone contained in Region 3. The following profile(s) may be applied to VM100 which will in turn be applied to the desired sound source 808 at that location in the shared space 106.

VM100=[Region 3 (Profile 5) and possibly Profile 1]

Another example of location based and hence region based specific audio processing is for desired sound source 105 which is located close to VM160. The following profiles and processing will be applied to desired sound source 105.

VM100=[Region 2 (Profile 4), Group A (Profile 3) and possibly Profile 1]

VM100 is able to take advantage of region, group and virtual microphone 404 specific function and attribute profiles allowing for very specific audio optimization for that type of sound source and location in the shared space.

By the implementation of virtual microphone 404, region and group profiles (processing) the desired sound source 104 will preferably be optimized for each specific 3D location in the shared space 106.

FIGS. 8*b*, 8*c* and 8*d* illustrate how by utilizing location-based attributes the audio processing can be tailored by attributes and functions applied through profiles for any level of object type. Although regions and groups are not illustrated is should be evident that those object types can be configured to accomplish similar and more complex processing optimizations.

FIG. 8*b* illustrates the desired sound source 104 traversing the sound space 106 to the back of the sound space the farthest distance from the microphone system 401. An example of a function that can be applied to each virtual microphone 404 that is more distant from the microphone system 401 by knowing the virtual microphone 404 location is an increasing gain function to effectively amplify the desired source as a function of position in the room.

$$\text{Example: distance from device}=\sqrt{x^2+y^2}$$

$$\text{Gain factor}=f(\text{distance from device})$$

FIG. 8*c* illustrates how a virtual microphone function can alter another virtual microphone 404 attribute based on its relative distance 808 from the activated virtual microphone 808 by a desired sound source 104. A moving cone or region is illustrated for example that any VM 404 within a distance and/or position from a desired sound source can have its profile overloaded or augmented with a dynamic floating profile 808 based on the location of the desired sound source and they move across the room 106.

FIG. 8*d* illustrates how a virtual microphone function can alter another virtual microphone 404 attribute based on its relative distance 808 from a virtual microphone 808 located by a undesired sound source 103 as described in FIG. 8*c*.

FIG. 8*e* is an example of an exemplary embodiment of the present invention applying profiles to each individual virtual microphone 404 to form complex sound field region processing responses in a 3D space. A microphone system 401 is utilized to create a grid of a large number of virtual microphones 404 that are evenly distributed across the shared space 106. It should be noted that the virtual microphones 404 are preferably mapped out as per FIG. 4 and, as such, any virtual microphone 404 is available in the 3D space. A profile can be applied to a single virtual microphone 404 such as VM1 and or to a plurality of virtual microphones such as VM63 and VM67. Groups of virtual microphones 404 that are adjacent to each other can be configured to form specific regions of varying size and shapes allowing for very targeted and discrete audio processing techniques, this functionality is not available in the current art. Any one virtual microphone can have numerous processing attributes and functions applied to allow for complex processing of the microphone signal at that point in space (x,y,z). It may be desirable at certain positions (x,y,z) in the shared space 106 to apply specific signal processing to the audio signal picked up by the virtual microphone 404. Because the audio processing can be applied to a specific virtual microphone location/region in the 3D space, desired 104 and undesired 103 sound sources can be dealt with individually. The virtual microphones 404 are spread out at such a high density that small changes in position (x,y,z) of a sound source can be resolved to a specific individual virtual microphone, VM400 for example. Systems in the current art typically cannot isolate two sound sources in a configured zone and require complex processing to try and deal with audio signals that contain both desired 104 and undesired sound 103 sources. For example, the single virtual microphone VM1 can be isolated and have a unique processing function applied to it compared to VM400. Or, more specifically, VM304 and VM317 can be isolated and have a unique group of processing functions applied even though they are adjacent to each other in the 3D sound field.

The processing functions applied to a virtual microphone 404 can be cascaded, additive, subtractive, and/or replace a previous processing function depending on how the virtual microphone processing chain is configured. For example, all virtual microphones 404 have Profile 8 applied as a base profile since Profile 8 is a general function applied to the 3D shared space as a whole. VM312 would be a representative example of a virtual microphone 404 with VM Profile 8 applied.

VM1, VM120, and VM400 are examples of individual virtual microphones 404 that may have had different virtual microphone 404 profiles applied. VM1, VM120, and VM400 may share the same virtual microphone 404 profile or they may have their own unique virtual microphone profile applied. More specifically VM1 may have Profile 8 and its own VM1 profile. Another example is VM120 and VM400 cancel the Profile 8 configuration and apply their own unique profiles. Any number and combination of profiles is allowed.

Examples of profile configuration(s) are described below.
Individual attributes are referenced as {A1 . . . An}
Individual functions are referenced as {F1 . . . Fn}
Profile 1=(setting A1. A2, A3, executing F1, F10, F3, F78)
Profile 2=(executing F6, F78)
Profile 3=(setting A2, A30)
Profile 4=(setting 1 A3, executing F3, F4)
Profile 5=(setting A2, A3, A4)
Profile 6=(setting A20, executing F7)
Profile 7=(executing F3, F4, F6, F9, F20, F21, F100, F1000)
Profile 8=(setting A5, A78, A3, A200, A67, A26, executing F10, F8, F34, F56)

Any number of attribute(s) and any number of function(s) can be contained in each object profile.

Any shared space 106 that is configured with a grid (or any type/shape of array) of virtual microphones 404 can be highly tuned to allow for optimal desired sound source pickup and minimizing undesired sound sources even if the sound sources are close to each other on any axis and position in the 3D space.

Examples of virtual microphone profile configurations:
VM404=(Profile 8)—All virtual microphones not configured with a specific VM, region and or group settings will be defaulted to Profile 8
VM1=[Region 6, Profile 8)]
VM78=[Region 1(Profile 8)]
VM75=[Region 2 (Profile 2), Group 2 (Profile 4), Profile 8]
VM72 and VM103=[Region 3(Profile 3)]
VM63=[Region 4(Profile 4), Group 1(Profile 3), Profile 8]
VM67=[Region 4(Profile 4), Group 1(Profile 3)]

Note VM63 and VM67 share the same Region 4 however, they do not both execute the default Profile 8.

VM120=[Group 1(Profile 3)]
VM312=[Profile 8]
VM313=[Region 1(Profile 1)]
VM314=[Region 5(Profile 5), Profile 8]
VM304, VM317, VM355=[Region 7(Profile 7), Group 2(Profile 4)]
VM322=[Region 6(Profile 6), Group 1(Profile 3), Profile 8]
VM400=[Region 2(Profile 2), Group 1(Profile 1), Profile 8]

The examples outlined above illustrate the complex type of combinations of configurations that can be configured on a per virtual microphone 404 basis.

FIGS. 9*a*,9*b*, 9*c*,9*d*, 9*e*, and 9*f*, are diagrammatic illustrations of 3D regional sound fields with attributes and functions applied to form 3D variable dimensioned and positioned sound field regions and groups in a 3D shared space.

FIG. 9*a* illustrates a shared space 106 configured to support a collaboration room which is configured with a conference table and chairs 904 for a plurality of users. A microphone system 401 is installed on a wall that is capable of generating a 3D grid of virtual microphones 404. The individual virtual microphones 404 are not illustrated within FIG. 9*a* for the purpose of clarity. FIGS. 9*b*, 9*c*, 9*d*, 9*e* and 9*f* illustrate how the virtual microphones 404 may preferably be distributed within each effective region 903, 912, 914, 919, 920 represented by each region shape. Although the region spatial shapes are shown with evenly distributed virtual microphones there is no requirement that the virtual microphones be evenly distrusted and in fact this is an attribute setting contained in each profile for each virtual microphone (on/off).

The collaboration space 106 is further outfitted with a white board 901 and a large interactive touch screen display 908. Two undesired noise source(s) 103, are present in the coloration space 106 which are representative of for example an HVAC noise source. Seventeen regions have been configured within the shared space and two groups have been configured. The regions are configured to optimize the audio sound field pick up for each of the specific locations a desired sound source 104 could be present. The number of sound field regions and groups utilized is illustration of how precisely the sound field regions in 3D space can be configured and optimized.

For example, region 902 may be configured to optimize the gain of the microphone system 401 for a sound source that is speaking into the white board 901. If the person (desired sound source 104) moves to the interactive display 908 he/she will enter into region 907 which is optimized for a person 104 who is not only talking away from the users in the room and the microphone system 401 but may be moving back and forth along the side wall. As the person 104 moves farther down the side wall, the gain of the microphone system can be increase as a function of distance from the microphone system 401 compensating for a degraded and reduced sound source.

Contained within the region 907 is a nested region 909. The nested region 909 is configured to reduce the fan noise (from the interactive touch screen 908) which may be higher at that location. As the person moves from region 907 to region 909, the virtual microphones 404 within that region 909 can be further optimized to deal with the increase undesired noise source(s). Region 911 is configured to optimize desired sound source pickup as the person traverses from the table 904 to the whiteboard 901 and to the interactive touch screen display 908.

The HVAC fans 103 each have their own region 910, 918 configured for their specific location. A separate region profile 910, 918 can be configured for each HVAC fan to deal with the location-specific needs, and the area of the shared space 106. Region 918 may have higher and more complex audio processing to deal with the proximity to the interactive display 908, HVAC 103, and the specific distance from the microphone system 401. Whereas region 918 does not need to deal with the interactive display 908, proximity so region 918 can be configured for a less complex audio processing algorithm.

Region 913 and region 912 have been configured to optimize a person 104 sitting at his/her specific location at the table 904. There may be a need to have separate regions configured based on how the table 904 is laid out. Region 916 and Region 915 are examples of how seating positions at a table can be tuned to specific locations by applying region profile settings and Group A profile settings. This flexibility of configuration allows for precise audio processing to a location and easy configuration of the room through the use of region and grouping configuration functionality.

Region 903 and Region 921 are further examples of this capability. Region 905, region 920, and region 917 have been further configured to smaller regions of audio pickup, but they share a common group configuration, Group B. Region 919 is configured to cover one end of the table 904 as it was possible to tune the audio system to a larger area within the shared space 106 at that location. Region 906 tends to face towards and away from the table 904 so a larger region size has been configured to cover this unique situation. Region 914 has been configured to cover the center of the table. In this region 914, the gain of the system is reduced significantly to deal with middle-of-the-table 904 noises that can be distracting and overwhelm other microphone systems in the current art. Because the regions can be configured in all axes the region shapes can be adjusted for height optimization in the room between participants that are sitting and those that are standing including for noises generated at the table level and those that are generated by the participant speaking which is typically above the table. This type of system configuration and performance allows for significantly increase audio pickup performance and a more enjoyable user experience for listeners at the far end of a conference call for example.

Also illustrated are numerous region and group configurations tuned to a specific location with various special sizes and profiles applied.

FIGS. 10*a*, 10*b*, 10*c*, 10*d*, 10*e*, 10*f*, and 10*g* are diagrammatic illustrations of 3D virtual microphone, region and/or group profiles are applied to form 3D variable dimensioned and positioned sound field regions in a 3D shared space. The FIG. 10 figures are examples of how the sound fields regions can be configured to be at any location and any shape in the shared space 106 by setting virtual microphone 404 attributes.

Figure 10A:
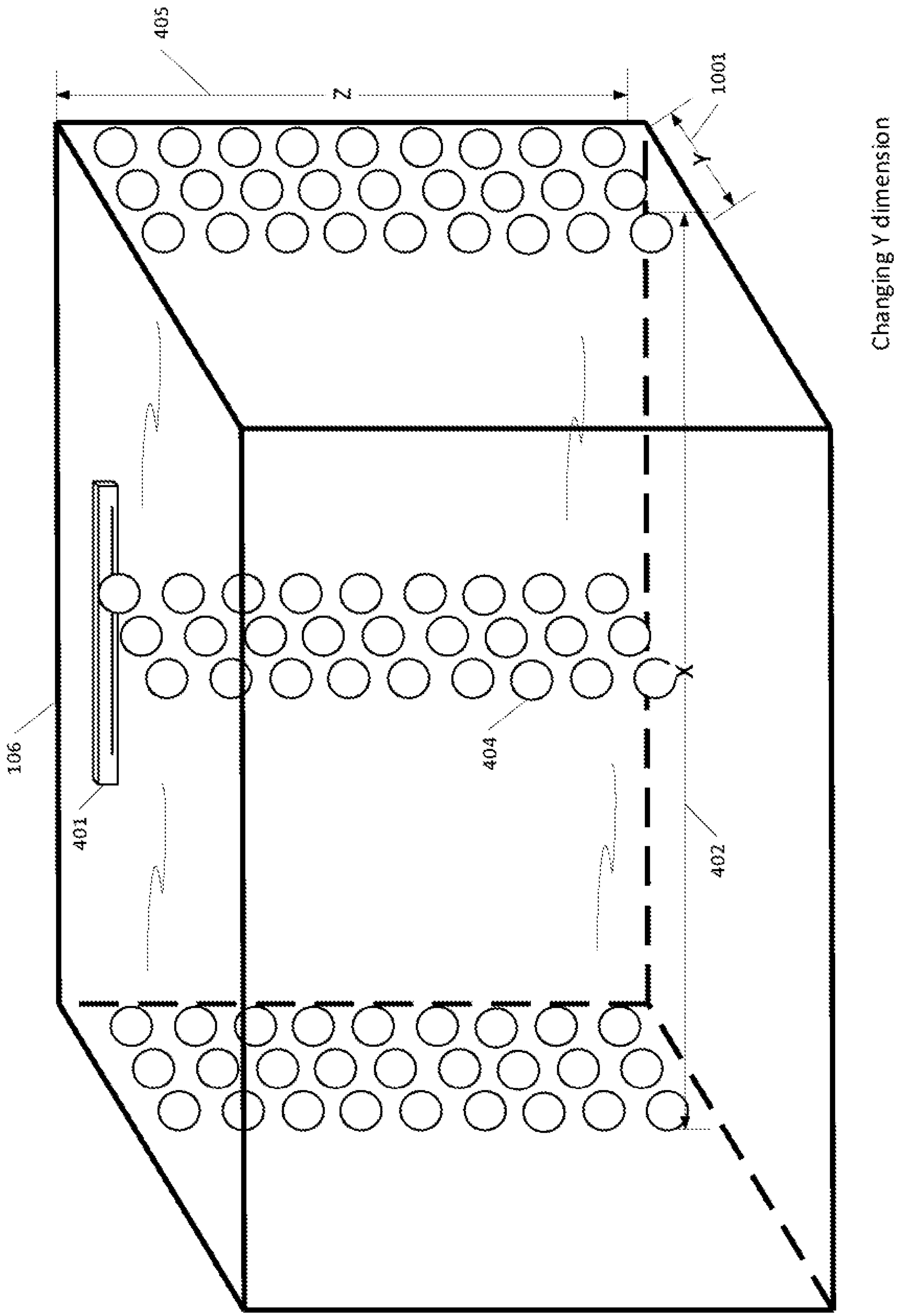
Figure 10B:
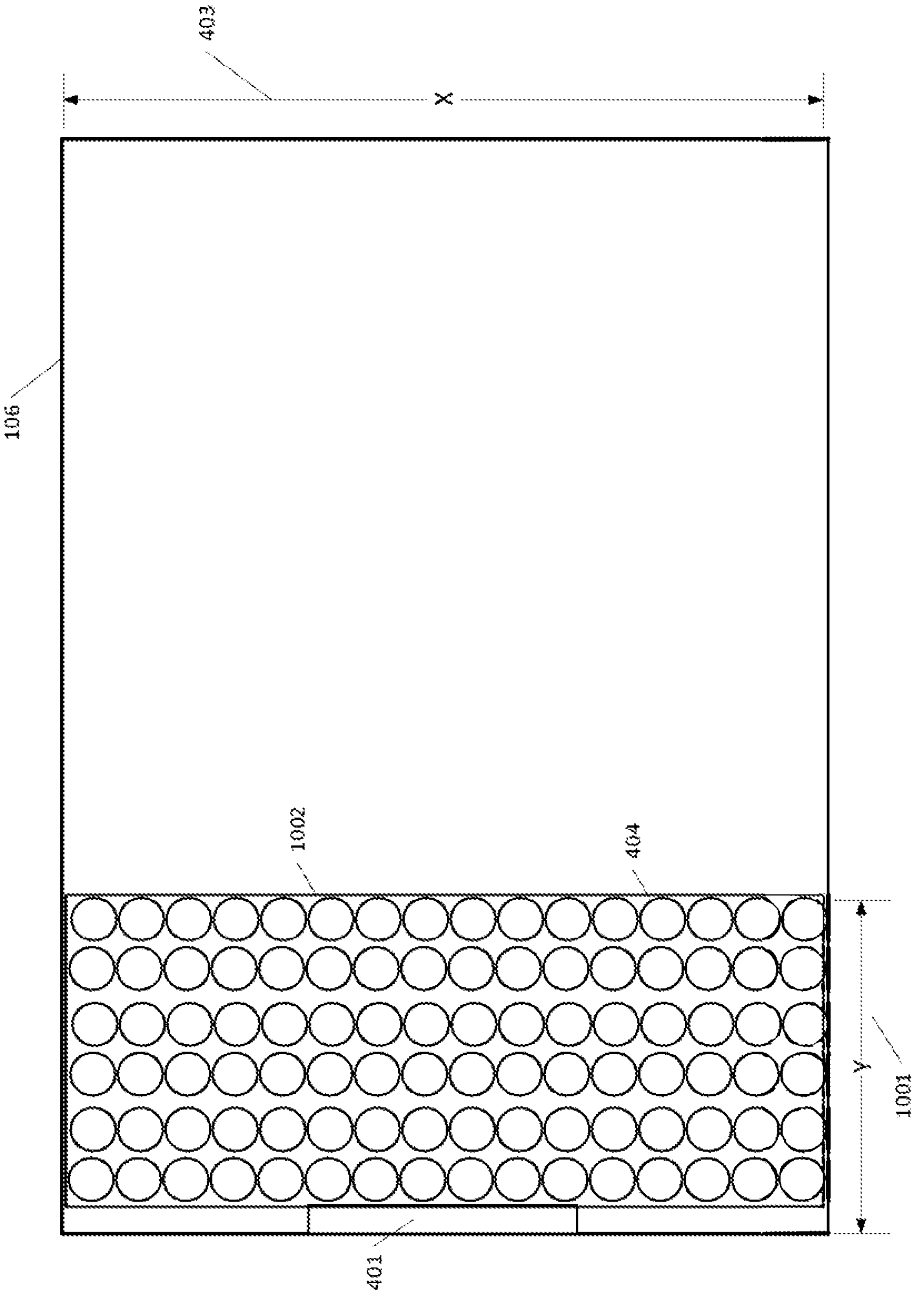

FIG. 10*a* illustrates what a 3d sound field region configured close to the microphone system 401 may be like in 3D space 106, with the Y dimension constrained 1001. It should be noted that in the focus region, the virtual microphones 404 are constrained in the Y dimension 1001, severely attenuating sound sources beyond the Y dimension 1001 in the shared space. FIG. 10*b* is a top down view of the same sound field region 1002 in the shared space 106.

Figure 10C:
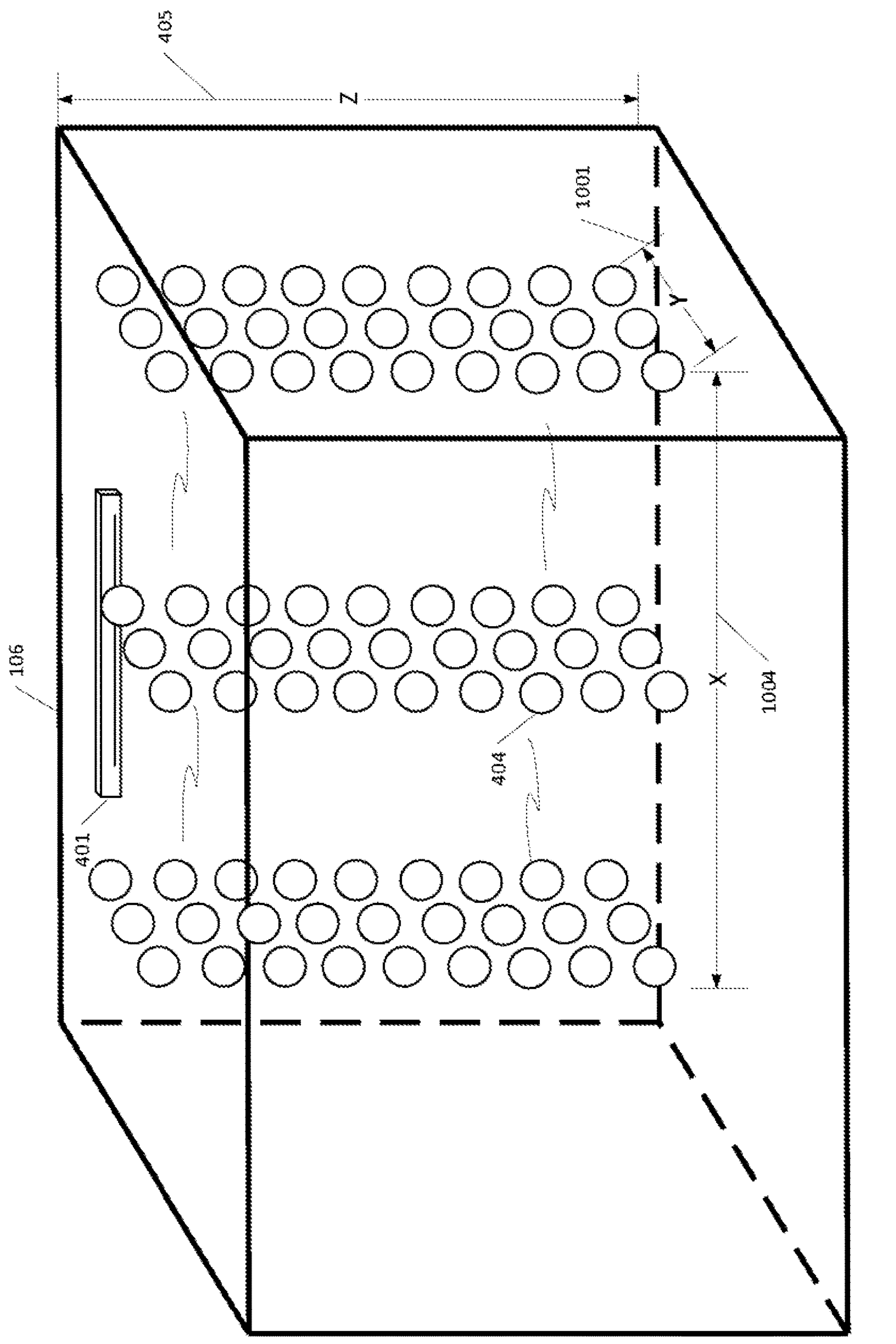
Figure 10D:
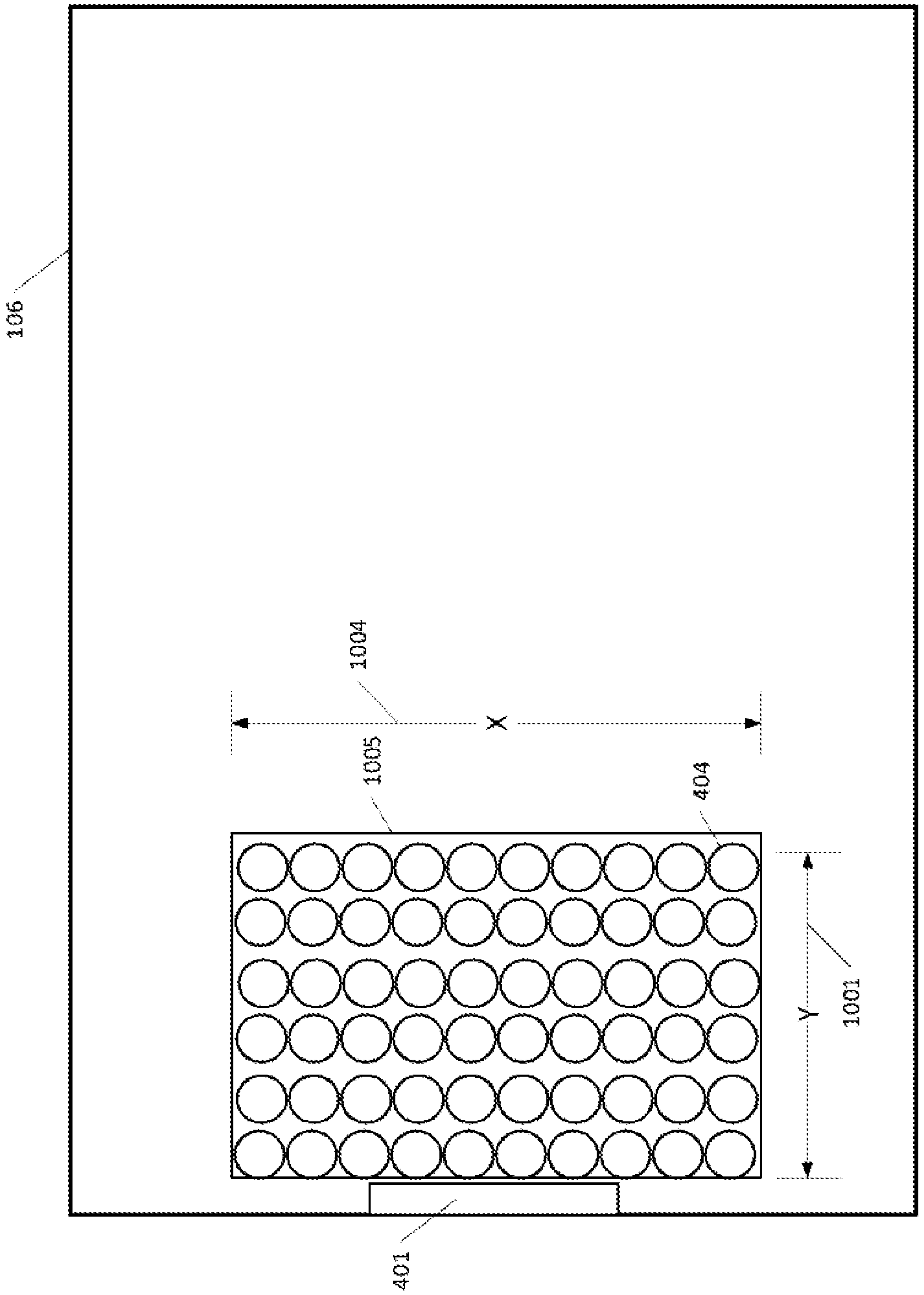

FIG. 10*c* illustrates what a 3D sound field region configured close to the microphone system 401 may be like in 3D space 106, with both the X dimension 1004 and the Y dimension 1001 constrained. It should be noted that in the focus region, the virtual microphones 404 are constrained in the Y dimension 1001 and the X dimension 1004, severely attenuating sound sources beyond the Y dimension 1001 in the shared space. FIG. 10*d* is a top down view of the same sound field region 1005 in the shared space 106.

Figure 10E:
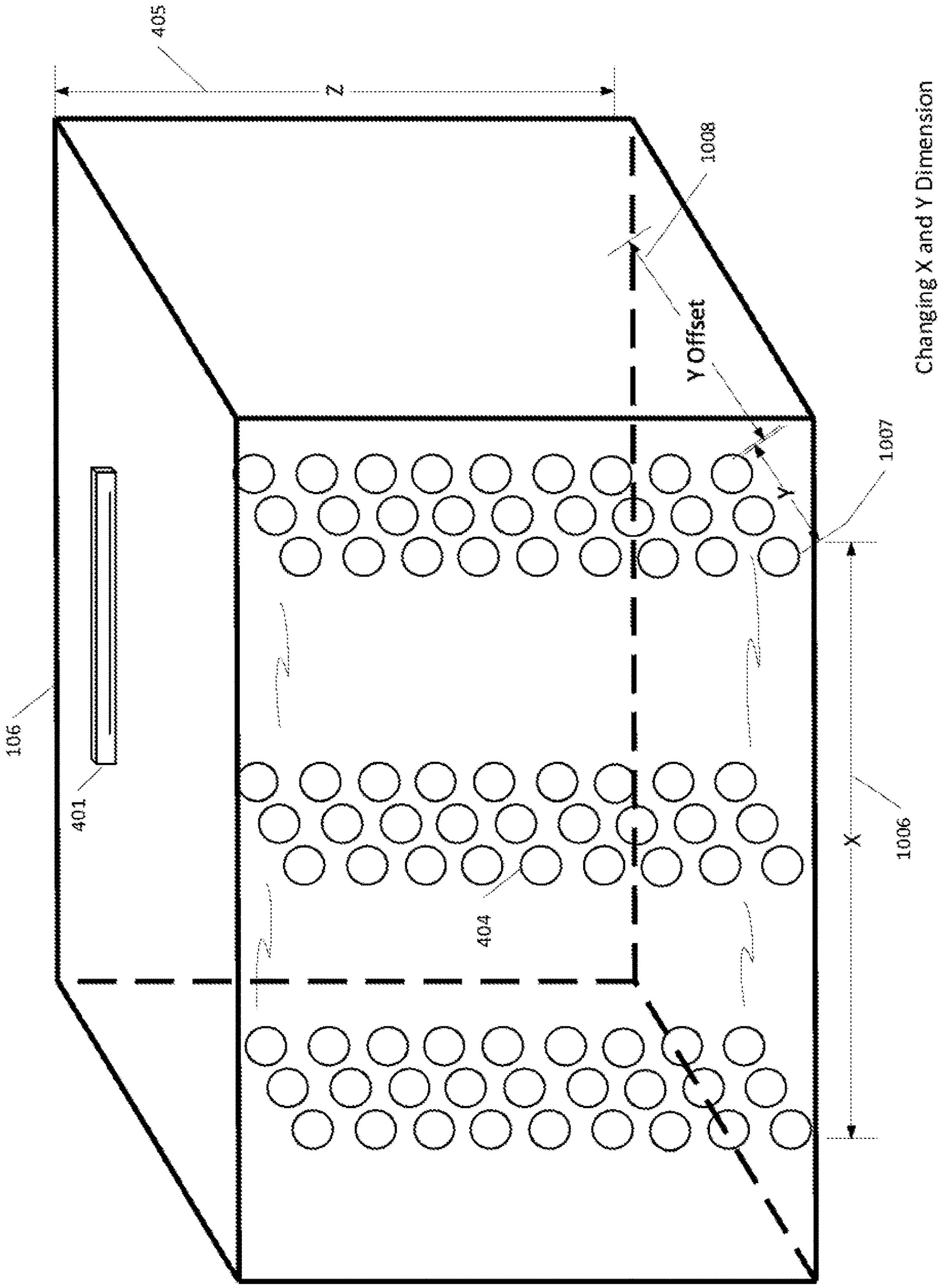

FIG. 10*e* illustrates what a 3D sound field region configured at a distance from the microphone system 401 may be like in 3D space 106 with both the X dimension 1006 and Y dimension 1007 constrained. The region 1009 is now located away from the physical device by an offset 1008 along the Y axis in the shared space 106. It should be noted that constraining the virtual microphone 404 focus region in the Y dimension 1007 and the X dimension 1006 severely attenuates sound sources beyond the region in the shared space. FIG. 10*f* is a top down view of the same sound field region 1009 in the shared space 106.

Figure 10G:
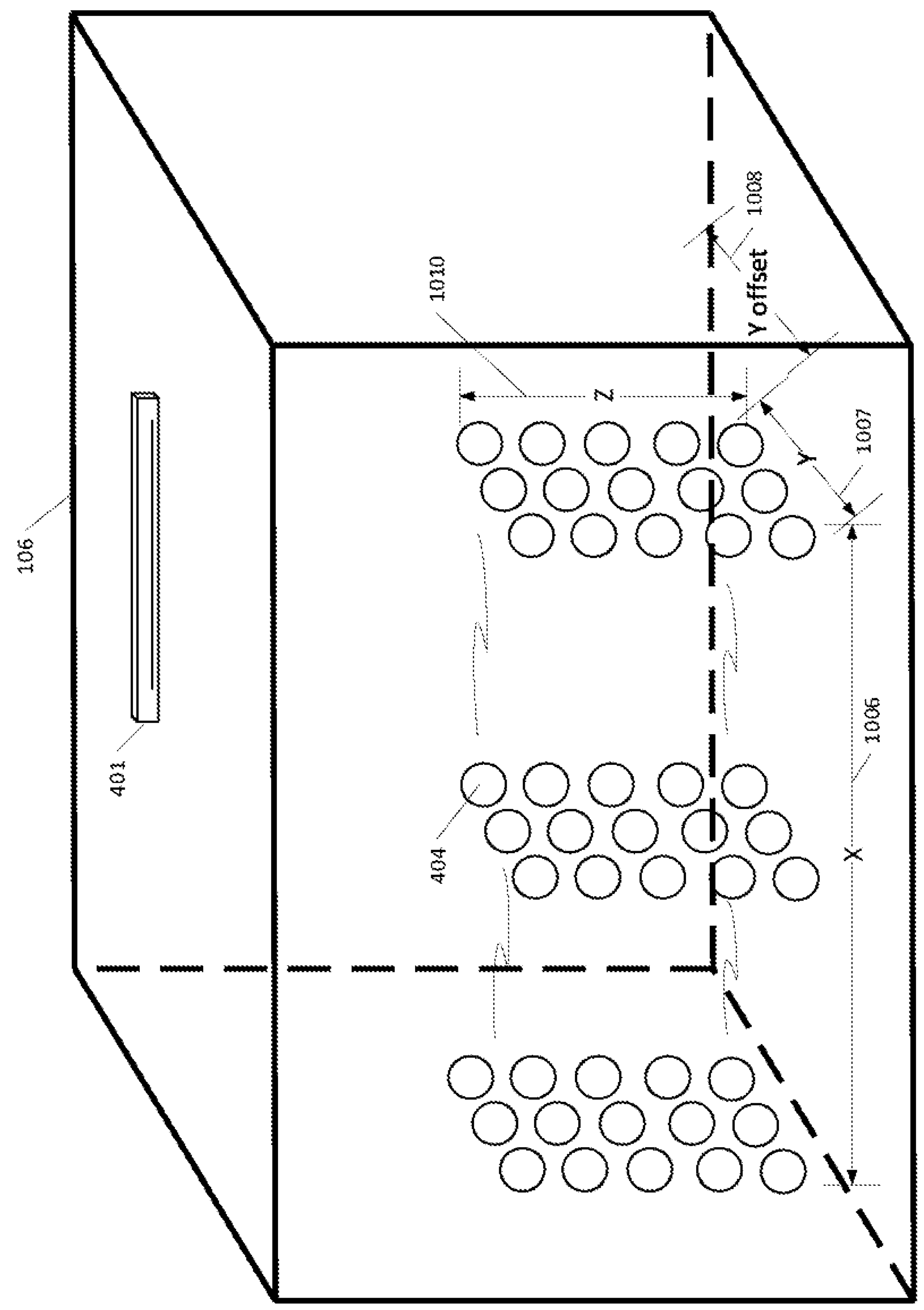

FIG. 10*g* illustrates what a 3D sound field region that is configured at a distance from the microphone system 401 may be like in 3D space 106 with the Z dimension 1010, X dimension 1006, and Y dimension 1007 constrained. The region is offset by a Y offset 1008 in the shared space 106. It should be noted that in the focus region the virtual microphones 404 are constrained in the Z dimension 1010, Y dimension 1007, and the X dimension 1006, severely attenuating sound sources beyond the Y dimension 1001 in the shared space.

FIGS. 11*a*, 11*b*, 11*c*, 11*d*, 11*e*, 11*f*, 11*g* and 11*h* are diagrammatic illustrations of a 3D sound field with virtual microphone, region and/or group profiles applied to form a consistent 3D dimensioned and positioned sound field region in a 3D shared space across different microphone array mounting positions. The sound field configuration can be maintained in position, shape, and size at any location within the shared space. This is possible due to the high density of distributed virtual microphones 404 and the configurable coverage grids. This results in the microphone system 401 not having rigid placement constraints thus being able to form the same virtual microphone 404 grid regardless of mounting position.

Figure 11A:
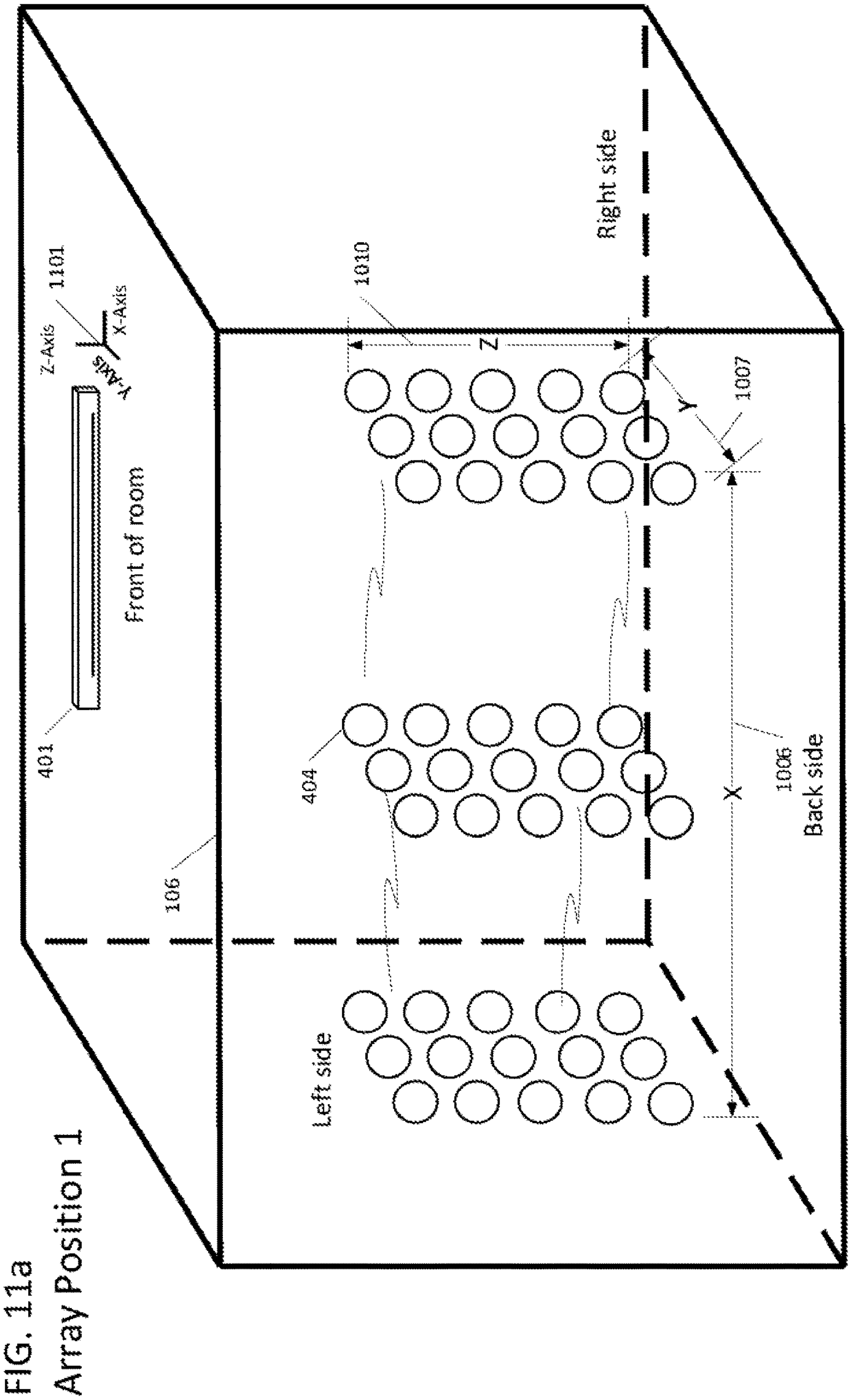
FIGS. 11*a*, 11*b*, 11*c*, 11*d*, 11*e*, 11*f*, 11*g*, and 11*h* are diagrammatic illustrations of a 3D sound field with functions applied to form a constant 3D dimensioned and positioned sound field region in a 3D shared space across different microphone array mounting positions.
Figure 11B:
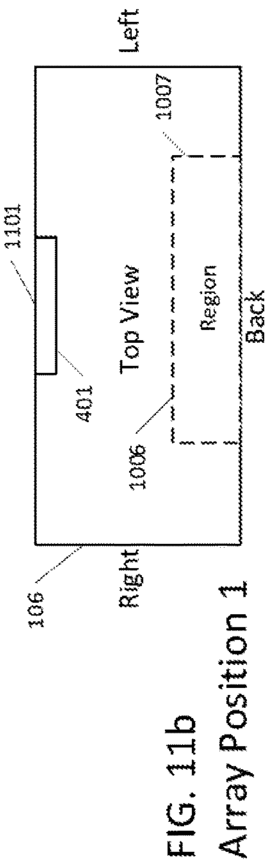

FIGS. 11*a* and 11*b* illustrates a front of the room mounting position 1101 for the microphone system 401. Region 1006, 1007 configuration stays consistent and the same.

Figure 11C:
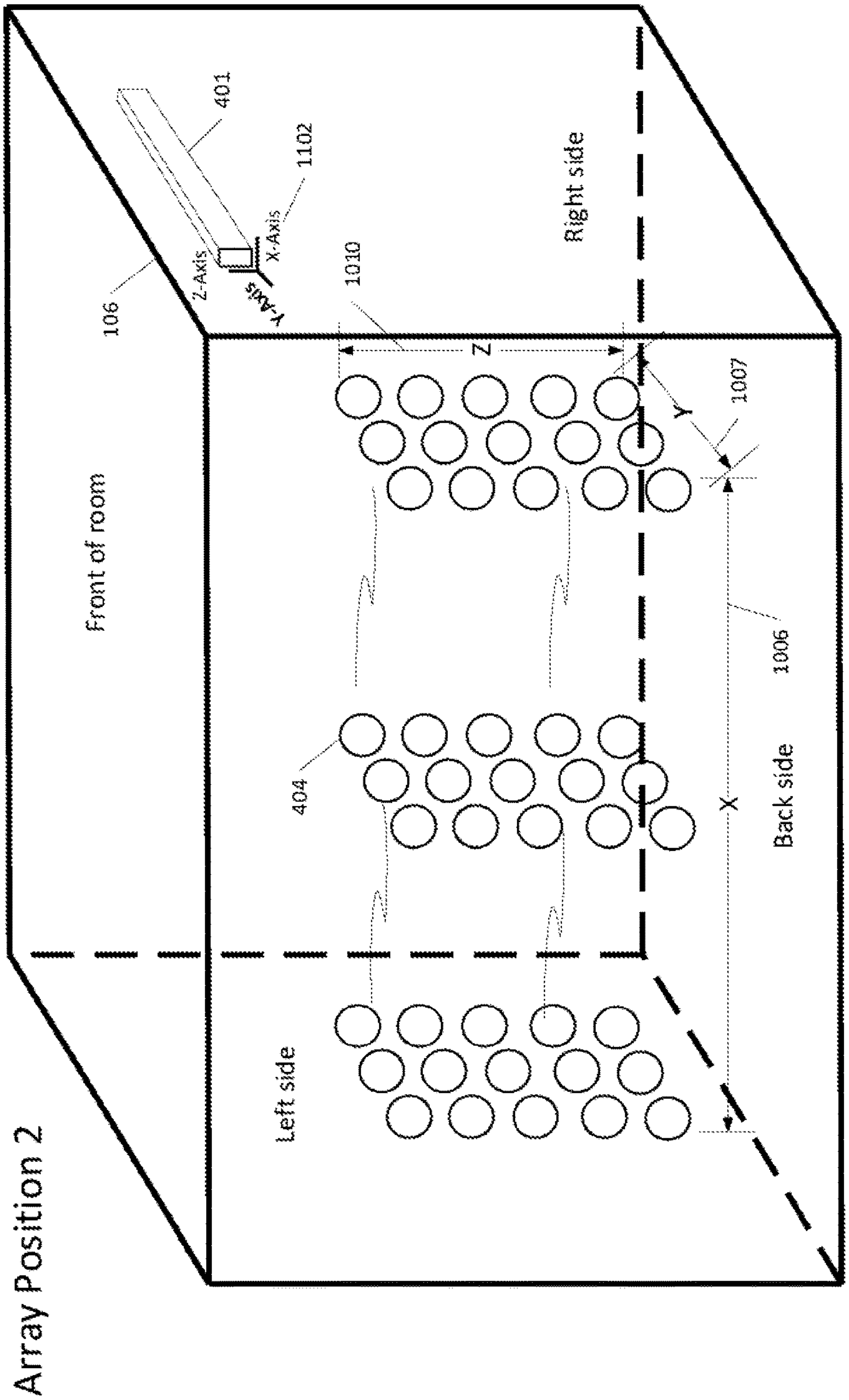
Figure 11D:
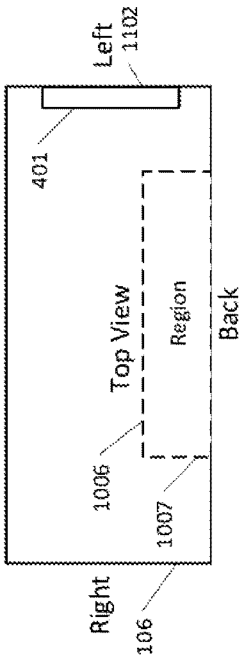

FIGS. 11*c* and 11*d* illustrates a right side of the room mounting position 1102 for the microphone system 401. Region 1006, 1007 configuration stays consistent and the same.

Figure 11E:
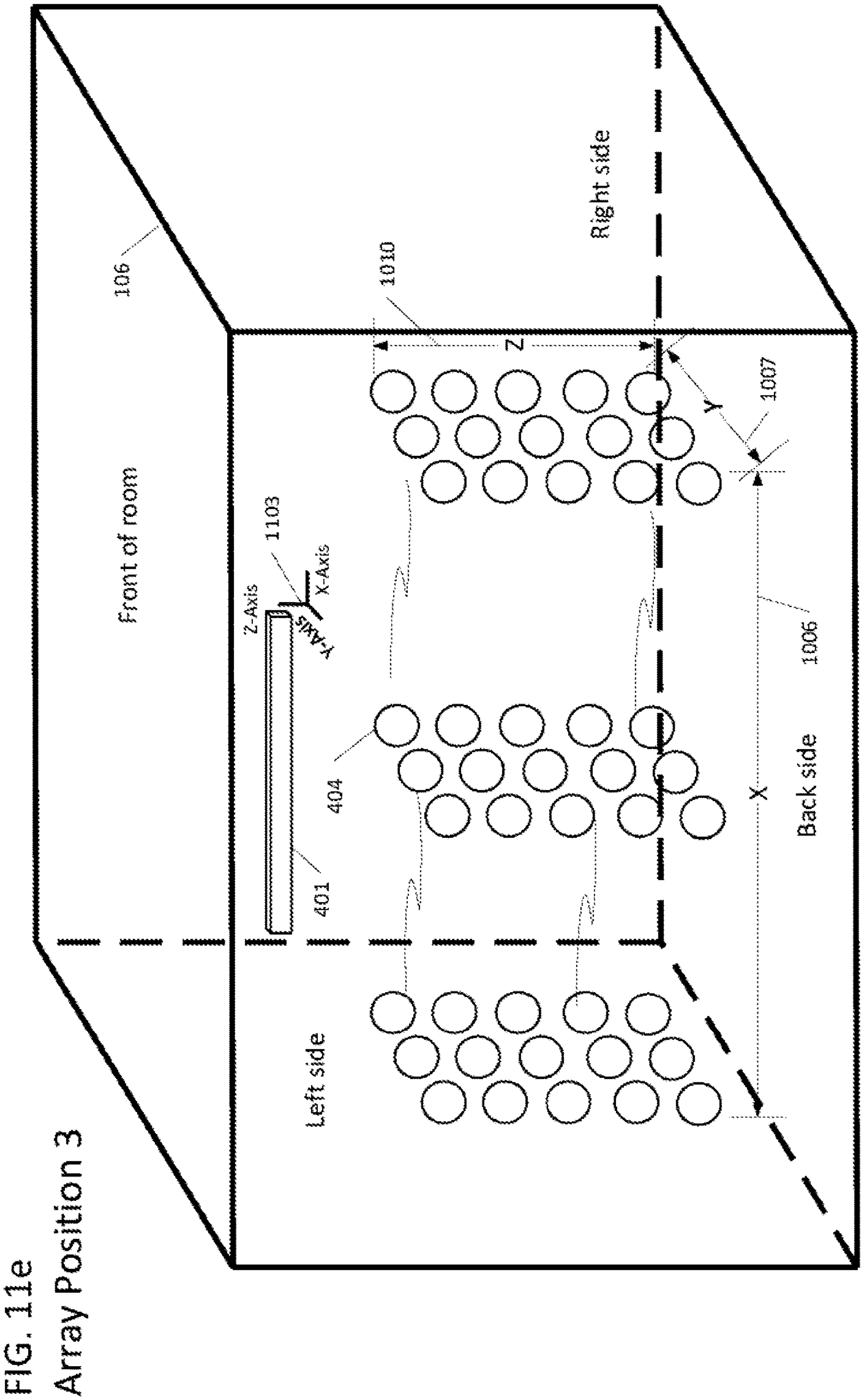
Figure 11F:
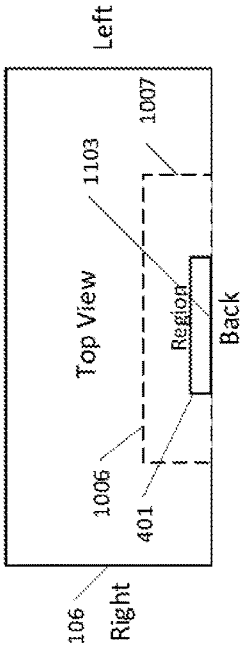

FIGS. 11*e* and 11*f* illustrates a back side of the room mounting position 1103 for the microphone system 401. Region 1006, 1007 configuration stays consistent and the same.

Figure 11G:
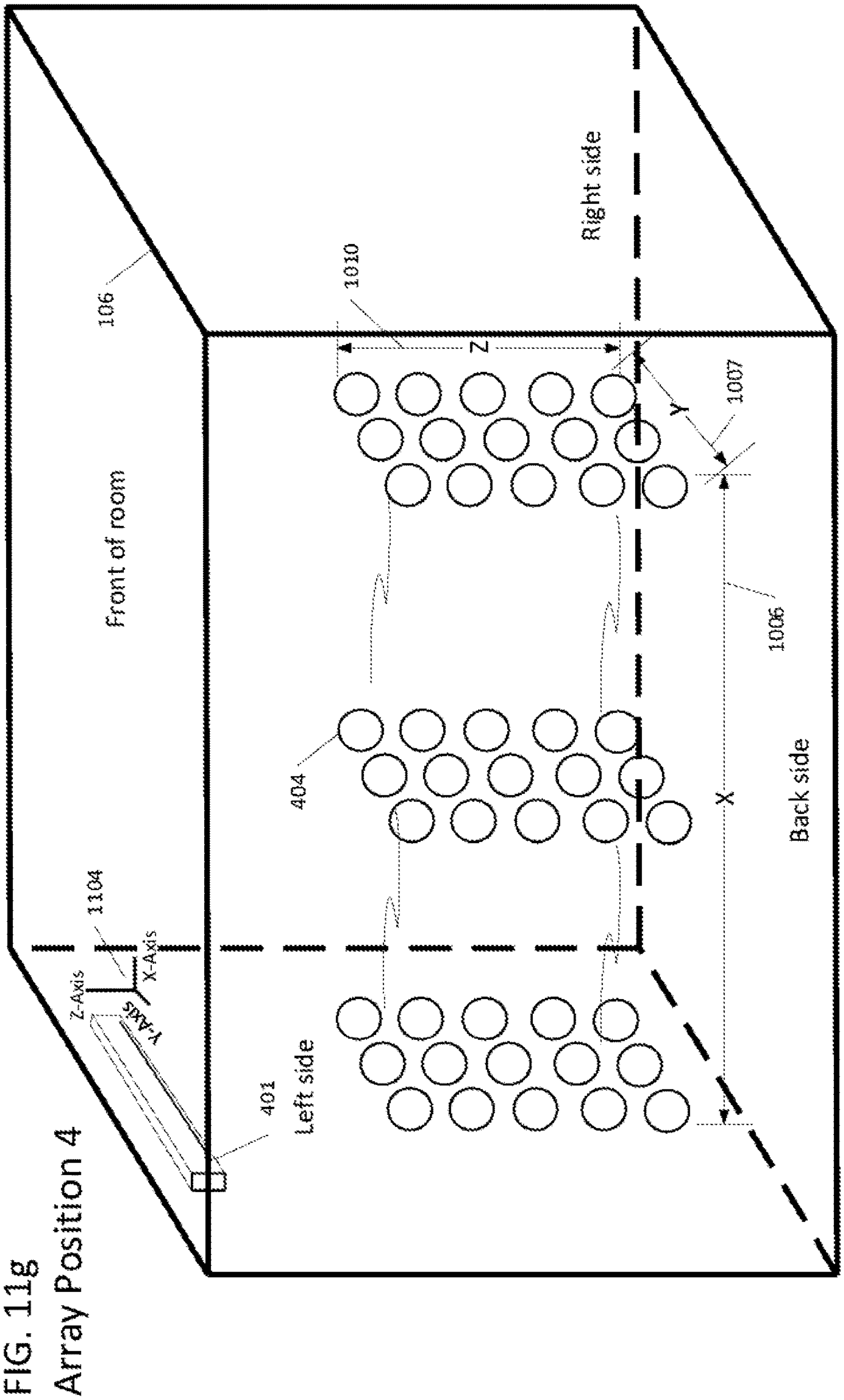
Figure 11H:
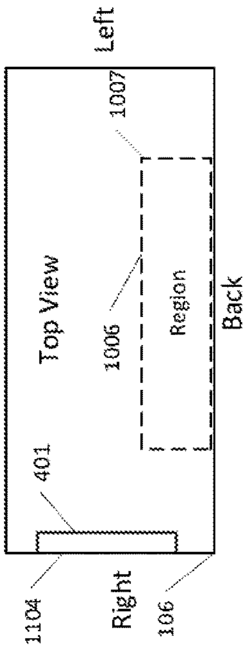

FIGS. 11*g* and 11*h* illustrates a left side of the room mounting position 1104 for the microphone system 401. Region 1006, 1007 configuration stays consistent and the same.

Figure 12A:
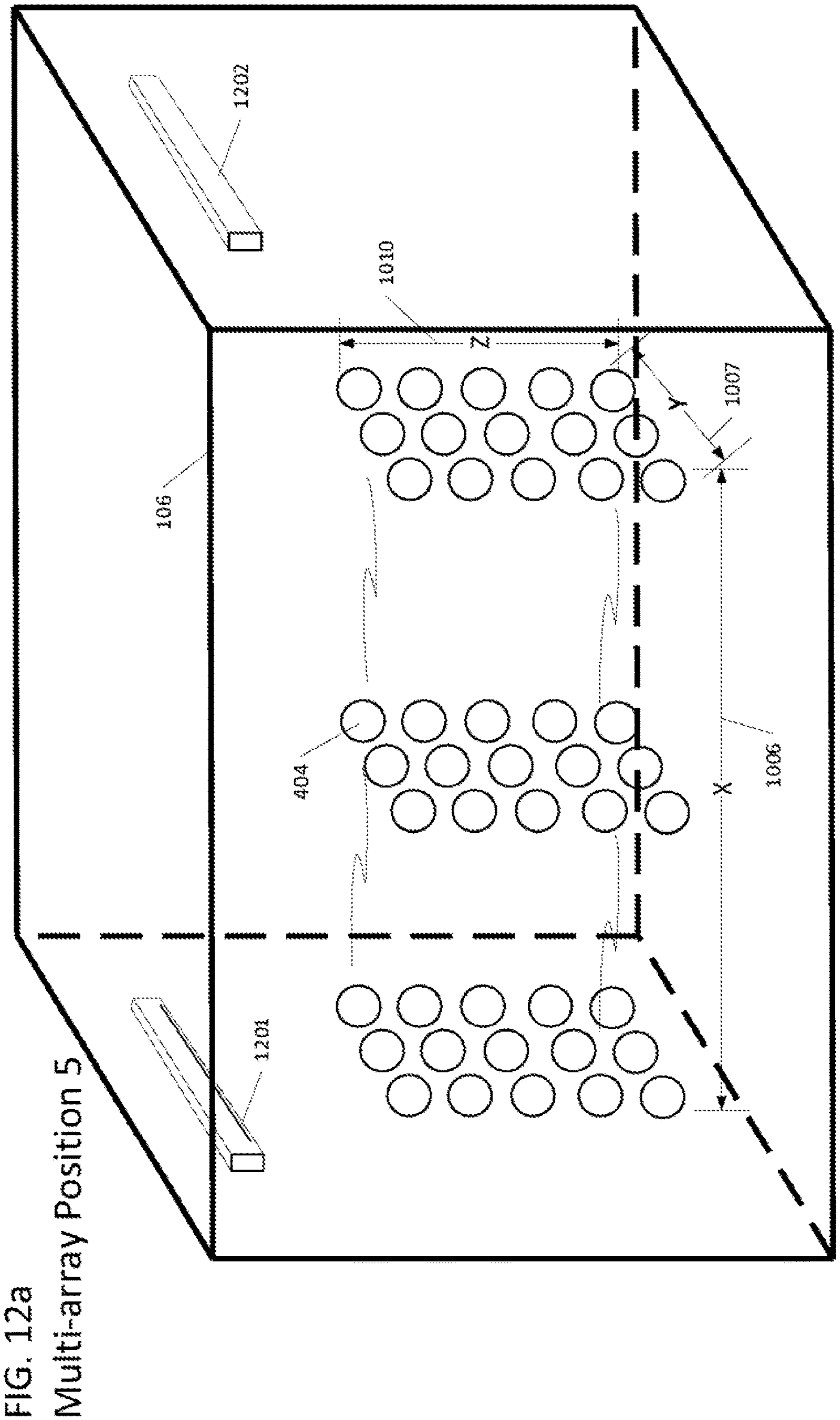
FIGS. 12*a* and 12*b* are diagrammatic illustrations of a 3D sound field with functions applied to form a constant 3D dimensioned and positioned sound field region in a 3D shared space across a plurality of installed microphone arrays.
Figure 12B:
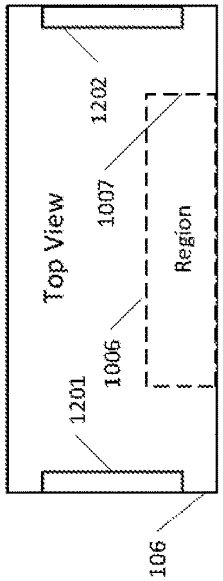

FIGS. 12*a* and 12*b* are diagrammatic illustrations of a 3D sound field with virtual microphone, region and/or group profiles applied to form a constant 3D dimensioned and positioned sound field region in a shared 3D space across a plurality of installed microphone arrays. Microphone system 1201 and microphone system 1202 are installed in the shared space and can be utilized to create a common sound field region. By using multiple microphone systems 1201, 1202, a higher density virtual microphone 404 grid may be possible. A larger space can be covered and higher 3D (x,y,z) positional accuracy may be maintained across all locations in the shared space.

Figure 13A:
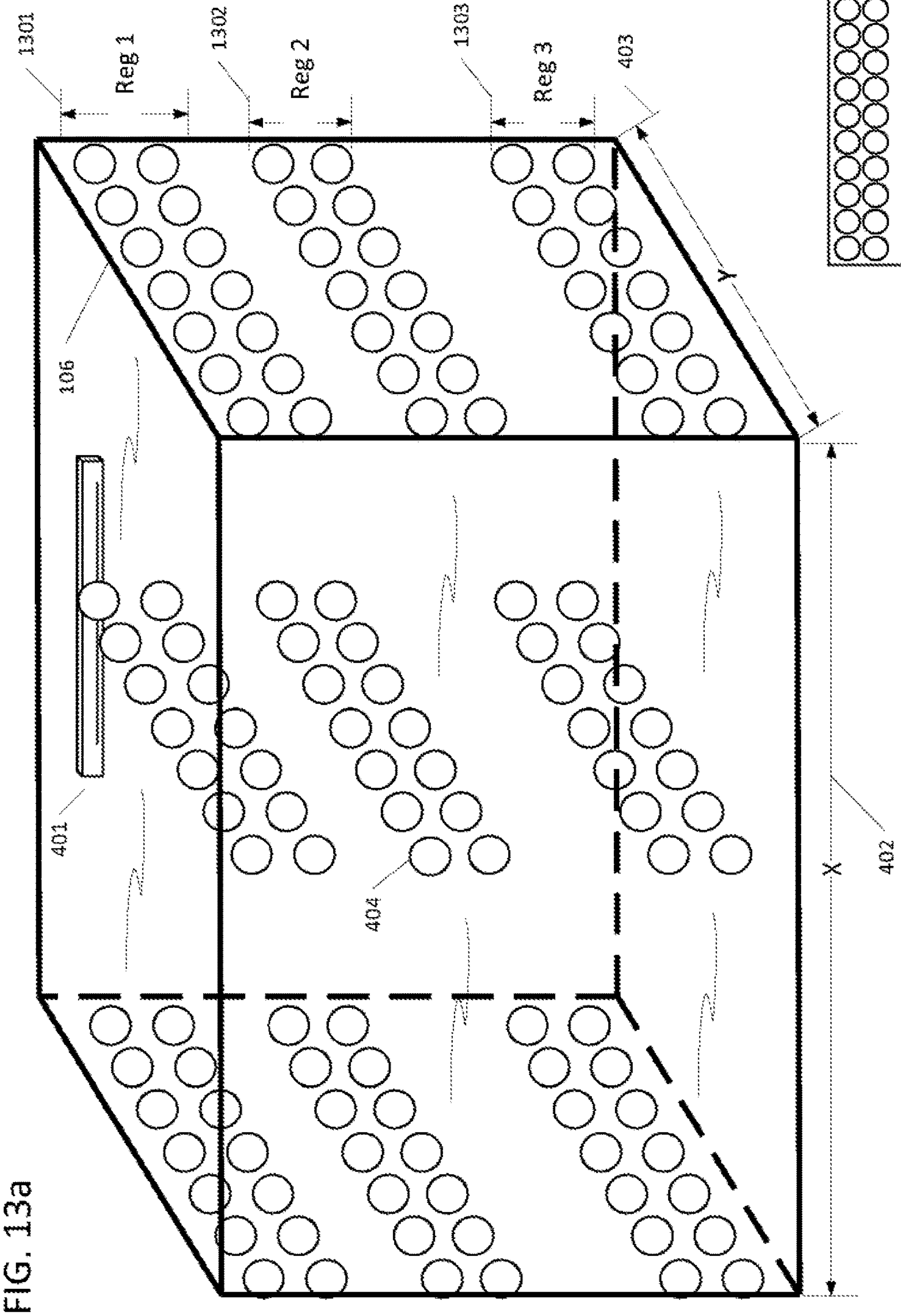
FIGS. 13*a* and 13*b* are diagrammatic illustrations of a 3D sound field map with functions applied to form multiple layered 3D dimensioned and positioned sound field regions in a 3D shared space.
Figure 13B:
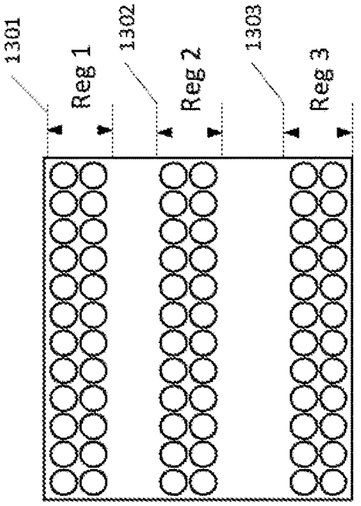

FIGS. 13*a* and 13*b* are diagrammatic illustrations of a 3D sound field map with virtual microphone, region and/or group profiles applied to the virtual microphones 404 to form multiple layered 3D dimensioned and positioned sound field regions in a 3D shared space. As per other 3D sound field regions, a region can be configured to have multiple layers of regions of virtual microphones 404 in the 3D space. The regions can be constrained or increased in any dimension 402, 403, 405 and each layer can be its own size and is not dependent on the adjacent layer. Curved layers and dished shaped layers are all configurable. By configuring each individual virtual microphone 404 through a profile setting, any combination of virtual microphone 404 layout is possible to form any shape, pattern, size, or shape and coverage option in the shared space. The layered regions can be distributed in any pattern and spacing that is required. In this example, 3 regions Reg 1 1301, Reg 2 1302 and Reg 3 1303 are configured, but any number of layered regions can be created.

Figure 14A:
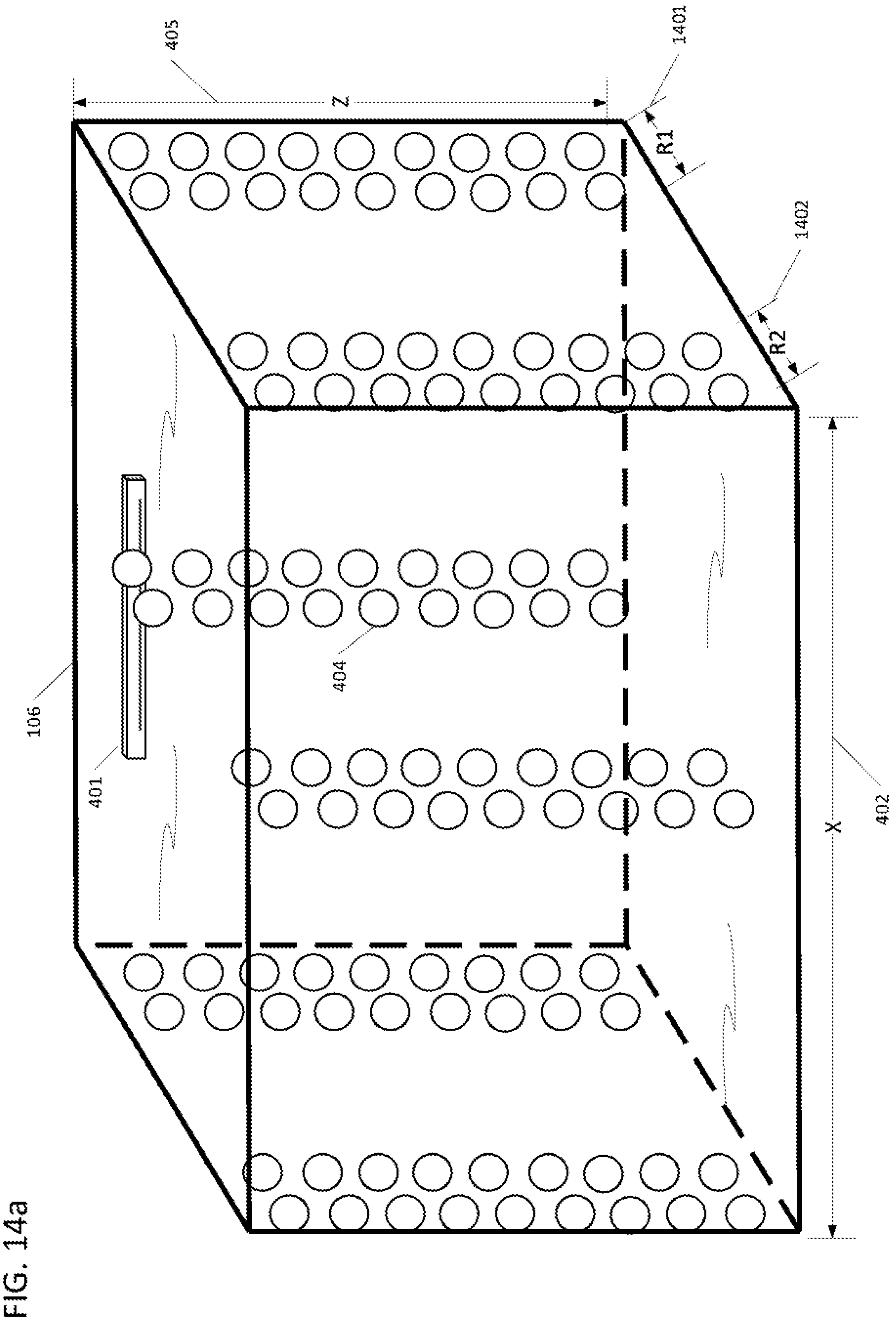

FIGS. 14*a* and 14*b* are diagrammatic illustrations of a 3D regional sound field with virtual microphone, region and/or group profiles applied to form multiple columns of 3D dimensioned and positioned sound field regions in a 3D shared space. The columns can be distributed in any pattern and spacing that is required. In this example, 2 regions R1 1401, R2 1402 are configured, but any number of column regions can be created.

Figure 15A:
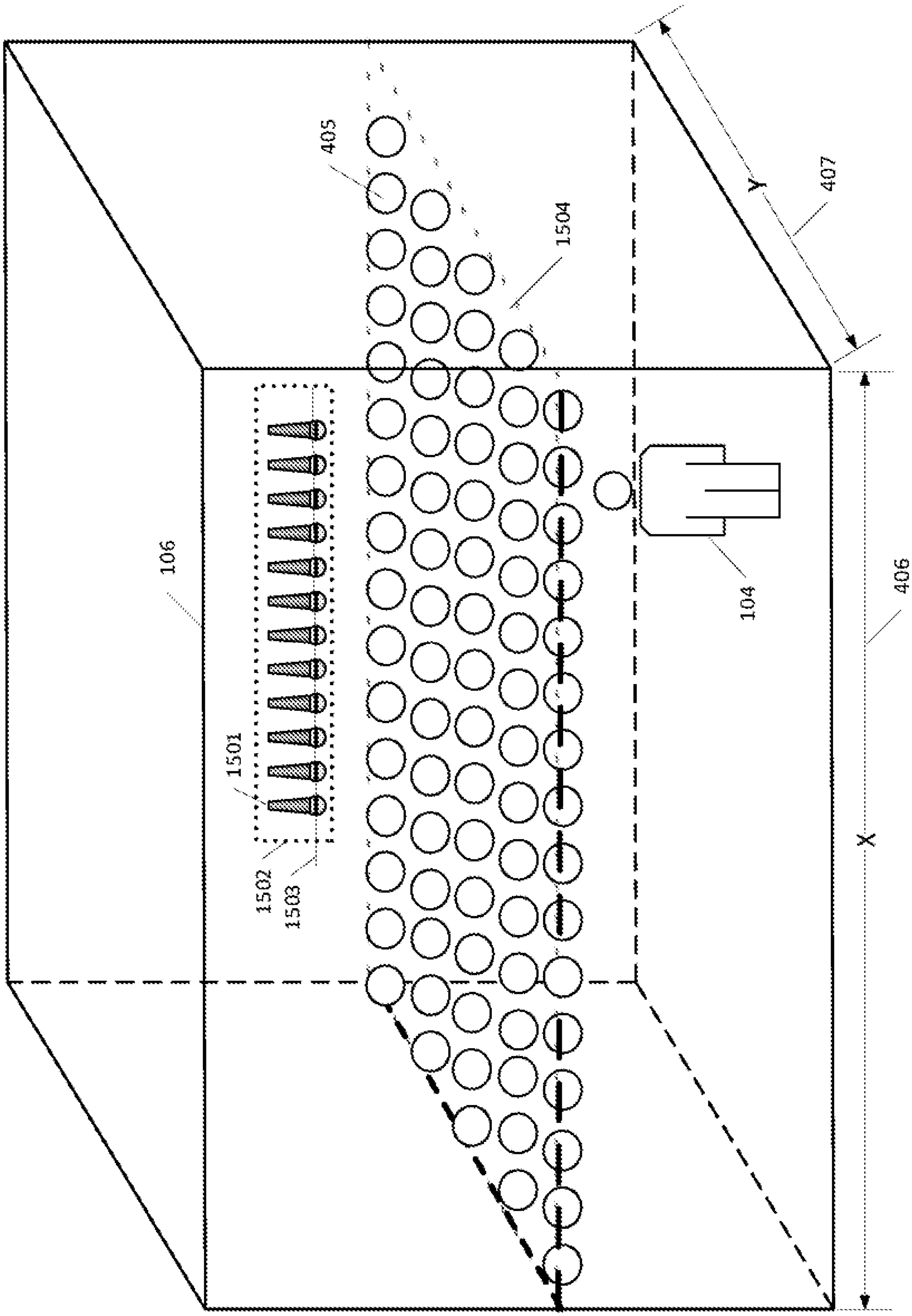
FIGS. 15*a* and 15*b* are diagrammatic illustrations of a plurality of 2D regional sound field maps with virtual microphone functions applied to form multiple variable complex 2D dimensioned and positioned sound field regions in a 3D shared space where a linear microphone array is used to create the sound field regions.
Figure 15B:
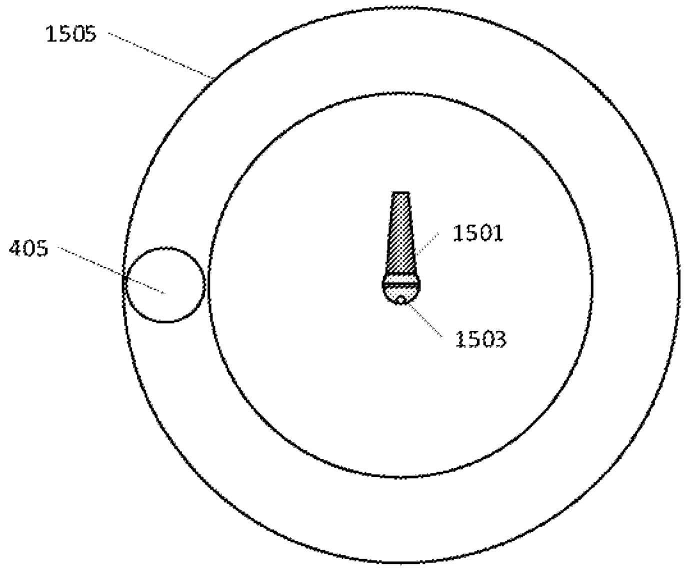

FIGS. 15*a* and 15*b* are diagrammatic illustrations of a plurality of 2D regional sound field maps which may have virtual microphone, region and/or group profiles applied to form multiple variable complex 2D dimensioned and positioned sound field regions in a 3D shared space where a linear microphone array is used to create the sound field regions.

Figure 16A:
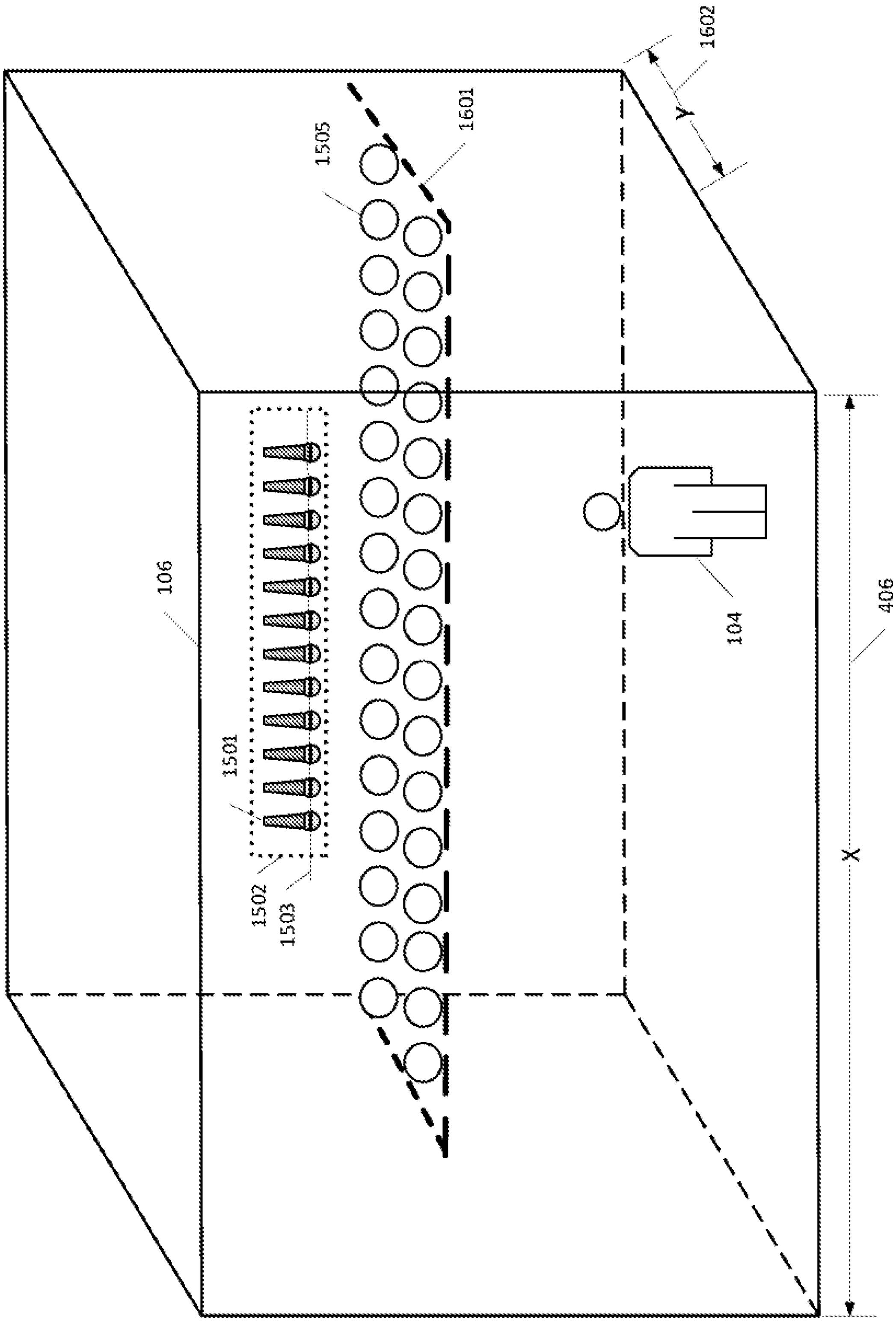
FIGS. 16*a* and 16*b* are diagrammatic illustrations of a 2D regional sound field map with virtual microphone functions applied to form a reduced sound field region that is positioned at the front of the 3D shared space.
Figure 16B:
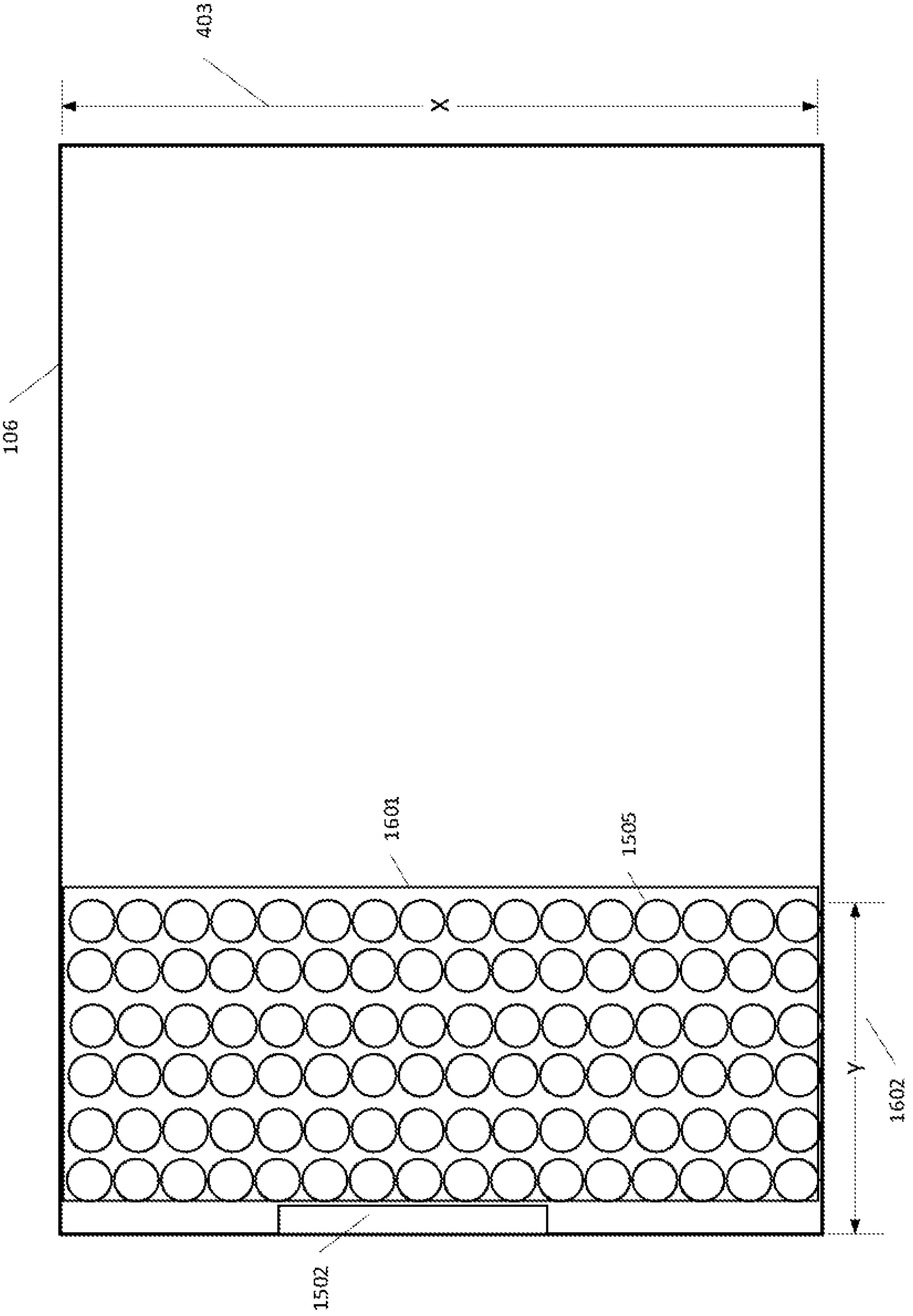

FIGS. 16*a* and 16*b* are diagrammatic illustrations of a 2D regional sound field map which may have virtual microphone 404, region and/or group profiles applied to form a reduced sound field region that is positioned at the front of the 3D shared space.

Figure 17A:
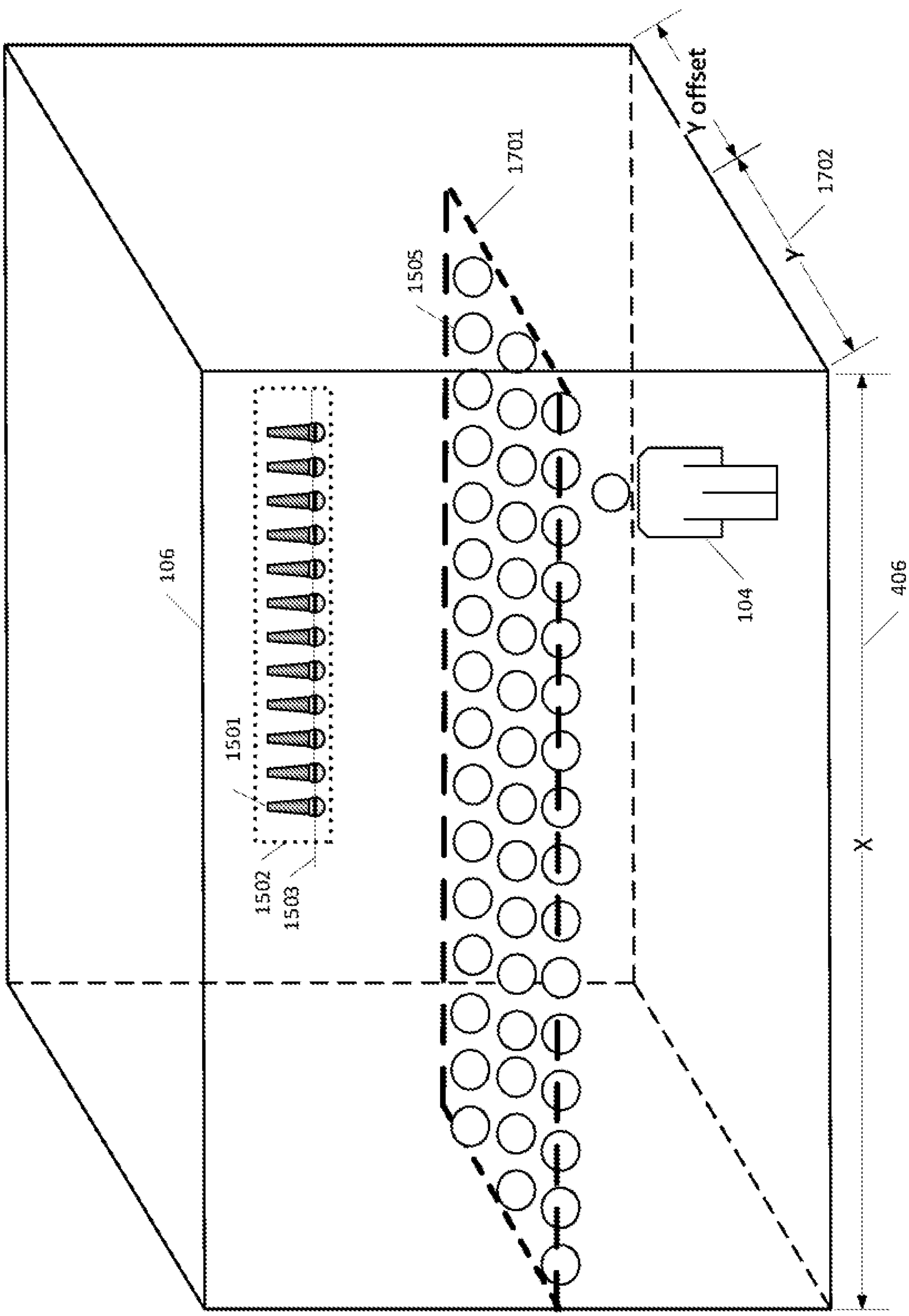
FIGS. 17*a* and 17*b* are diagrammatic illustrations of a 2D regional sound field map with virtual microphone functions applied to form a reduced sound field region that is positioned at the back of the 3D shared space.
Figure 17B:
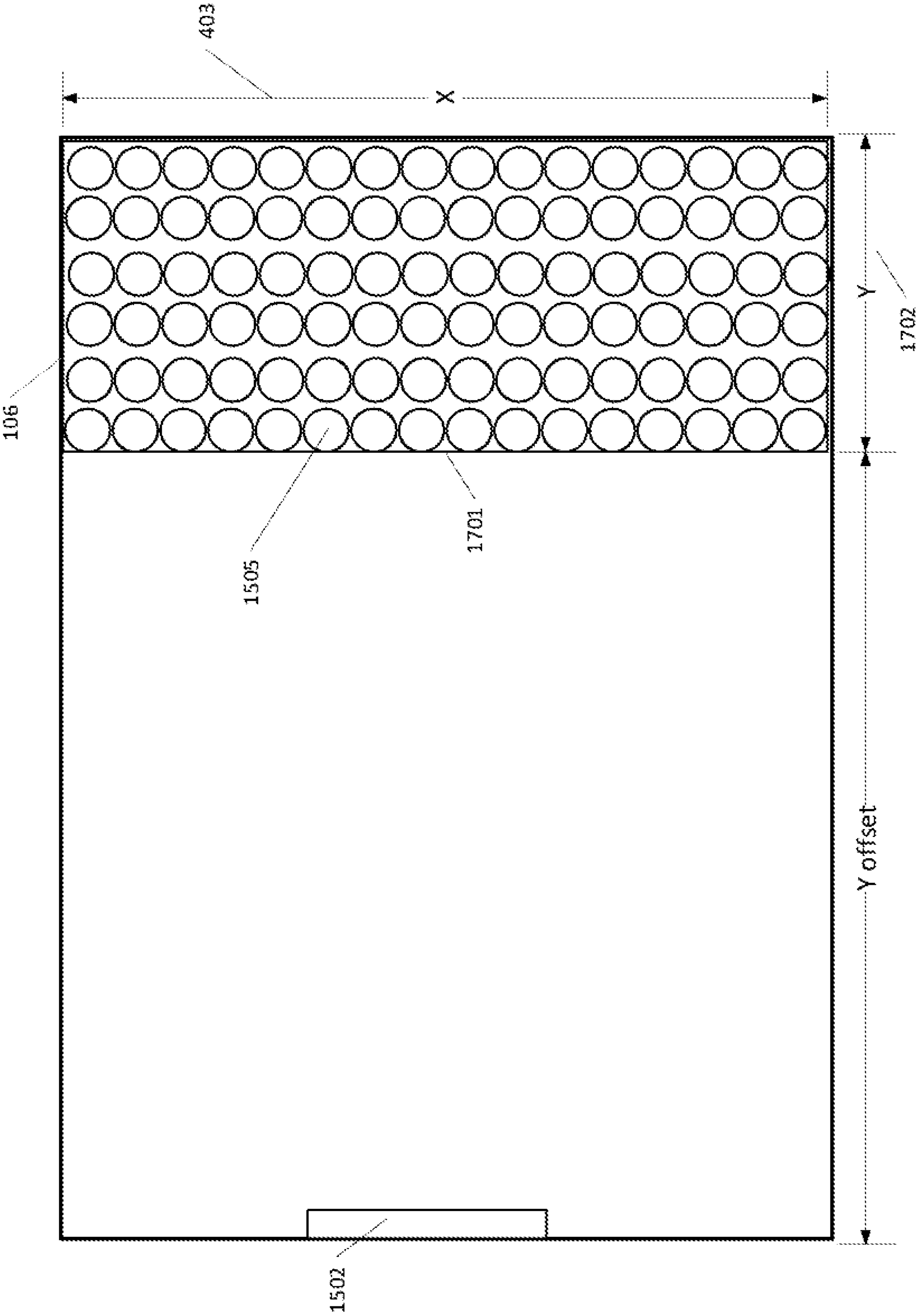

FIGS. 17*a* and 17*b* are diagrammatic illustrations of a 2D regional sound field map which may have virtual microphone 404, region and/or group profiles applied to form a reduced sound field region that is positioned at the back of the 3D shared space.

Figure 18A:
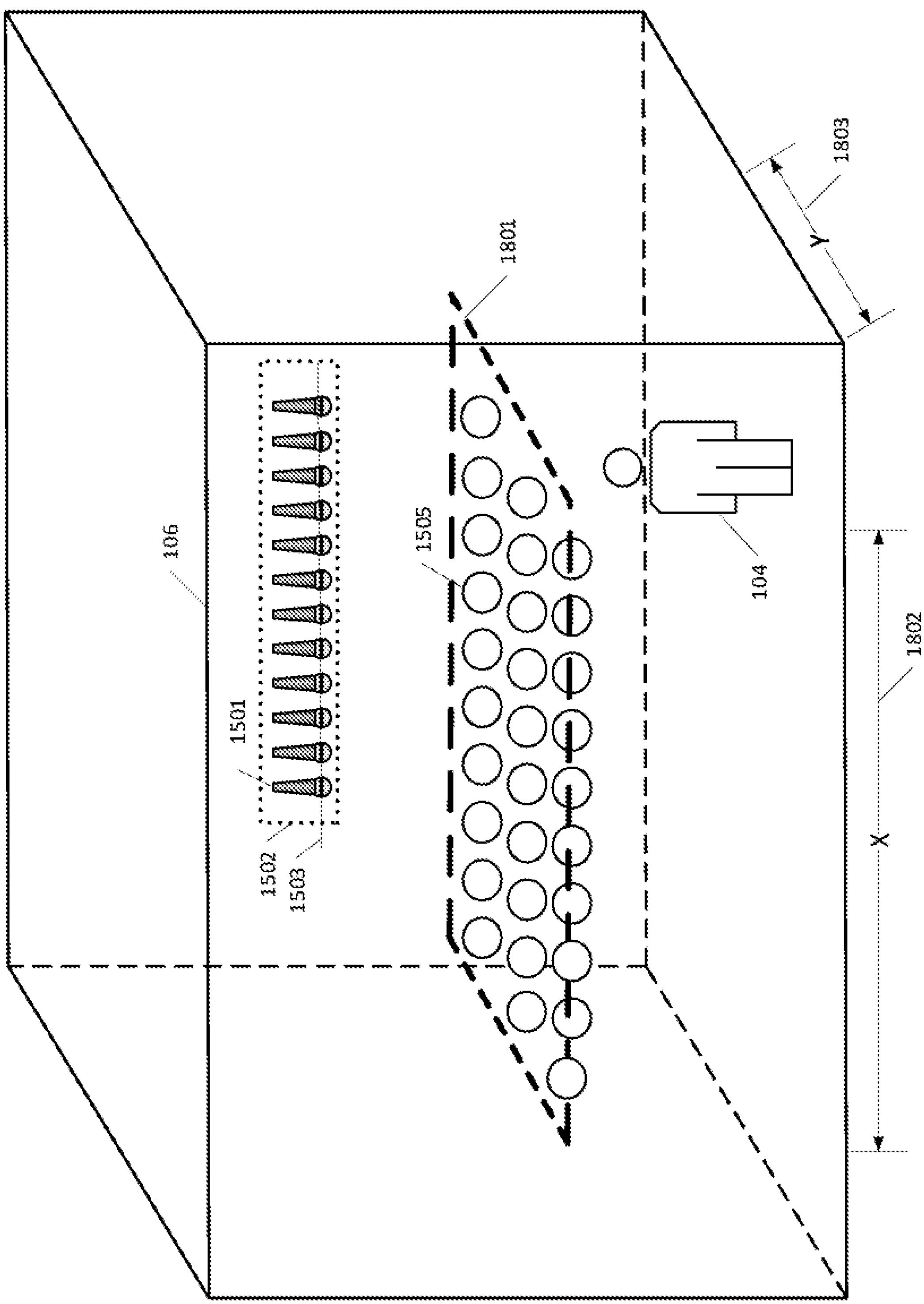
FIGS. 18*a* and 18*b* are diagrammatic illustrations of a 2D regional sound field map with virtual microphone functions applied to form a further reduced sound field region that is positioned in the back of the 3D shared space.
Figure 18B:
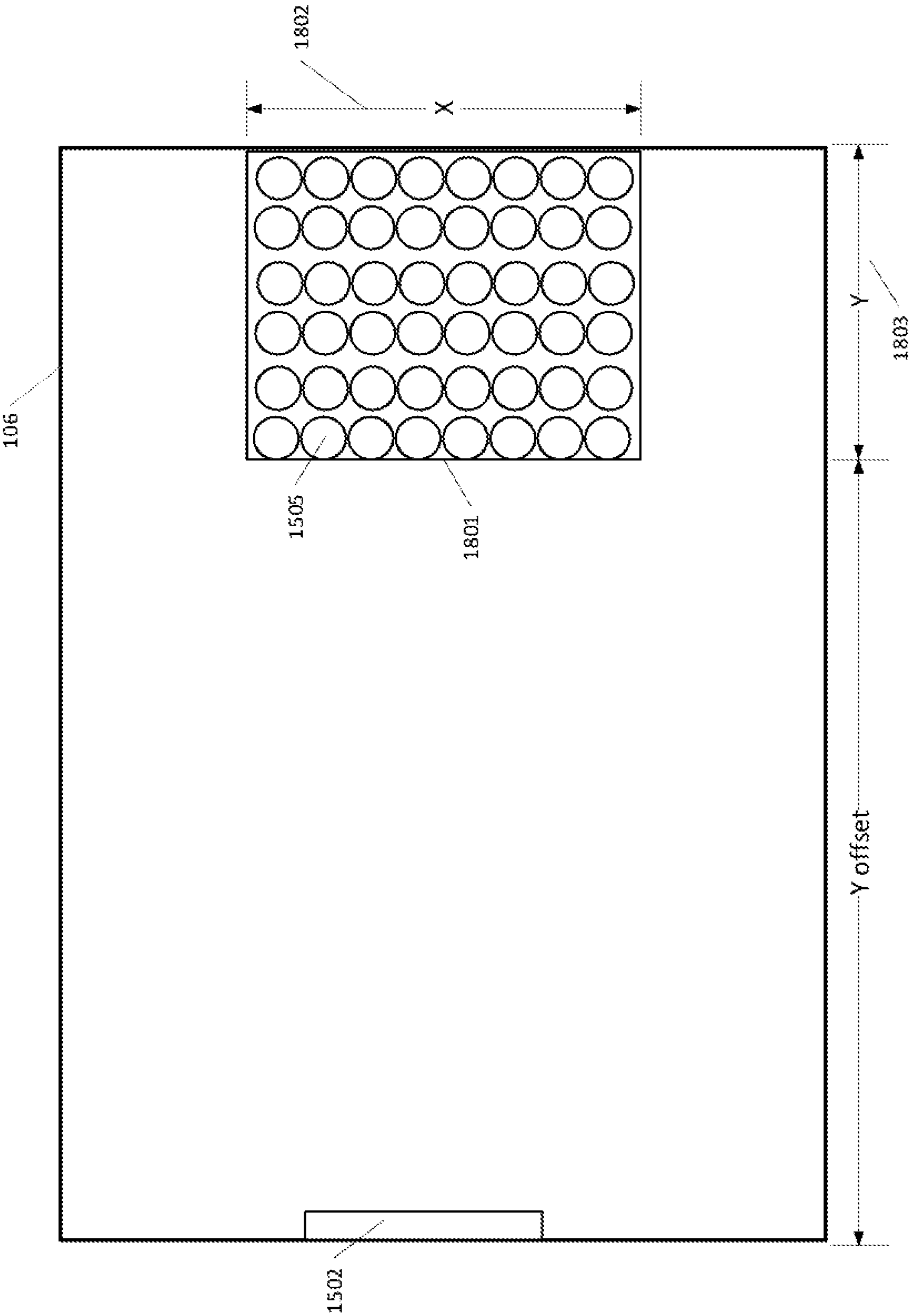

FIGS. 18*a* and 18*b* are diagrammatic illustrations of a 2D regional sound field map which may have virtual microphone 404, region and/or group profiles applied to form a further reduced sound field region that is positioned in the back of the 3D shared space.

Figure 19A:
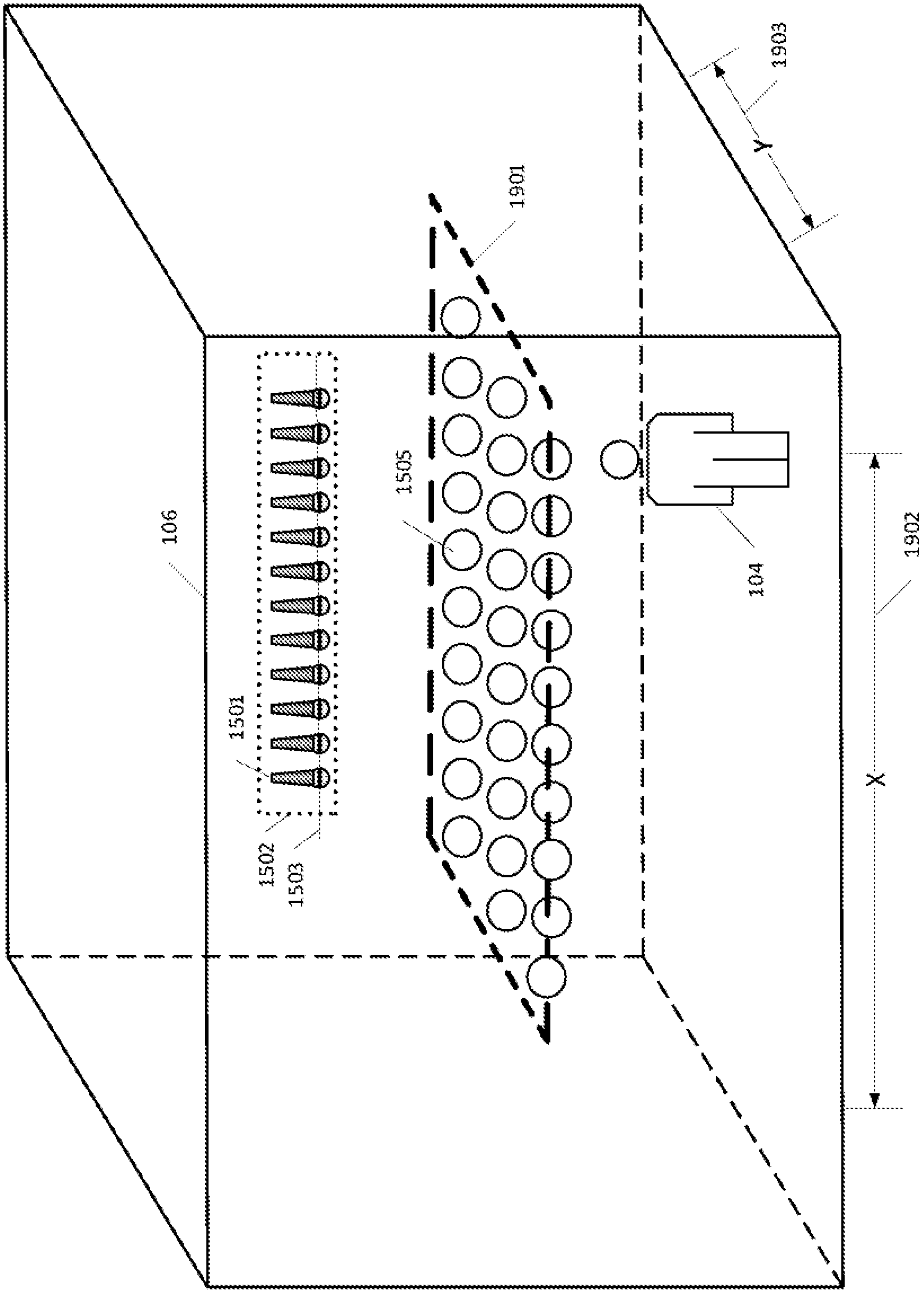
FIGS. 19*a* and 19*b* are diagrammatic illustrations of a 2D regional sound field map with virtual microphone functions applied to form a further reduced sound field region that is positioned in the center of the 3D shared space.
Figure 19B:
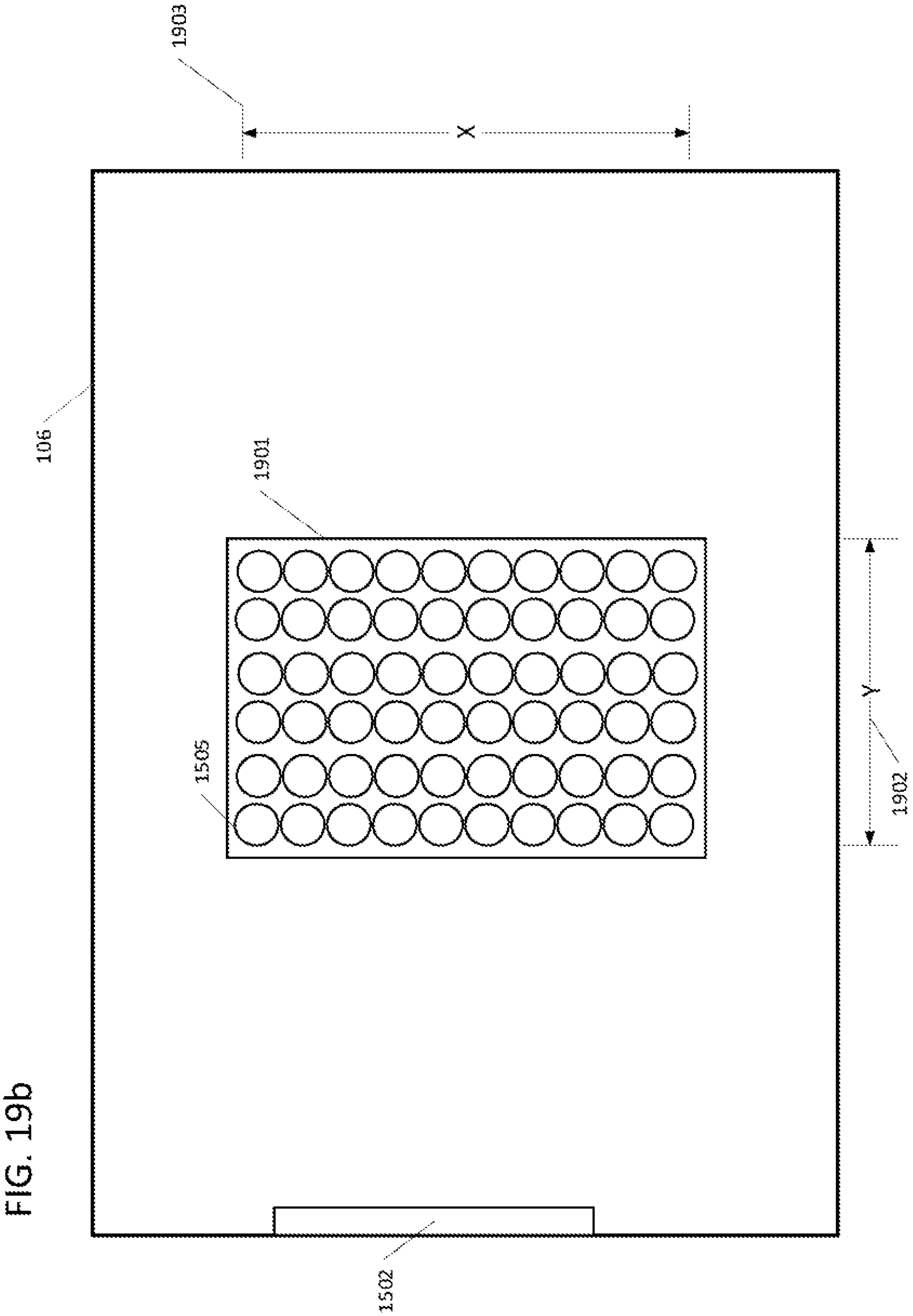

FIGS. 19*a* and 19*b* are diagrammatic illustrations of a 2D regional sound field map which may have virtual microphone 404, region and/or group profiles applied to form a further reduced sound field region that is positioned in the center of the 3D shared space.

FIG. 20 is an illustration of a generalized processing flow relating to Object Profile Functions and inheritance/overloading. This processing flow is preferably carried out by the one or more processors illustrated in FIG. 24, operating on computer program code per the following. This flow only demonstrates how Object Profile Functions are processed and assumes location and active/inactive state of Object Profiles has already been determined. Decision block 2001 determines if the selected inheritance scheme is Virtual Microphone 404 first, then Region, then Group. If Yes, the processing proceeds to execute Function blocks 2003, 2004 and 2005 in that order, so that processing in block 2004 will potentially override processing performed in block 2003. Likewise, processing in block 2005 may potentially override processing performed in blocks 2003 and 2004. Of equal importance, processing in the three function blocks may be completely independent and not have any effect on any previous processing already performed as this is entirely implementation specific. Through profile attributes many possible functional logic flows are possible allowing the functions to pass information and data to the following overloaded profile be it a region profile and/or a group profile. By allowing multiple layers of processing to be applied to any VM 404 through the shared space 106 complex and dynamic room and sound pickup situations are able to be optimized for the best sound quality pickup. Gain, filtering, noise suppression, echo cancelation, automatic speech recognition, equalization and audio processing DSP (digital signal processing) or analog signal processing for example and any combination thereof can be implemented at any VM 404, region and group profile level.

Decision block 2002 determines if the selected inheritance(s) scheme is Group first, then Region, then Virtual Microphone 404. If Yes, the processing effects are identical to those already described, merely in reverse order. This implementation flexibility allows the system and/or user the flexibility to configure the shared space 106 optimally to meet their needs. If the decision from block 2002 is No, the final option of a fully custom function processing sequence is used where Profile Functions from Virtual Microphones 404, Regions and Group may be executed in any sequence as required based on the attributes set in the object profiles.

FIG. 21 illustrates how raw microphone signals 2105 are input into two separate processing blocks: a Targeting Mechanism 2100 and an Audio Processing Engine 2101. The purpose of the Targeting Mechanism 2100 is to determine where various sound sources are located in 2D or 3D space within the audio system environment. A notable component of the Targeting Mechanism 2100 is the ability to apply Object Profile Functions prior to the final target decision making process as detailed in FIGS. 23*a*, 23*b* and 23*c*. The Audio Processing Engine 2101 receives the raw microphone signals 2105 plus location information from the Targeting Mechanism 2100. By utilizing the location information 2102 provided by the Targeting Mechanism, the Audio Processing Engine 2101 is able to implement custom audio processing functions based on the specific targeted location and any combination and order of profile VM 404, region and group functions. An example of location specific audio processing might be, but is not limited to, two different noise suppression filters created to more effectively remove device specific fan noise (i.e. a projector fan versus an HVAC fan). The location of these devices would be known, and specific processing profiles could be created and applied multiple times as required in a given room and even shared across multiple rooms in an organization. The resulting output stream 2103 from the Audio Processing Engine 2101 would be a fully processed audio stream with processing optimized to the sound source location in the environment.

FIG. 22*a* illustrates the signal flow within the bubble processing unit 2100. This example preferably monitors 8192 bubbles simultaneously. The sound from each microphone element 2204 is sampled at the same time as the other elements within the microphone array 2203 and at a fixed rate of 12 kHz. Each sample is passed to a microphone element processor 2206 illustrated in FIG. 22*b*. The microphone element processor 2206 preferably conditions and aligns the signals in time and weights the amplitude of each sample so they can be passed on to the summing node 2210.

The signal components 2207 from the microphone's element processor 2206 are summed at node 2210 to provide the combined microphone array 2203 signal for each of the 8192 bubbles. Each bubble signal is preferably converted into a power signal at node 2211 by squaring the signal samples. The power signals are then preferably summed over a given time window by the 8192 accumulators at node 2212. The sums represent the signal energy over that time period.

The processing gain for each bubble is preferably calculated at node 2213 by dividing the energy of each bubble by the energy of an ideal unfocused signal 2219. The unfocused signal energy is preferably calculated by Summing 2209 the energies of the signals from each microphone element 2205 over the given time window, weighted by the maximum ratio combining weight squared. This is the energy that we would expect if all of the signals were uncorrelated. The processing gain 2213 is then preferably calculated for each bubble by dividing the microphone array signal energy by the unfocused signal energy 2219.

Processing Gain is achieved because signals from a common sound source all experience the same delay before being combined, which results in those signals being added up coherently, meaning that their amplitudes add up. If 12 equal amplitude and time aligned direct signals 2105 are combined the resulting signal will have an amplitude 12× higher, or a power level 144× higher. Signals from different sources and signals from the same source with significantly different delays as the signals from reverb and noise do not add up coherently and do not experience the same gain. In the extremes, the signals are completely uncorrelated and will add up orthogonally. If 12 equal amplitude orthogonal signals are added up, the signal will have roughly 12× the power of the original signal or a 3.4× increase in amplitude (measured as rms). The difference between the 12× gain of the direct signal 2105 and the 3.4× gain of the reverb and noise signals is the net processing gain (3.4 or 11 dB) of the microphone array 2203 when it is focused on the sound source 2201. This makes the signal sound as if the microphone 2204 has moved 3.4× closer to the sound source. This example used a 12 microphone array 2203 but it could be extended to an arbitrary number (N) resulting in a maximum possible processing gain of sqrt(N) or 10 log (N) dB.

The bubble processor system 2100 preferably simultaneously focuses the microphone array 2203 on 8192 points 404 in 3-D space using the method described above. The energy level of a short burst of sound signal (50-100 ms) is measured at each of the 8192 virtual microphone bubble 404 points and compared to the energy level that would be expected if the signals combined orthogonally. This gives us the processing gain 2213 at each point. The virtual microphone bubble 404 that is closest to the sound source 2201 should experience the highest processing gain and be represented as a peak in the output. Once that is determined, the location is known.

Node 2217 preferably searches through the output of the processing gain unit 2213 and/or other data accumulated and/or gathered (2210, 2211, 2212, 2214, 2215, 2216, 2219, 2220, 2221, 2222, 2223, 22068) for the bubble with the highest processing gain or other criteria as determined by the Virtual Microphone, Region and/or Group Profile Targeting Functions. It should be noted that multiple target points are possible when sound sources are above a target threshold level and/or close to the same level resulting multiple target VM(s) 404 being passed and streamed to the Audio Processing engine 2101. If the profile targeting functions where to use an ASR detection capability, then the target VM(s) 404 would be determined based on an ASR positive result as an example. The (x,y,z) location and other source signal attributes 2102 of the virtual microphone 404 corresponding to that bubble can then be determined by looking up the index in the original configuration to determine the exact location of the Sound Source 2201. The parameters 2102 maybe communicated to various electronic devices to focus them to the identified sound source position. After deriving the location of the sound source 2201, focusing the microphone array 2206 on that sound source 2201 can be accomplished after achieving the gain. The Targeting (Bubble) Processor 2100 is designed to find the sound source 2201 quickly enough so that the microphone array 2206 can be focused while the sound source 2201 is active which can be a very short window of opportunity. The bubble processor system 2100 according to this embodiment is able to find new sound sources in less than 100 ms. Once found, the microphone array 2104 focuses on that location to pick up the sound source signal and the system 2100 reports the location of the sound through the Identify Source Signal Position 2217 to other internal processes and to the host computer so that it can implement sound sourced location based applications. Preferably, this is the purpose of the bubble processor 2100. each bubble 404 will have a unique propagation delay to the microphones 2204, a dynamic microphone bubble 404 to array pattern is developed. This pattern is unique to that dynamic microphone bubble location. This results in a propagation delay pattern to processing-gain matrix 2215 that is determined in FIGS. 22*a* and 22*b*. Once the max processing gain is determined from the 8192 dynamic microphone bubbles 400, the delay pattern will determine the unique dynamic virtual microphone 404 bubble location. The predefined bubble locations are calculated based on room size dimensions and the required spacing to resolve individual bubbles, which is frequency dependent.

FIG. 23*a* illustrates a high-level logic flow for a preferred implementation of a Targeting Mechanism 2100. A single VM 404 target flow analysis is shown however parallel operation of the targeting mechanism is with in scope and multiple VM(s) 404 can be targeted and processed based on available processing and the desired implementation. Processing blocks 2201, 2202, and 2203 are used to identify a Virtual Microphone (Bubble) as a potential sound source target. Decision block 2204 determines if ANY Object Profiles are active in the microphone system. If not, further processing is bypassed, and the current potential target location is allowed to be output as the new sound source target. If Object Profiles are active, Decision block 2205 further determines if the potential target location is within one or more Object (Virtual Microphone 404, Region, and/or Group) Profiles. If not, the potential target location is ignored and the last good sound source target location within an Object Profile is returned. This step is important to the implementation as it inhibits targeting of sound sources outside any of the desired Virtual Microphone 404, Region, or Group areas in the environment. If Decision block 2205 determines the new target location is within the area of one or more Object (Virtual Microphone 404, Region, and/or Group) Profiles, the target location to be output is updated with the new location 2207, the Object (Virtual Microphone 404, Region, and/or Group) Profile for the targeted sound source is determined 2208, and the Virtual Microphone 404, Region, and/or Group Profile specific targeting functions are executed. The final processing step is to output the targeted location(s) to the Audio Processing Engine 2101.

FIGS. 23*b* and 23*c* demonstrate a more detailed algorithm processing flow for a preferred implementation of a Virtual Microphone 404 Targeting Algorithm 2100. The documented algorithm includes a power smoothing operation 2211, and calculation of precise location information comprising x, y, and z coordinates plus the angle and distance of the targeted location from the physical microphone system. Further processing may be bypassed 2213 if the target is outside an active VM 404, Region, and/or Group profile. Otherwise, the algorithm further includes logic for smoothing transitions between old and new sound sources 2216, 2217, 2218, 2219 2220, 2221, 2222, 2223. The algorithm next determines which Virtual Microphone 404, Region, and/or Group the targeted source is within 2224, and applies the desired targeting functions as defined by the Virtual Microphone 404, Region, and/or Group Profile Functions 2225.

FIG. 23 demonstrates a high-level logic flow for a preferred implementation of an Audio Processing Engine 2101 utilizing raw microphone signals 2105 and location information 2102 to perform optimal audio processing on a signal, based on knowledge of the sound source location(s). As per the targeting mechanism 2100 parallel operation of the audio processing engine 2101 is within scope and allows for multiple targets to be processed concurrently. Initial processing may include standard Echo Cancelation 2301 processing followed by a check to determine if any Object (Virtual Microphone, Region, and/or Group) Profiles are active. If not, standard Echo Reduction 2305 and Noise Suppression 2306 processing are performed and the fully processed audio stream 2103 is ready for transmission. If Object Profiles are active, the algorithm utilizes location information passed from the Targeting Mechanism 2100 to perform Virtual Microphone 404, Region, and/or Group Profile Functions 2307, 2308, and there can be any number of functions implemented in this processing chain. There are also a couple of key aspects to this processing: first, the order of execution for object profile functions can be tailored based on requirements as detailed in FIG. 20; second, final audio processing for Residual Echo Reduction and Noise Suppression can be optimized based on knowledge of desired and undesired sound sources at known locations throughout an environment. For example, a projector fan may be relatively quiet compared to an HVAC fan and require much less filtering and thus reduce processing requirements resulting in fewer undesired processing artifacts being introduced to the desired audio signal. This approach can greatly improve overall signal quality and remote audio conference user experience.

The individual components shown in outline or designated by blocks in the attached Drawings are all well-known in the audio and electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus configured to apply location based virtual microphone post-processing of combined sound signals from a plurality of physical microphones based on the targeted virtual microphone's location in a shared 3D space to optimize one or more sound sources audio processing based on their location in the shared 3D space regardless of locations of the physical microphones, the apparatus comprising:

at least one microphone input from an enabled virtual microphone that receives plural microphone input signals from the plurality of physical microphones in the shared 3D space; and at least one processor coupled to said at least one microphone input and receiving the plural microphone input signals, the at least one processor being configured to determine a plurality of virtual microphones in the shared 3D space, wherein:

the at least one processor is configured to set up location based virtual microphone specific processing attributes and/or functions, based on requirements of virtual microphone locations in the shared 3D space, and one or more regions comprising one or more virtual microphones and/or one or more groups comprising one or more virtual microphones and/or one or more regions;

the one or more virtual microphones, the one or more regions and the one or more groups each contains one or more profiles, and the one or more profiles each contains one or more attributes and/or one or more functions, the attributes and/or functions defining audio post-processing functions for each virtual microphone;

the virtual microphones included in the same region share the one or more profiles set forth in the region, and the virtual microphones included in the same group share the one or more profiles set forth in the group;

the at least one processor is configured to assign specific attributes and/or functions to the one or more regions based on the requirements of virtual microphone locations for the regions in the shared 3D space; and the at least one processor is configured to process the processing functions for virtual microphones based on the assigned specific attributes and/or functions of the regions.

2. The apparatus of claim 1 wherein the at least one processor is configured to assign the attributes and/or functions to the one or more regions independently of the locations of the physical microphones.

3. The apparatus of claim 1 wherein the at least one processor is configured to set up the one or more regions in various sizes and shapes based on the requirements of locations in the shared 3D space regardless of the locations of the physical microphones.

4. The apparatus of claim 1 wherein the at least one processor is configured to set up the one or more regions and/or the one or more groups regardless of the locations of the physical microphones such that configurations of the one or more regions and the one or more groups stay constant disassociated from the locations of the physical microphones.

5. The apparatus of claim 1 wherein the at least one processor is configured to output real-time location coordinates, in the shared 3D space, of the one or more sound sources that include desire and/or undesired sound sources.

6. The apparatus of claim 1 wherein the attributes include one or more selected from a group consisting of on/off, 2D positions, 3D positions, various threshold values, sizes, descriptions, arrays, Boolean, numeric and text values.

7. The apparatus of claim 1 wherein the functions include one or more selected from a group consisting of Boolean logic, filtering, digital signal processing, analog processing, gain, thresholding, and any location-based logic and behaviors, and wherein the functions are configured to access other devices in the shared 3D space which include IOT (Internet of Things), displays, speakers, room control, lightening, external amplification and any other device that has an exposed physical and/or software control interface.

8. A method to apply location based virtual microphone post-processing of combined sound signals from a plurality of physical microphones based on the targeted virtual microphone's location in a shared 3D space to optimize one or more sound sources audio processing based on their location in the shared 3D space regardless of locations of the physical microphones, the method comprising:

providing at least one microphone input from an enabled virtual microphone that receives plural microphone input signals from the plurality of physical microphones in the shared 3D space;

determining, via at least one processor, a plurality of virtual microphones in the shared 3D space;

setting up, via the at least one processor, location based virtual microphone specific processing attributes and/or functions, based on requirements of virtual microphone locations in the shared 3D space, and one or more regions comprising one or more virtual microphones and/or one or more groups comprising one or more virtual microphones and/or one or more regions, wherein:

the one or more regions and one or more groups are set up based on requirements of locations in the shared 3D space, the one or more virtual microphones, the one or more regions and the one or more groups each contains one or more profiles, the one or more profiles each contains one or more attributes and/or one or more functions, the attributes and/or functions define audio post-processing functions for each virtual microphone, and the virtual microphones included in the same region share the one or more profiles set forth in the region, and the virtual microphones included in the same group share the one or more profiles set forth in the group;

assigning, via the at least one processor, specific attributes and/or functions to the one or more regions based on the requirements of virtual microphone locations for the regions in the shared 3D space; and processing, via the at least one processor, the processing functions for virtual microphones based on the assigned specific attributes and/or functions of the regions.

9. The method of claim 8 wherein the attributes and/or functions are assigned to the one or more regions independently of the locations of the physical microphones.

10. The method of claim 8 wherein the at least one processor is configured to set up the one or more regions in various sizes and shapes based on the requirements of locations in the shared 3D space regardless of the locations of the physical microphones.

11. The method of claim 8 wherein the at least one processor is configured to set up the one or more regions and/or the one or more groups regardless of the locations of the physical microphones such that configurations of the one or more regions and the one or more groups stay constant disassociated from the locations of the physical microphones.

12. The method of claim 8 wherein the at least one processor is configured to output real-time location coordinates, in the shared 3D space, of the one or more sound sources that include desire and/or undesired sound sources.

13. The method of claim 8 wherein the attributes include one or more selected from a group consisting of on/off, 2D positions, 3D positions, various threshold values, sizes, descriptions, arrays, Boolean, numeric and text values.

14. The method of claim 8 wherein the functions include one or more selected from a group consisting of Boolean logic, filtering, digital signal processing, analog processing, gain, thresholding, and any location-based logic and behaviors, and wherein the functions are configured to access other devices in the shared 3D space which include IOT (Internet of Things), displays, speakers, room control, lightening, external amplification and any other device that has an exposed physical and/or software control interface.

15. At least one program embodied in a non-transitory computer readable medium for applying location based virtual microphone post-processing of combined sound signals from a plurality of physical microphones based on the targeted virtual microphone's location in a shared 3D space to optimize one or more sound sources audio processing based on their location in the shared 3D space regardless of locations of the physical microphones, the program comprising instructions causing at least one processor to perform operations comprising:

providing at least one microphone input from an enabled virtual microphone that receives plural microphone input signals from the plurality of physical microphones in the shared 3D space;

determining, via the at least one processor, a plurality of virtual microphones in the shared 3D space;

setting up, via the at least one processor, location based virtual microphone specific processing attributes and/or functions, based on requirements of virtual microphone locations in the shared 3D space, and one or more regions comprising one or more virtual microphones and/or one or more groups comprising one or more virtual microphones and/or one or more regions, wherein:

the one or more regions and one or more groups are set up based on requirements of locations in the shared 3D space, the one or more virtual microphones, the one or more regions and the one or more groups each contains one or more profiles, the one or more profiles each contains one or more attributes and/or one or more functions, the attributes and/or functions define audio post-processing functions for each virtual microphone, and the virtual microphones included in the same region share the one or more profiles set forth in the region, and the virtual microphones included in the same group share the one or more profiles set forth in the group;

assigning, via the at least one processor, specific attributes and/or functions to the one or more regions based on the requirements of virtual microphone locations for the regions in the shared 3D space; and processing, via the at least one processor, the processing functions for virtual microphones based on the assigned specific attributes and/or functions of the regions.

16. The at least one program of claim 15 wherein the attributes and/or functions are assigned to the one or more regions independently of the locations of the physical microphones.

17. The at least one program of claim 15 wherein the at least one processor is configured to set up the one or more regions in various sizes and shapes based on the requirements of locations in the shared 3D space regardless of the locations of the physical microphones.

18. The at least one program of claim 15 wherein the at least one processor is configured to set up the one or more regions and/or the one or more groups regardless of the locations of the physical microphones such that configurations of the one or more regions and the one or more groups stay constant disassociated from the locations of the physical microphones.

19. The at least one program of claim 15 wherein the at least one processor is configured to output real-time location coordinates, in the shared 3D space, of the one or more sound sources that include desire and/or undesired sound sources.

20. The at least one program of claim 15 wherein the attributes include one or more selected from a group consisting of on/off, 2D positions, 3D positions, various threshold values, sizes, descriptions, arrays, Boolean, numeric and text values.

21. The at least one program of claim 15 wherein the functions include one or more selected from a group consisting of Boolean logic, filtering, digital signal processing, analog processing, gain, thresholding, and any location-based logic and behaviors, and wherein the functions are configured to access other devices in the shared 3D space which include IOT (Internet of Things), displays, speakers, room control, lightening, external amplification and any other device that has an exposed physical and/or software control interface.

* * * * *